United States Patent
Martin et al.

(10) Patent No.: US 10,698,923 B2
(45) Date of Patent: Jun. 30, 2020

(54) METHODS AND APPARATUS FOR PROVIDING ADAPTIVE PRIVATE NETWORK DATABASE SCHEMA MIGRATION AND MANAGEMENT PROCESSES

(71) Applicant: Talari Networks Incorporated, Cupertino, CA (US)

(72) Inventors: Todd Martin, Campbell, CA (US); Wei Huang, Cary, NC (US); Christopher W. Parsons, Apex, NC (US); Adam Phillip Schultz, Morrisville, NC (US); Robert W. Dickey, III, Raleigh, NC (US)

(73) Assignee: Talari Networks, Inc., San Jose, CA (US)

( * ) Notice: Subject to any disclaimer, the term of this patent is extended or adjusted under 35 U.S.C. 154(b) by 682 days.

(21) Appl. No.: 14/972,514

(22) Filed: Dec. 17, 2015

(65) Prior Publication Data

US 2016/0179850 A1    Jun. 23, 2016

Related U.S. Application Data

(60) Provisional application No. 62/187,516, filed on Jul. 1, 2015, provisional application No. 62/132,625, filed on Mar. 13, 2015, provisional application No. 62/133,071, filed on Mar. 13, 2015, provisional application No. 62/133,094, filed on Mar. 13, 2015, provisional application No. 62/132,987, filed on Mar. 13, 2015, provisional application No. 62/096,049, filed on Dec. 23, 2014, provisional application No. 62/096,071, filed on Dec. 23, 2014, provisional application No. 62/096,086, filed on Dec. 23, 2014.

(51) Int. Cl.
*G06F 16/27* (2019.01)
*G06F 16/21* (2019.01)

(52) U.S. Cl.
CPC .......... *G06F 16/278* (2019.01); *G06F 16/214* (2019.01)

(58) Field of Classification Search
None
See application file for complete search history.

(56) References Cited

U.S. PATENT DOCUMENTS

| | | | |
|---|---|---|---|
| 5,649,200 A * | 7/1997 | Leblang | G06F 8/71 707/999.202 |
| 8,125,907 B2 | 2/2012 | Averi et al. | |

(Continued)

OTHER PUBLICATIONS

Adaptive Private Networking Appliance Operation Guide: APNware Release Feb. 5, 2013, Talari Networks Inc., 71 pages.*

(Continued)

*Primary Examiner* — Jason G Liao
(74) *Attorney, Agent, or Firm* — Jenkins, Wilson, Taylor & Hunt, P.A.

(57) ABSTRACT

System and techniques are described which apply a method for automatic database schema migration. An initial database is installed, according to rules that define tables of data, in an adaptive private network (APN) having a centralized management system including a network control node (NCN) coupled through the APN to a plurality of client nodes, wherein the NCN provides timing and control to the client nodes. An update to the initial database is received, wherein the initial database includes a first table of data stored in a first set of columns and the updated database includes a modified first table having a second set of columns that has a different number of columns as compared to the first table is automatically detected. One or more columns from the second set of columns that are different than the first set of columns are updated for data content.

24 Claims, 13 Drawing Sheets

(56) References Cited

U.S. PATENT DOCUMENTS

| | | | |
|---|---|---|---|
| 8,274,891 | B2 | 9/2012 | Averi et al. |
| 8,452,846 | B2 | 5/2013 | Fredette et al. |
| 8,644,164 | B2 | 2/2014 | Averi et al. |
| 8,775,547 | B2 | 7/2014 | Fredette et al. |
| 2002/0161757 | A1* | 10/2002 | Mock ............... G06F 17/30386 |
| 2009/0310485 | A1 | 12/2009 | Averi et al. |
| 2012/0042032 | A1 | 2/2012 | Fredette et al. |
| 2012/0117273 | A1 | 5/2012 | Averi et al. |
| 2012/0314578 | A1 | 12/2012 | Averi et al. |
| 2013/0238743 | A1 | 9/2013 | Fredette et al. |
| 2014/0173331 | A1 | 6/2014 | Martin et al. |
| 2014/0185445 | A1 | 7/2014 | Averi et al. |
| 2014/0376379 | A1 | 12/2014 | Fredette et al. |
| 2015/0071067 | A1 | 3/2015 | Martin et al. |

OTHER PUBLICATIONS

Lagura, My Network Lab Nov. 18, 2016, blogspot.com, http://wannabelab.blogspot.com/2016/11/basic-configuration-of-talari-networks.html.*

Case et al., A Simple Network Management Protocol (SNMP) May 1990, ietf, RFC 1157, https://tools.ietf.org/html/rfc1157.*

Morales, VLDB and Partitioning Guide Jul. 2007, Oracle Sys, TOC, chapters 1, 3.*

Kabs, 10.1. How to calibrate the system clock using NTP Mar. 6, 2006, ntp.org, https://support.ntp.org/bin/view/Support/HowToCalibrateSystemClockUsingNTP.*

Mills et al., RFC 5905 Network Time Protocol Version 4: Protocol and Algorithms Specification Jun. 2010, IETF, https://www.ietf.org/rfc/rfc5905.txt.*

Hickford, Using Migration Scripts in Database Deployments Jun. 17, 2014, redgate.com, https://www.red-gate.com/simple-talk/sql/database-administration/using-migration-scripts-in-database-deployments/.*

SQL Compare 10 Part of the SQL Developer Bundle date unknown [captured on Mar. 6, 2013 by archive.org], redgate, https://web.archive.org/web/20130306083715/https://www.red-gate.com/products/sql-development/sql-compare/.*

Krasner, Glenn E. and Pope, Stephen T., "A Description of the Model-View-Controller User Interface Paradigm in the Smalltalk-80 System", ParcPlace Systems, 1988.

"Talari Networks Announces Availability of its Mercury T5000 WAN Appliance and New Supporting APNWare Software Upgrade," Talari Networks, Inc., pp. 1-5 (Nov. 13, 2012).

* cited by examiner

METHODS AND APPARATUS FOR PROVIDING ADAPTIVE PRIVATE NETWORK DATABASE SCHEMA MIGRATION AND MANAGEMENT PROCESSES

The present application claims the benefit of U.S. Provisional Application Nos. 62/096,049 titled "APN Aware Architecture (Part A)"; 62/096,071 titled "APN Aware Architecture (Part B)" and 62/096,086 titled "APN Aware Architecture (Part C)", all of which were filed on Dec. 23, 2014 and from U.S. Provisional Application Ser. Nos. 62/132,625 titled "Aware: An Adaptive Private Network Centralized Management System Discovery Process"; 62/132,987 titled "Aware: An Adaptive Private Network Centralized Management System Timestamp Correlation Process"; 62/133,071 titled "Aware: Adaptive Private Network Database Schema Migration and Management Processes" and 62/133,094 titled "Aware: Adaptive Private Network Centralized Management System Data Visualization Process" all of which were filed on Mar. 13, 2015 and from U.S. Provisional Application Ser. No. 62/187,516 titled "Methods and Apparatus for Providing Adaptive Private Network Centralized Management System Time Correlated Playback of Network Traffic" which was filed on Jul. 1, 2015 and all of which are incorporated by reference herein in their entirety.

CROSS REFERENCE TO RELATED APPLICATIONS

Related implementations of the present inventions have been disclosed in four other copending U.S. patent applications claiming the benefit of the provisional applications cited above and that have the same assignee as the present patent application. The related copending U.S. patent applications are 1) U.S. patent application Ser. No. 14/972,270, filed Dec. 17, 2015 entitled "Methods and Apparatus for Providing Adaptive Private Network Centralized Management System Discovery Processes"; 2) U.S. patent application Ser. No. 14/972,353, filed Dec. 17, 2015 entitled "Methods and Apparatus for Providing Adaptive Private Network Centralized Management System Timestamp Correlation Processes"; 3) U.S. patent application Ser. No. 14/973,193, filed Dec. 17, 2015 entitled "Methods and Apparatus for Providing Adaptive Private Network Centralized Management System Data Visualization Processes" and 4) U.S. patent application Ser. No. 14/973,343, filed Dec. 17, 2015 entitled "Methods and Apparatus for Providing Adaptive Private Network Centralized Management System Time Correlated Playback of Network Traffic". The four related copending U.S. patent applications are hereby incorporated by reference in their entirety.

The present application is also related to U.S. patent application Ser. No. 14/146,786 filed on Jan. 3, 2014 which is a divisional of U.S. patent application Ser. No. 13/592,460 filed on Aug. 23, 2012 which issued as U.S. Pat. No. 8,644,164 which is a continuation of U.S. patent application Ser. No. 13/353,693 filed on Jan. 19, 2012 which issued as U.S. Pat. No. 8,274,891 which claims the benefit of and priority to U.S. patent application Ser. No. 12/482,766 filed on Jun. 11, 2009 which issued as U.S. Pat. No. 8,125,907 entitled "Flow-Based Adaptive Private Network with Multiple WAN-Paths", all of which claim the benefit of U.S. Provisional Patent Application No. 61/060,846 entitled "Flow-based Adaptive Private Network with Multiple WAN-Paths" filed Jun. 12, 2008; U.S. patent application Ser. No. 14/291,776 filed on May 30, 2014 which is a continuation of U.S. patent application Ser. No. 13/850,411 filed on Mar. 26, 2013 which issued as U.S. Pat. No. 8,775,547 and which is a continuation of U.S. patent application Ser. No. 13/208,825 filed on Aug. 12, 2011 entitled "Adaptive Private Network Asynchronous Distributed Shared Memory Services" which issued as U.S. Pat. No. 8,452,846, all of which claim the benefit of U.S. Provisional Patent Application Ser. No. 61/372,904 entitled "Adaptive Private Network Asynchronous Distributed Shared Memory Services" filed Aug. 12, 2010; U.S. patent application Ser. No. 13/719,433 filed on Dec. 19, 2012 entitled "An Adaptive Private Network with Geographically Redundant Network Control Nodes"; U.S. patent application Ser. No. 14/019,723 filed on Sep. 6, 2013 entitled "An Adaptive Private Network with Path Maximum Transmission Unit (MTU) Discovery Process"; U.S. patent application Ser. No. 14/481,335 filed on Sep. 9, 2014 entitled "Adaptive Private Network with Dynamic Conduit Process"; all of which have the same assignee as the present application, are related applications, and are hereby incorporated by reference in their entirety.

FIELD OF THE INVENTION

The present invention relates generally to improved network management. More specifically, the present invention relates to improved methods for configuring, monitoring, and analyzing an adaptive private network.

BACKGROUND OF THE INVENTION

Wide area network (WAN) standards include, for example, digital subscriber line (DSL), asymmetric digital subscriber line (ADSL), and multiprotocol label switching (MPLS), to mention a few. WANs are used to connect local area networks (LAN's) allowing devices in one location to communicate with devices and their users in other locations. In a WAN having a large number of remote sites, direct connections between the sites are many times statically configured. The dynamics of the network system may also change over time making repeated static configurations of the network inefficient and costly to implement. Further, static connections involve reservations of network resources. As data flow patterns change in the network, the reserved resources create non-optimal static connections which cause the network to reserve bandwidth that could be better used elsewhere in the network.

A model-view-controller (MVC) design pattern was articulated in the 1988 paper "A Description of the Model-View-Controller User Interface Paradigm in the Smalltalk-80 System" by Krasner and Pope. This MVC design pattern divides an application into the three components: a model, a view, and a controller. The model component maintains state of underlying data and applies operations on that data. The view component is responsible for rendering of the data controlled by the model to a user. The view component is notified about changes to the data by the model and updates the rendered view of the data. The controller component is responsible for taking input from the user and sending appropriate messages to the model. A view component and controller component are typically paired and communicate with the same model component. A model component may interact with multiple sets of views and controllers. It is generally assumed in a framework of the MVC design pattern that the model has the ability to broadcast changes in the model to the views and controllers that it is connected with. However, this assumption does not hold in web applications. In web applications, a web browser updates its view only based on a request to the server that holds the model. As a result, changes to the model cannot be automatically pushed to the user interface. The MVC design pattern is a theoretical framework which provides a guide for system developers and is not related to any specific system. Further, the MVC design pattern framework by itself does not provide improved performance, reliability, and predictability of a network.

As networks become larger and more complex, administrative techniques for managing the network are increasingly more complex and costly. Prior techniques to separately configure, monitor, and analyze each node of a large network may not provide accurate information and are prone to errors.

SUMMARY OF THE INVENTION

Among its several aspects, the present invention recognizes what is needed is a management technique that provides more accurate and lower cost techniques to configure, monitor, analyze a network, and to present related data in a user friendly manner. Among its several aspects, the present invention addresses systems and techniques which improve discovery, database management, graph tree reporting, replay, and time correlation. To such ends, an embodiment of the invention applies a method for automatic database schema migration. An initial database is installed, according to rules that define tables of data, in an adaptive private network (APN) having a centralized management system that includes a network control node (NCN) coupled through the APN to a plurality of client nodes, wherein the NCN is separate from the plurality of client nodes and the NCN provides timing and control to the client nodes within the APN. An update to the initial database is received, wherein the initial database includes a first table of data stored in a first set of columns and the updated database includes a modified first table having a second set of columns different from the first set of columns. On installation of the updated database, the centralized management system automatically detects that the modified first table has a different number of columns as compared to the first table. One or more columns from the second set of columns that are different than the first set of columns are updated for data content.

Another embodiment of the invention addresses a method for migrating a current database having a current schema to an updated database having an updated schema. Columns required by the updated schema are not the same columns in the current database according to the current schema as determined, automatically by a computer. The current database is updated, automatically by the computer, according to the columns required by the updated schema. Information in the columns is updating, automatically by the computer, according to information characteristics specified by the updated schema.

Another embodiment of the invention addresses a computer readable non-transitory medium storing a computer program which causes a computer system to perform a method for automatic database schema migration. An initial database is installed, according to rules that define tables of data, in an adaptive private network (APN) having a centralized management system that includes a network control node (NCN) coupled through the APN to a plurality of client nodes, wherein the NCN is separate from the plurality of client nodes and the NCN provides timing and controls client nodes within the APN. An update to the initial database is received, wherein the initial database includes a first table of data stored in a first set of columns and the update database includes a modified first table having a second set of columns different from the first set of columns. On installation of the updated database, the centralized management system automatically detects that the second set of columns has a different number of columns as compared to the first table. One or more columns from the second set of columns that are different than the first set of columns are updated for data content.

Another embodiment of the invention addresses a method for migrating a table schema to an updated table schema on a system. A table engine has changed as determined automatically by the system, wherein the table engine change has not affected data stored for a table (the table data). The table data associated with the table engine is archived on the system in response to determining the table engine has changed. The table data is migrated on the system from an old schema definition for the table before the table engine change was determined to a new schema definition for the table after the table engine change was determined.

A further embodiment of the invention addresses a method of configuration conflict tracking. A current configuration N of an adaptive private network (APN) is determined to have a centralized management system that includes a network control node (NCN) coupled through the APN to a plurality of client nodes, wherein the NCN is separate from the plurality of client nodes and the NCN provides timing and control to the client nodes within the APN. A first changed configuration A-1 for the APN and a unique configuration identifier (UCID) list {N, A-1} are generated for a user A and which are both sent to the NCN. In the NCN, a determination is made to update the current configuration N to the first changed configuration A-1, which becomes the next current configuration, since the NCN finds the current configuration N in the UCID list {N,A-1}. A second changed configuration B-1 for the APN and a second UCID list {N,B-1} are generated for a user B and which are both sent to the NCN. In the NCN, a determination is made to not update the next current configuration A-1 since the NCN does not find the next current configuration A-1 in the second UCID list {N,B-1}, wherein the user B is informed of the second UCID list {N,B-1} discrepancy with the next current configuration A-1.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1A:
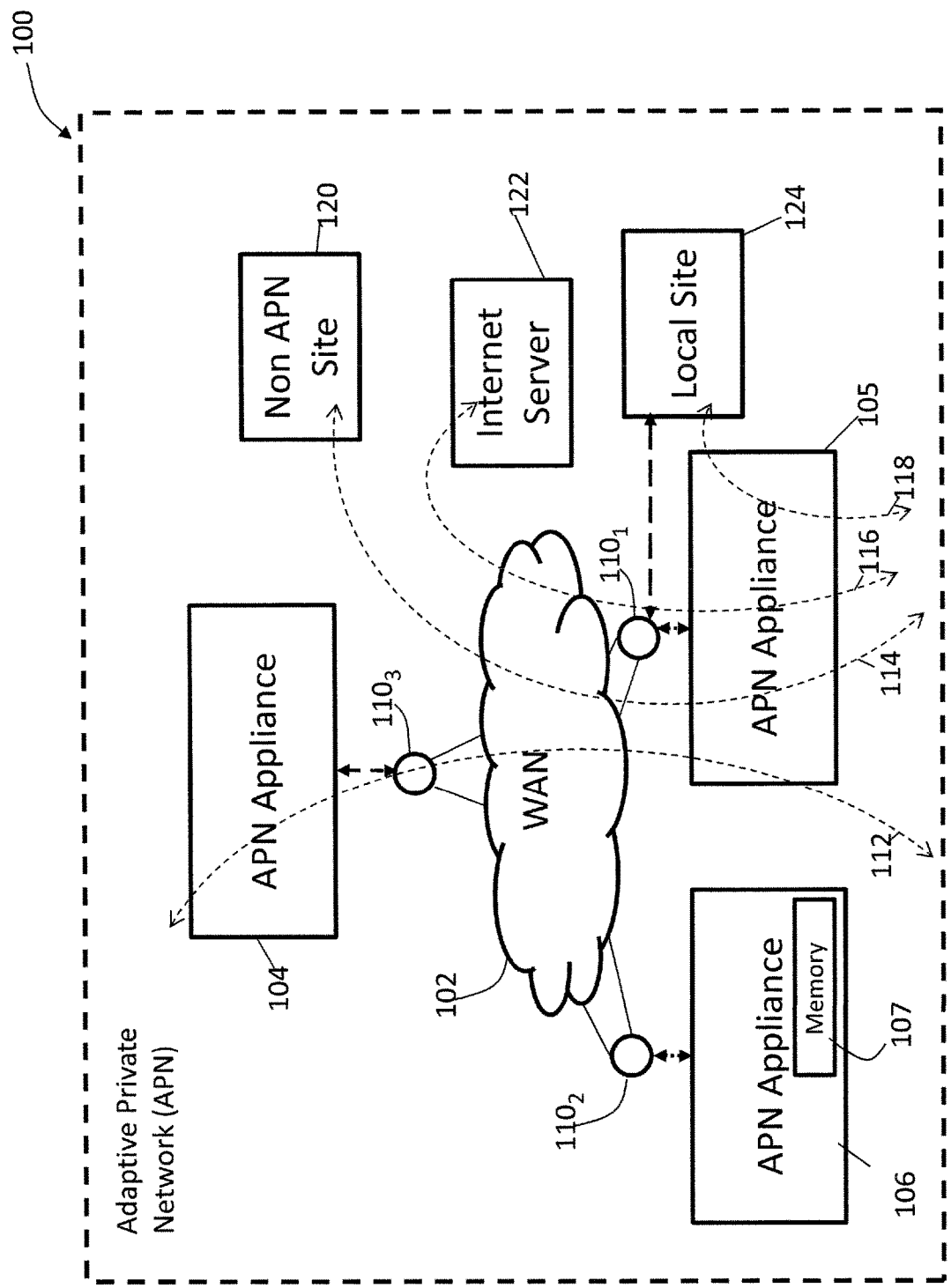
FIG. 1A illustrates an adaptive private network (APN) with APN network service paths in accordance with an embodiment of the present invention.

FIG. 1A shows an example of an adaptive private network (APN) 100 in which the present invention may be suitably employed as described in further detail below, including the network components, flows, paths, and services. The APN 100 includes one or more wide area networks (WANs), such as WAN 102, APN appliances 104-106, WAN routers $110_1$-$110_3$, and network application services as well as APN conduits between APN appliances, as described in more detail below. First, however, a number of terms used herein are defined with the meaning they have when used in the context of the present invention.

An APN path is a logical connection established between two WAN links located at different geographic sites across a WAN.

An APN conduit is a virtual connection between two APN nodes, also referred to as client sites, and formed by aggregating one or more APN paths and their allocated WAN link resources. The conduits overlay a virtual network on top of the underlying network.

A conduit maximum transmission unit (MTU) is a minimum link MTU of the one or more APN paths between a source site and a destination site.

An APN appliance (APNA) is a device that contains APN client site functionality including all software modules within. A high availability site contains two APNAs, one that is active and one that is in a standby mode of operation and available to become active in place of the other APNA if required.

A WAN link represents a physical access point to the wide area network (WAN), such as a digital subscriber line (DSL) connection or a cable modem. The distinctive characteristic of a WAN link is the bandwidth, or in other words, the amount of data capacity available for transmission and reception. WAN links can be shared among APN conduits, and intranet and Internet network services. In the present embodiments, the APN appliances do not directly attach to WAN links. APN appliances communicate with WAN links through logical connections, such as the WAN routers $110_1$-$110_3$ of FIG. 1A.

A private WAN link provides a physical access point to non-public WAN destinations. Examples of such private WAN links include an asynchronous transfer mode (ATM) link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

A local WAN link (LWL) is an APN client site's access point to a WAN. A site A's LWL is coupled to a corresponding remote WAN link for a site B. For a conduit between a site A and a site B, site A's local WAN links are site B's remote WAN links.

A routing domain represents a group of sites that can reach each other via an intermediate site that has WAN-to-WAN forwarding enabled. All local routes of each site in the routing domain are added to all other sites in the routing domain.

A static conduit is a conduit configured in a configuration file and created at startup time of an APNA. A static conduit is not removed without changing the configuration file.

A dynamic conduit is a conduit created between APN clients when needed and which can be removed when no longer needed.

An APN service is a set of processing steps performed on packets that are transmitted through the APN. As illustrated in FIG. 1A, data traffic that moves through APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN client site may have multiple APN conduits that connect to remote APN client sites. For each APN conduit there exists a separate APN service instance for the APN conduit service type.

An APN conduit service associated with path 112 manages network traffic packets that are transmitted through the APN 100 from the APN appliance 105 through router $110_1$, through the WAN 102, through another router $110_3$ to APN appliance 104. The APN conduit service for path 112 operates on both APN appliances 104 and 105. The APN conduit service sends and receives data between a first geographic location that has an APN appliance 105 and a different geographic location that has an APN appliance 104 utilizing the full benefits provided by the APN conduit service for WAN resource allocation and network adaptation. An APN intranet service associated with path 114 is used to manage the sending and receiving of data between a first geographic location that has the APN appliance 105 and a different geographic location within an enterprise non-APN site 120 that does not have an APN appliance by way of a WAN link that is also utilized by other APN services.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 116 is used to send and receive data between a first geographic location that has the APN appliance 105 and a different geographic location that is external to an enterprise network by way of a WAN link that is also utilized by other APN services. For example, traffic using the APN Internet service may be associated with a network user accessing a public Internet web server 122. An APN pass through service 118 is used to send and receive data between a first geographic location that has an APN appliance (APNA) 105 and a local site 124 within the same first geographic location. In another embodiment, an APN pass through service may be used to send and receive data between a first geographic location that has the APN appliance 105 and a different geographic location within an enterprise network that does not have an APN appliance and does not traverse the WAN using any WAN links associated with any other APN services.

Dynamic conduits address changes in statically configured networks that are not just slow, gradual changes in network usage, but are happening in real time throughout a day across a global network. In real time, dynamic conduits dynamically optimize network performance adapting to changing communication patterns between nodes in the network. Dynamic conduits can also be used to offload traffic from intermediate nodes that may be experiencing congestion.

An adaptive private network (APN) software product according to the present invention runs as a centralized management system within a virtual machine to create APN configurations and to monitor system resources, analyze system resources, and manage a configured APN in operation as addressed further herein. Aware is a product name for a presently preferred embodiment of the centralized management system that includes capabilities that monitor, analyze, and provide discovery, timestamp correlation, and database schema migration processes of the present invention. The APN software of the invention, also referred to as APN virtual machine (VM) software, provides analysis and monitoring capabilities that are timely with respect to events to be tracked and monitored while the APN is in operation and provides storage for historical data as taught further herein. The APN system, also referred to as an APN VM system, reduces the time to configure APN appliances and the number of errors that can occur in configuring a system, as well as, to provide detailed performance data correlated across the WAN. The APN system further allows a centralized virtual single point of control by a network control node (NCN) for a physical network in which the NCN provides system wide timing synchronization. The centralized single point of control is not limited to a central location within a network of nodes, may be at any point within the network, and may be coupled at a point that would be considered outside the boundary of a network. Centralized indicates the single point of control aspects of the APN as described further herein.

An onboard configuration facility is a software component designed to plugin to the APN system of the invention and provide an APN configuration compiler, APN configuration editing capabilities, and to provide an ability to create and edit network maps that show nodes of the APN and conduits between the nodes. Each version of the APNA software produces a version of the onboard configuration facility that understands an object model and configuration options for that version of APNA software. The APN system supports installation of multiple concurrent onboard configuration facility plugins so that a single APN software version can manage a variety of APNA software configuration versions. Each version of APNA software, the appliance code, is provided with a default version of the configuration facility, which is also referred to as a configuration plugin. Multiple configuration plugins may be installed. So, the term "onboard" is in reference to the configuration facility or "plugin" when it is running on the APN VM system or on an NCN.

An onboard configuration editor is a component of the onboard configuration facility that represents an APN configuration as a hypertext markup language (HTML) tree and accepts changes to the APN configuration from a user. The onboard configuration editor is closely coupled with a configuration compiler to make changes to the configuration HTML tree. The onboard configuration editor also integrates with a network map facility to display site nodes in a visual map representation of the APN.

An APN configuration file is a text file which describes a configuration of the APN. This configuration file serves as an input to the configuration compiler which generates registries for each APNA in the network.

The configuration compiler is a software program, such as a Java™ program, that can run on an APN system and converts an APN configuration file into either registries for use by APNAs or into an extensible markup language (XML) representation of the object model for use by the onboard configuration facility.

A configuration package is a software data file which contains the APN configuration file along with metadata. Such metadata includes the network maps that are derived from a specific APN configuration.

An onboard configuration facility package consists of the onboard configuration facility in a format which can be installed onto the APN system.

Adaptive private network appliance (APNA) settings are management settings that can be set directly on an APNA. These APNA settings include time parameters, such as for a time zone or time zones and for network time protocol (NTP) including an NTP server address, settings for a Netflow server, user authentication, simple network management protocol (SNMP), event handling, and periodic status reports. These APNA settings are generally not configurable through the APN configuration file. Rather, the APNA Settings are managed on a network-wide basis through the APN controls and software of the invention.

A dashboard, in the context of the APN system, is a user configurable display screen which may be customized to display a subset of items from the rest of the APN system. Multiple dashboards may be created with one being chosen as a default home screen for a particular user.

Workspaces are a construct which allow a user to organize a set of objects, allowing the user to save and recreate a state of a management session. Workspaces are used in a similar manner to use of a 'project' in a software integrated development environment (IDE) which collects a set of source code files and associated build scripts and resources such as help text and images to create a complex graphical application.

Figure 1B:
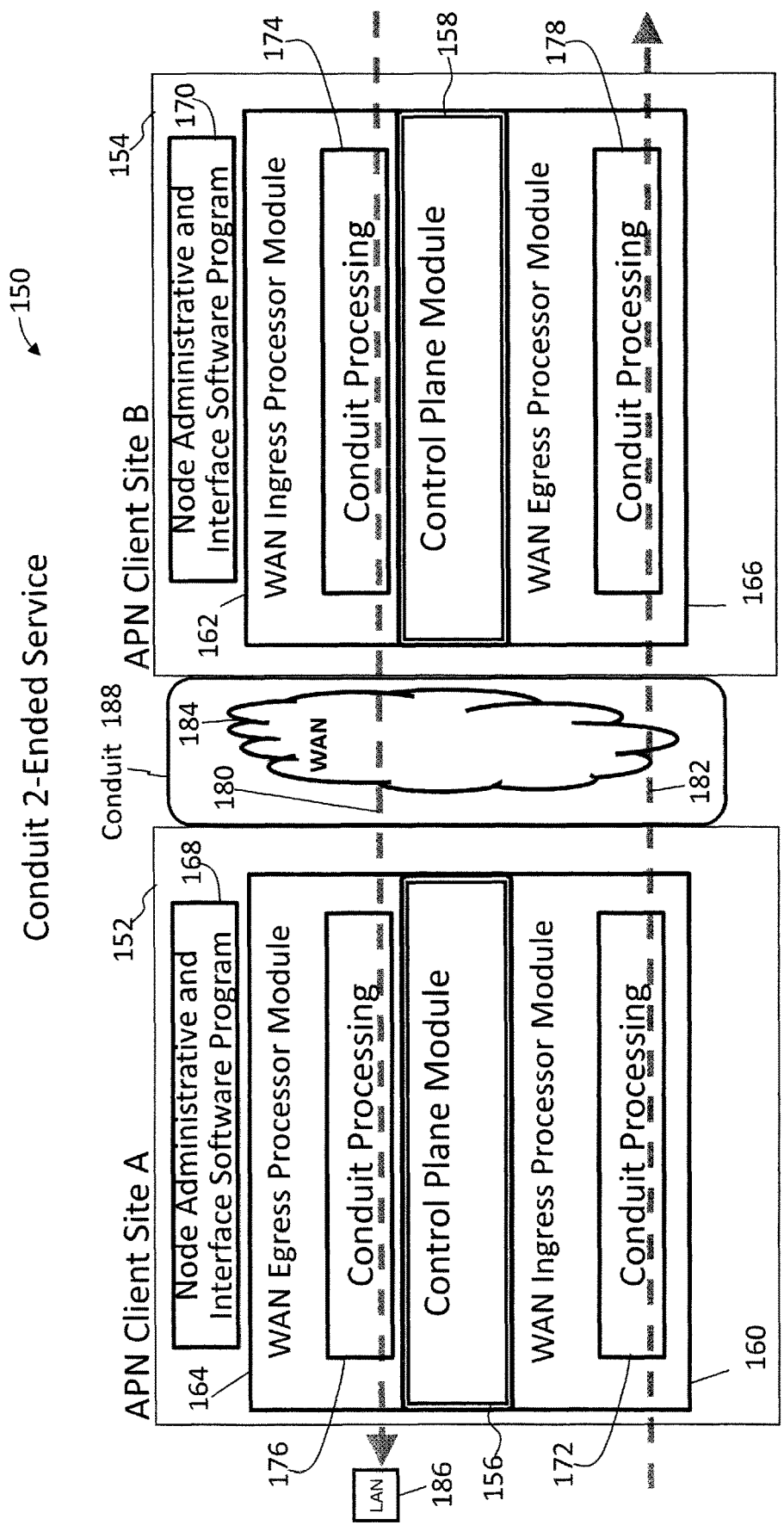
FIG. 1B illustrates an adaptive private network (APN) conduit providing two-ended service between a client site A and a client site B in accordance with an embodiment of the present invention.

FIG. 1B illustrates an adaptive private network (APN) conduit supporting two-ended service 150 between an APN client site A 152 and an APN client site B 154 in accordance with an embodiment of the present invention. Each APN client site is also considered a node in the APN and contains a collection of software modules which govern its participation within the APN. The software modules for the APN client site A 152 and the APN client site B 154 include control plane modules 156 and 158, WAN ingress processor modules 160 and 162, WAN egress processor modules 164 and 166, and node administrative and interface software program modules 168 and 170, respectively. As illustrated in FIG. 1B, the WAN ingress processor modules 160 and 162 include conduit services 172 and 174, and WAN egress processor modules 164 and 166 include a duplicate conduit service 176 and 178. Intranet service, Internet service, and pass through service are also provided at each APN client site. Each APN service type, including conduit, intranet, Internet, and pass through service types, implements processes for each type of data traffic that is communicated to and from the WAN respectively.

As illustrated in FIG. 1B, APN conduit traffic, identified by bold dashed arrow paths 180 and 182, flows through the two APN client sites 152 and 154 as the traffic traverses the APN. WAN ingress processing module 162 of APN client site B 154 performs the WAN ingress conduit service processing 174 prior to transmitting the traffic 180 via the WAN 184 to the APN client site A 152. WAN egress processor module 164 of the APN client site A 152 performs the WAN egress conduit service processing 176 prior to transmitting the traffic 180 to the node or nodes located on LAN 186. The binding of the one APN client site's WAN ingress conduit processing 174 to the peer APN client site's WAN egress conduit service processing 176 constitutes an APN conduit 188 in which traffic is actively monitored and managed across multiple WAN resources.

The APN is capable of using disparate asymmetric WAN links which frequently vary in behavior of bandwidth, latency, jitter, packet loss and congestion over time. For example, the APN can use an asymmetric DSL WAN link that transmits data at 512 kbps upstream to the WAN and 6 Mbps from the WAN through the public network combined with a private symmetric leased circuit T1 WAN link that transmits data at 1544 kbps upstream and downstream and a cable broadband connection that transmits data at 312 kbps upstream to the WAN and 3 Mbps from the WAN to a peer having adequate aggregation bandwidth of these rates for a single transmission control protocol (TCP) file transfer session at a theoretical transmit rate of 2368 kbps and receive at 10544 kbps or 10.544 Mbps. Practically, under good network behavior, the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In all path selections, conduit paths are evaluated and the best available path is selected. Any paths currently in a path quality good state are eligible to be chosen first. If multiple paths are in a path quality good state, then an estimated end to end time is evaluated and compared for each path, and the path with the lowest end to end time is chosen. If no path is in path quality good state, then a path with the highest bandwidth path quality bad state is chosen. A "one way time" (OWT) refers to the amount of time it takes for a packet to traverse a network from source to receiver. In the context of this invention, the one way time is measured by subtracting a receive time stamp from a WAN Egress Module 166 from the send time stamp from a WAN Ingress Module 160, FIG. 1B.

Figure 1C:
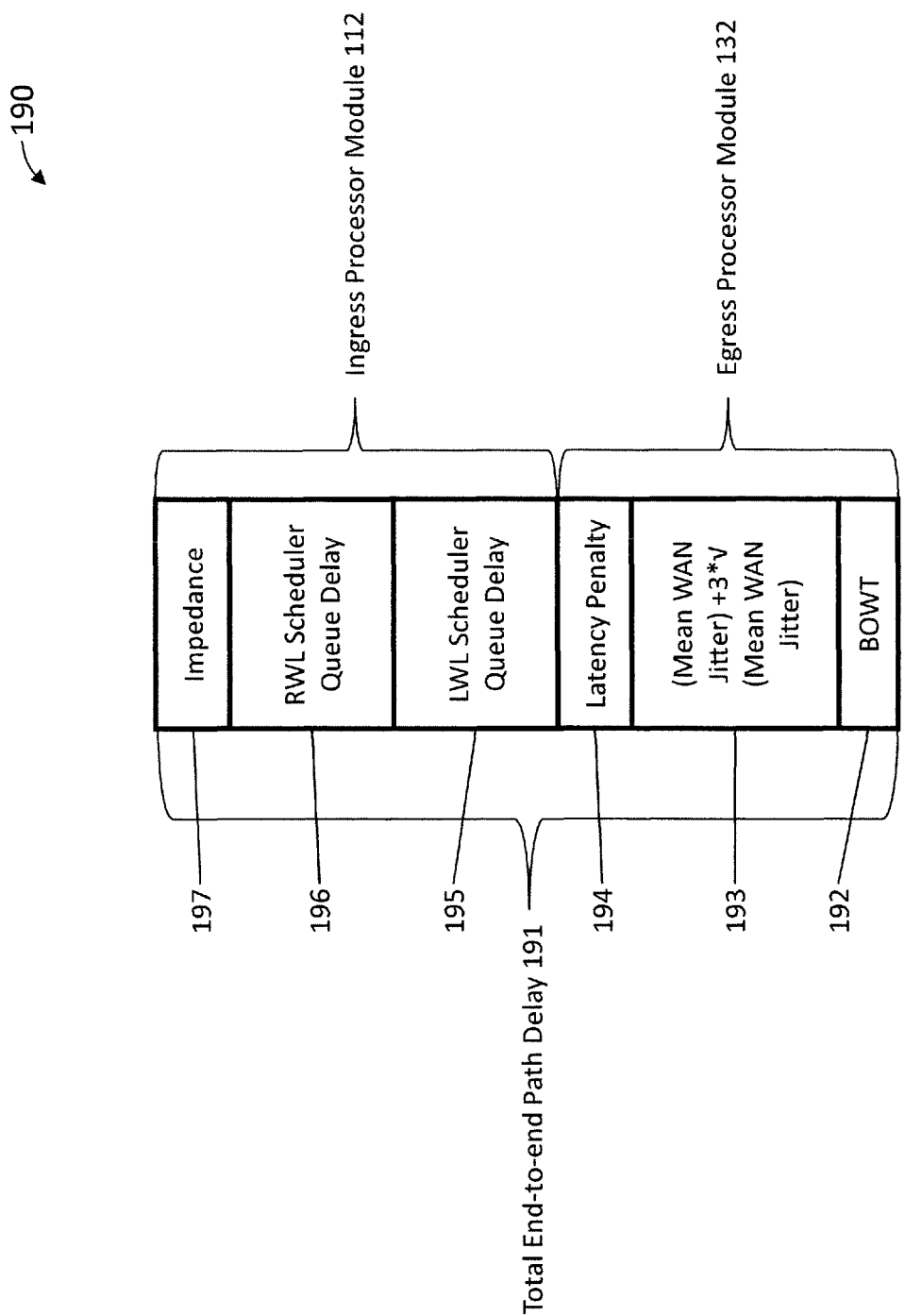
FIG. 1C illustrates a representation of factors used to determine the total end-to-end path delay in accordance with an embodiment of the present invention.

FIG. 1C illustrates a representation of factors 190 used to determine the total end-to-end path delay 191 in accordance with an embodiment of the present invention. The term "best one way time" (BOWT) refers to the lowest measured OWT for a particular packet on a particular path over a period of time. Initially, the evaluation process chooses one best path based on path latency which is calculated using a best one way time (BOWT) 192, mean WAN jitter 193, latency penalty for short term instability 194 and WAN link scheduler's queue delay times 195 and 196, with additional preferential treatment referred to as impedance 197 applied to any prior primary path for the APN traffic flow, if a primary path exists. Thus, an exemplary formula for estimating total end-to-end path delay is the BOWT 192+(mean WAN jitter 193)+3*($\sqrt{}$(mean WAN jitter 193))+latency penalty 194+local WAN link (LWL) scheduler queue delay 195+remote WAN link (RWL) scheduler queue delay 196+impedance 197. The BOWT 192, mean WAN jitter 193 and latency penalty 194 are provided by a remote APN conduit state resulting from control messaging from the egress processor module 166 of FIG. 1B. The local WAN link scheduler queue delay 195, remote WAN link scheduler queue delay 196 and impedance 197 are provided by the WAN ingress processor module 160 of FIG. 1B. U.S. Pat. No. 8,125,907 filed on Jun. 11, 2009 entitled "Flow-Based Adaptive Private Network with Multiple WAN-Paths" and incorporated by reference herein in its entirety provides further exemplary details of a presently preferred approach to timing and network control in an adaptive private network (APN) at col. 6, line 1-col. 19, line 27, for example.

APN path processing services are responsible for providing a means of communicating user data and control information from one APN node to another APN node across the network. In particular, user data and control information may be transmitted from the WAN ingress processor module 160 of one APN node across the WAN and received at the WAN egress processor module 166, as shown for example in FIG. 1B. Exemplary APN path services which may suitably be provided are listed below:

1. Universal path tagging of all conduit traffic sent across the WAN with high resolution and highly synchronized APN time stamps to enable the highly predictive estimation of transmission latency and statistical variation of latency, subsequently in tandem a control plane modules' path state monitoring service is used to detect optimal paths for traffic to use across the APN.

2. Use of the above optimal path identification to provide, in tandem with a WAN link accounting module, WAN bandwidth reallocation from low performing paths to higher performing paths.

3. Universal path tagging, of all conduit traffic sent across the WAN APN path with path sequence numbers, enables sub second detection of packet loss enabling fast retransmission of user packets with little to no negative effect to the end users.

4. Continual monitoring of and characterization of network behavior at times of lower utilization using heartbeats for fast reaction when network demand does arrive, such as provided by a heartbeat generator.

5. The ability to identify and proactively solicit retransmission when network traffic has been extraordinarily delayed or if the network has ceased to function using a Nag method, as provided by a Nag process, operating on the path state monitoring module.

6. Universal path tagging of all conduit traffic with network utilization and non-utilization of WAN link resources enabling early detection and avoidance of network congestion prior to the packet loss that is typical of normal TCP like congestion methods.

7. The ability to transmit time sensitive control messages without typical internal scheduling delays for software process staging to rate schedulers, while still maintaining proper long utilizations to the APN network to do retransmission of lost packets without the highly predictive estimation of transmission latency and statistical variation of latency.

The APN client node uses timing data to adjust or calibrate a network time by using a linear algebraic calculation based on the slope-intercept form. In a current implementation, y is the time at an APN control node, also referred to as a network control node (NCN), and x is the client node local time, b is the base offset between the two, and m is the rate of change of y versus x which is the slope. Using these definitions, an equation in slope-intercept form y=mx+b is expressed as network time=slope*client local time+base.

The slope is calculated by taking two samples over a pre-specified period and averaging the samples together. The base offset is calculated by taking the difference of the value between the network control point time and the client time, adjusted for one half round trip time (RTT).

Using queuing theory, Poisson distribution assumptions, and a highly accurate APN wide APN clock sync that allows for accurate one way time measurement, a method is provided that is typically capable of estimating path latency and statistical jitter with an accuracy approaching ~99%. An equation which may be suitably used is best one way time (BOWT)+(Mean WAN Jitter)+3*($\sqrt{}$(mean WAN jitter)). This equation provides a very accurate inference with just a few samples of traffic over a short period.

A path state represents the most current condition of the network path as determined by feedback received by the WAN egress APN node's path state monitoring process. As packets are received, the sequence numbers of the packets are tracked to see if any packets were lost in transit between the WAN ingress APN node and the WAN egress APN node. A method is used to trigger path state transitions that are biased toward more tolerance for loss in the short periods of packets received with substantially less tolerance of loss over longer periods. A unique aspect of this approach is the ability to track the path's packet loss thresholds over numerous durations nearly simultaneously and continually while still maintaining low processor overhead. This aspect is obtained through the universal path tagging of conduit traffic sent across the WAN with high resolution and highly synchronized APN time stamps to enable the highly predictive estimation of transmission latency and statistical variation of latency. In tandem, a control plane modules' path state monitoring service is used to detect packet loss and optimal paths for traffic to use across the APN. The result is an ability to detect a difference between occasional incidental short term network loss and long term persistent problems.

In a presently preferred embodiment, the APN node's software modules at a client site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as a rack mounted processing device, a personal computer, a server, or the like, having one or more central processing unit devices. The processor and memory complex, for example, may be configured to execute instructions that access data and operate on data under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM), flash memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN client site) contains software modules required to participate in an adaptive private network. An APN node may exist in one or more APN appliances at a location. An APN node contains a collection of software modules which govern its participation within an APN such as control plane modules 156 and 158, WAN ingress processor modules 160 and 162, and WAN egress processor modules 164 and 166 in FIG. 1B. The control plane module is responsible for controlling and participating in the control of the APN node in tandem with other APN nodes in the network.

The WAN ingress processor module 160 may suitably be embodied as software and hardware components responsible for processing network traffic for transmission from a local area network (LAN) to a WAN. The WAN egress processor module 164 may suitably be embodied as software operating on hardware components, such as a processor and memory complex that is responsible for processing network traffic for transmission from a WAN to a LAN. WAN ingress and WAN egress processor modules are discussed in further detail below. The APN client site's control plane module 156 may suitably be embodied as software operating on hardware components, such as a processor and memory complex that utilizes the APN client site's WAN ingress processor module 160 and WAN egress processor module 164 as the means for transmitting and receiving APN node to APN node control data across the WAN.

Software packages for an APN are distributed through the WAN using control packets, termed Tapplication protocol (TAP), that is part of change management software or through administrative interfaces, such as downloading software using interfaces 168 and 170 to the APN client sites. The TAP is a protocol that is run on the WAN to allow processes outside of t2_app on different appliances to communicate with each other. The t2_app is a program that is running on each APNA communicating with other APNAs in the APN while forwarding user data. After a software update, the APN services on the APN client sites 152 and 154 are then restarted thus bringing the APN software node configuration into synchronization.

Figure 2:
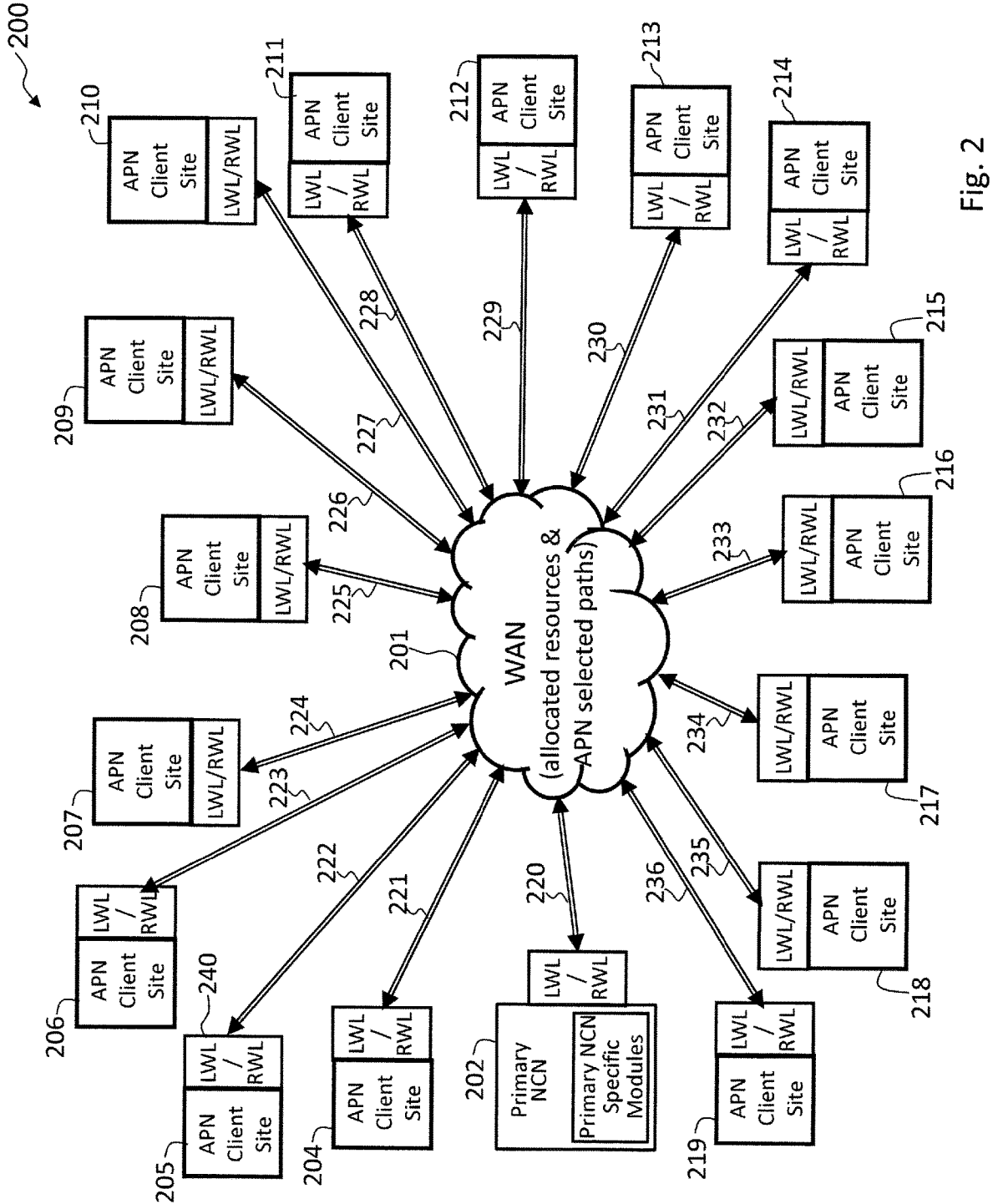
FIG. 2 illustrates an APN having an APN network control node (NCN) and sixteen APN conduits coupled to sixteen APN client sites in accordance with an embodiment of the present invention.

FIG. 2 illustrates an APN 200 having an APN network control node (NCN) 202 coupled to conduit section 220 and sixteen APN conduit sections 221-236 coupled to sixteen APN client sites 204-219, respectively, in accordance with an embodiment of the present invention. As illustrated in FIG. 2, in a presently preferred embodiment, APN 200 is centrally configured. A network administrator configures the entire APN 200 through an APN configuration file that is processed by the NCN 202. The NCN 202 then distributes the configuration settings to all client sites in the APN 200. This method of configuring the APN 200 is intended to provide benefits to the administrator by providing a single point of configuration to the network. It also assures configuration consistency and compatibility for all APN client sites in the network nearly simultaneously, with strict version checking. In a presently preferred embodiment, an intensive configuration audit and validation is done to the configuration prior to that configuration being applied to the network. This audit greatly decreases risks of invalid configurations being placed on the production network. The central configuration also provides for additional configuration bandwidth optimization for the network, by doing a mapping of the APN resources and their initial allocations. Furthermore, the centralized configuration can provide information and warnings to the administrator as to the behavior of the configuration that may not be obvious or intended from the configuration, before loading the configuration onto a production network.

Each of the sites 204-219 and primary NCN site 202 contains an APN appliance to provide APN functionality. The configuration of the APN 200, generally provides for connectivity between a site A, such as site 205, and for a site B, such as site 208, where the connectivity from the site A's perspective is site A→LWL→"WAN"→RWL→site B. The connectivity from the site B's perspective is site B→LWL→"WAN"→RWL→site A. The WAN 201 represents allocated WAN link resources and APN selected paths. In FIG. 2, a conduit between a site A and a site B is formed by use of the conduit sections 222 and 225 and is a virtual connection between the corresponding site A and site B. The conduit includes a collection of paths and encompasses a path from a LWL at site A→"WAN"→RWL at site B.

In one presently preferred embodiment, APN conduits exist between the NCN and, for example, sixteen APN client sites as shown in FIG. 2. It will be recognized that while sixteen APN sites are shown for purposes of illustration, a larger or smaller number of potential APN client sites may be suitably employed. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path, and the path with the lowest end to end time is chosen. If no path is in a path quality good state, then a path in a path quality bad state with the highest bandwidth is chosen.

FIG. 2 is an exemplary APN 200 with geographically diverse client sites in accordance with an embodiment of the present invention. The exemplary APN 200 is configured with sixteen client sites 204-219, which are generally located remotely from each other. A site would be defined as remote if the devices are physically in different locations such as different buildings, cities, states, time zones or countries. For example, the primary NCN 202 may be located in a company's headquarters location in a first country with client sites 204-209 and client sites 217-219 also located in the first country. The other client sites 210-216 may be located in a second country.

As used herein, an APN appliance is a device that contains APN node functionality according to software modules, such as the control plane module 156 and 158, the WAN ingress processor module 160 and 162, and the WAN egress processor module 164 and 166, as described in more detail above with reference to FIG. 1B. The sixteen client sites 204-219 are coupled by conduit sections 221-236, respectively, and the conduit sections may be connected together to provide a configurable virtual connection between two connected APN appliances at the client sites. It is noted that while sixteen client sites 204-219 are illustrated, an APN may support as many client sites as are required.

A dynamic conduit is a conduit created between APN clients when needed and can be removed when no longer needed, based on a configured first threshold and a configured second threshold. For example, client site 205 can be configured with two local WAN links, one from a first network provider and one from a second network provider. Multiple conduits may be connected to site 205 which may be configured to use one or both of the local WAN links. In an exemplary scenario where all of the conduits that are connected to site 205 use both local WAN links, then when usage for either local WAN link passes a configured second threshold, creation of a dynamic conduit can be triggered as described in further detail below.

The centralized monitor, analysis and management software in accordance with the present invention installed on a server associated with the APN provides several functions which are useful in managing an APN. For example, a monitoring service monitors events data and provides results in a tabular format. A number of additional services are briefly described in this section.

1. APN discovery—a single point identification of all nodes in an adaptive private network (APN) which supports addition and removal of nodes in the APN. A network topology is a listing of nodes and how they connect in the APN. A network configuration is a listing of resources required by the nodes and their connections in the APN, for which some or all of the resources may be specified by a user of the APN. The discovery process automatically learns a new topology of the APN, which may change due to addition or removal of nodes and connections, without relying on the network configuration information. The APN VM discovers the network topology by requesting information concerning the nodes and their connections from the NCN. Network statistics are based on a timeline that a user has selected to examine, without being tied to a particular configuration. If the APN has changed, objects, such as appliances and links, either show up or not show up in the network topology based on the time line that is selected.

2. APN configurability—Configuration changes can be made from APN VM based on latest configuration information obtained from the NCN. The application of the configuration changes are accomplished at the NCN and an updated configuration is activated from the NCN. This process of updating a configuration is separate from the discovery and statistics gathering process as described in more detail herein. Discovery and statistics gathering does not depend upon the current operating configuration. A web-based user interface (UI) is provided which allows the user to build and edit the APN configuration file which describes the APN. Since the APN configuration features change from release to release, it is important for the APN software to be able to know how to build a configuration that is correct for the software that is running, or going to run, on the APN. This capability is provided by having the APN system install an onboard configuration facility package corresponding to a given APNA software release.

This onboard configuration facility package is installed with the APN software and the package can be manually updated by the user.

3. APN time consistency of the present invention makes gathering of statistics about the APN robust in the face of time changes and time discrepancies across the APN. The APN system uses a strict rule that its view of time is correct and distrusts any APNA views of time. When statistics are received from an APNA, the timestamps in the statistics are remapped to correspond to the APN system's timeline at the server running the APN software of the invention, the APN server.

4. APN map generation—The UI provides support for creating network maps based on the sites and conduits in an APN configuration file. Users are allowed to upload their own map background, choose the sites that appear on the map, and customize the positioning of sites. Multiple maps can be generated from a single APN configuration file. The map functionality of the APN software focuses on placing the network data that the APN system has onto a background provided by the user.

5. APN graphing—Users can create customized sets of graphs based on statistics gathered from the APNAs. These graph sets allow the objects, measured data, and time range to be customized. Graph sets can be added to dashboards and saved for future use. The configuration data is not stored with the monitor data and is not directly used with the graph visualizations.

6. APN reports—Users can create reports that contain tables of data that are aggregated over a time range. The objects, measured data, and time range can be customized. Such reports can be added to dashboards and can be saved for future use. The configuration data is not stored with the monitor data and is not directly used with the report visualizations.

7. APN map monitoring—The network map created with a configuration can be used to monitor an APN. In this mode, the map colors the conduits to indicate the state of the conduits and paths and provides tooltips for the sites and conduits to display detailed statistical data. For example, color coding and line width provide visual cues to network performance. The amount of bandwidth is indicated by the width of a line and the colors indicate a state of a conduit. For example, a conduit illustrated in green indicates the conduit and paths are good, if illustrated in orange indicates the conduit and paths may be operative but in a bad state with relatively high loss rates, and if illustrated in red, indicates a conduit and paths are not usable. A dashed line with alternating colors indicates, for example, that the conduit and paths have different states. Arbitrary points in time can be selected to provide a visual representation of what the map looked like at that point in time. A time stepping mechanism is provided to allow the user to watch how the network has changed over time. The time stepping mechanism can be used to look at a series of data such as the conduit send/receive bandwidth and loss over time. This approach could be thought of similar to viewing a sequence of pictures where the subject matter is changing between picture frames. However, in this case the subject matter is data representing a conduit send/receive bandwidth value or loss counter for a given moment in time. The time stepping mechanism has an option that allows the data to be advanced automatically after every specifiable time, such as 1 second to the next moment in the time series when using the time stepping playback mode. The rate of playback is user configurable to allow the user to control how fast or slow the data moment is advanced. The user could automatically advance to the next 1 minute, 5 minutes, 15 minutes, . . . 24 hours to view a series of conduit send/receive bandwidth data values. The user could also single step forwards or backwards to view the data one moment at a time as well as jump to the first or last moment in time. These maps can be added to dashboards and can be saved for future use. The map visualizations make use of the configuration data to know what sites to display and the placement of the site within the map visualization.

Figure 3:
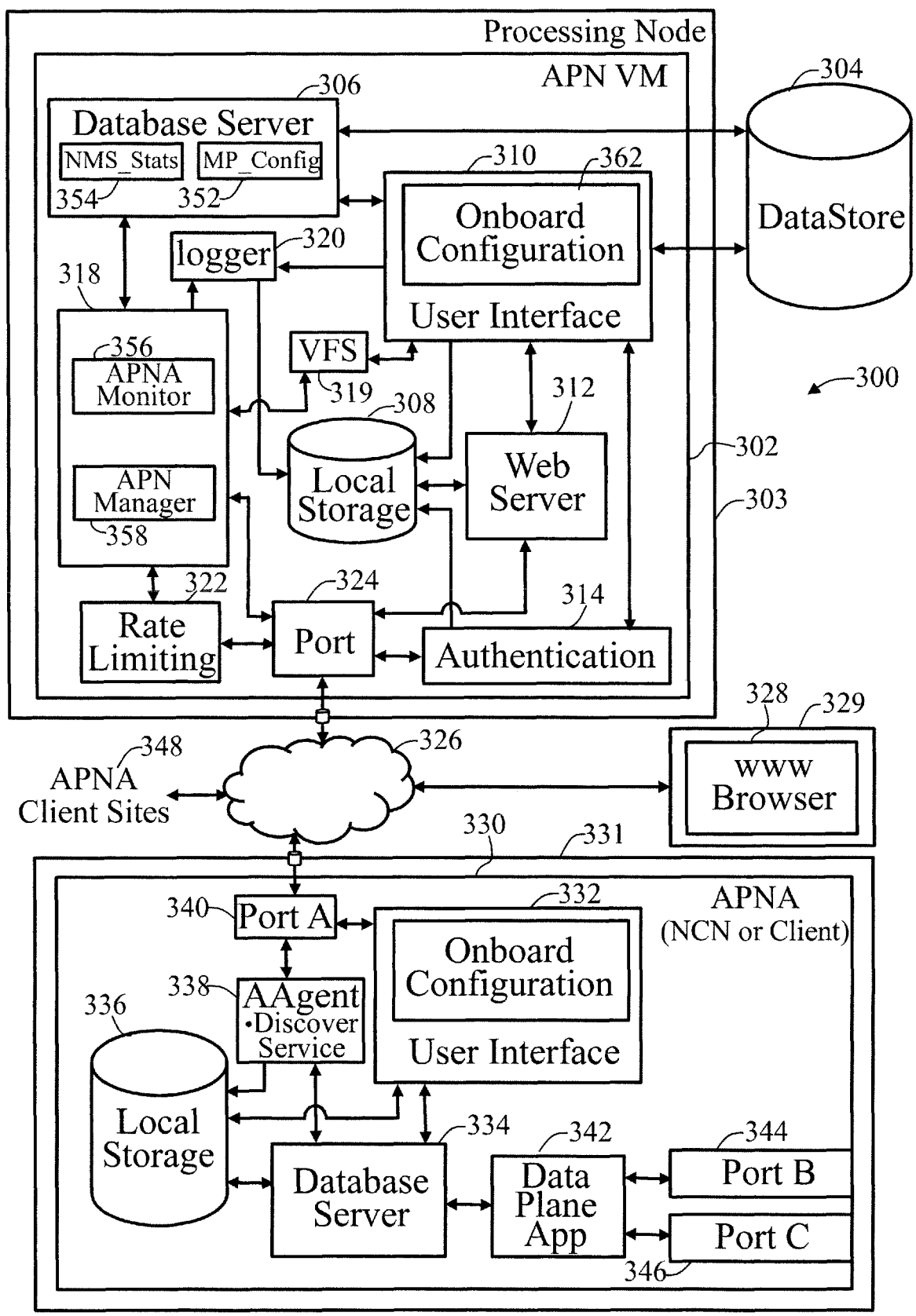
FIG. 3 illustrates an APN centralized management system that monitors, analyzes, and provides discovery, timestamp correlation, and database schema migration processes in accordance with an embodiment of the present invention.

FIG. 3 illustrates an APN centralized management system 300 that monitors, analyzes, and provides discovery, timestamp correlation, and database schema migration processes in accordance with an embodiment of the present invention. The APN centralized management system 300 comprises an APN virtual machine (VM) 302 according to the present invention as described herein and operating in the APN software server, such as a processing node 303, a datastore 304, an APNA 330 operating in a processing device 331, a world wide web (www) browser 328 operating in a processing system 329 which may be remote or locally accessible from the processing node 303 and processing device 329, and a plurality of APNA client sites 348.

In the APN, a network control node (NCN) is connected to the client nodes of the network, such as shown in FIG. 2 where the primary NCN 202 is connected to the sixteen client sites, also referred to as client nodes, 204-219. The APN also uses a management network as a separate logical or physical network that separates user data plane application traffic from management plane traffic. Each of the client nodes provides their management IP address to the NCN. The APN VM is able to use the NCN as a single point of access to obtain the management IP addresses of the clients and then directly poll the client nodes for additional information. In such a configuration, a client node does not have access to any other client's management IP address providing enhanced security for the APN. The APNA 330 may be a client node or, by ensuring security of the APN is not decreased or compromised, an NCN. Also, by ensuring security of the APN is not decreased or compromised, the processing node 303 may be an NCN or a client node of the APN. The centralized management system 300 discovers, via an active NCN, active, standby, and redundant devices during a discovery phase. Once the management IPs are learned, APN VM contacts the clients directly, as part of the discovery process. As part of a polling process, the centralized management system 300 is able to discover the network topology via the active NCN, such as determining which appliances are active in high availability (HA) systems as well as geographically diverse (GEO) sites.

The APN VM 302 includes a plurality of components including a database server 306, a local storage 308, an APN VM user interface (UI) 310, a web server 312, an authentication function 314, a monitor and manager 318, a virtual file system (VFS) 319, a logger 320, a rate limiting function 322, and a port driver 324. The port driver 324 connects to a hardware interface such as an Ethernet interface to a network 326, such as a management network. For security reasons, the same interface used to communicate with the appliances is also the interface used to access the APN software from the processing device 329 to prevent a backdoor into the network. A management network is a separate logical or physical network that separates user data plane application traffic from management plane traffic. The management network as used herein could be thought of as a private management network.

The APNA 330 comprises a plurality of components including an APNA UI 332, an APNA database server 334, an APNA local storage unit 336, a local server identified as an appliance agent (AAgent) 338, a port A driver 340 which is the management network interface port on the appliance, and a data plane application (app) 342, a port B driver 344, and a port C driver 346. The data plane app 342 is an executable program which performs all communication processing of latency, loss, and jitter calculations on packets received and transmitted on the APNA, such as NCN clock synchronization packets and data communication packets. On a periodic basis, in response to a poll from the APN VM 302, such as every minute, the data plane app 342 updates the APNA database server 334 with statistics about the traffic processed over that minute for storage in the APNA local storage 336. Upon request from the monitor and manager 318 on the APN VM 302, the AAgent 338 gathers statistics from the APNA database server 334 or from the APNA local storage 336. The AAgent 338 packages up the gathered statistics into a report package file and sends the report, using the port A driver 340, through the management network 326, to the monitor and manager 318. The monitor and manager 318 unpacks the report package and sends the unpacked data to the database server 306 for storage in the datastore 304.

On the APNA that operates as a network control node (NCN), such as APNA 330, a discovery service is provided by the AAgent 338 for use by APN VM 302. A user may use the discovery service to configure APN VM 302 by use of the management Internet protocol (IP) address of the NCN. The APN VM 302 uses the NCN management IP address to access the discovery service and obtain the complete list of APNAs in the network.

The APN VM 302 may suitably operate as a virtual machine on a hypervisor, such as VMware ESXi. The APN VM 302 stores and accesses statistics, information associated with network maps, and configuration data associated with the APNA 330 and APNA client sites 348 in the datastore 304. While the datastore 304 is shown outside of the APN VM 302, the APN centralized monitor, analysis and management system is not so limited. The location of the datastore 304 is configurable by a user. A base operating system, application software, and operation logs are stored in the local storage 308. A logger 320 records logs of operating events and takes care of rotating and pruning log files. A port driver 324, provides a communication interface such as an Ethernet interface, coupled between the APN VM 302 and the management network 326. A user may use a web browser 328 connected to the management network 326 to access the APN VM UI 310. The management network 326 is also connected to APNA client sites 348 and APNA 330 by means of management ports, such as port A driver 340. The network monitor portion of the monitor and manager 318 communicates with the AAgent 338 component of the APNA 330 and other agent components of the APNA client sites 348 to gather data and perform operations on the plurality of APNAs. The monitor and manager 318 uses a virtual file system (VFS) 319 to accept requests and communicate status to the rest of the user interface.

As an example, in a particular customer installation, an administrator installs the APN VM 302 on a processing node 303 running a hypervisor, such as VMWare ESXi 5.1, that, for example was already available on the customer's system. The administrator of the network uses the VM ware login facilities of the processing node 303 to determine the IP address of the APN VM instance, allocated by use of a dynamic host configuration protocol (DHCP) or uses a command line tool to set the IP address of the APN VM 302. The administrator then logins to the APN VM UI 310 with a web browser 328 and adds himself and other administrators as users of the APN VM 302. The administrator configures the domain name system (DNS), network time protocol (NTP), and time zone settings. The administrator instructs the APN VM 302 about the APN by configuring the IP address of the NCN, downloads security credentials certificates from the APN VM 302 and installs them on the NCN. The NCN automatically pushes those security credentials to all appliances in the APN. The APN VM 302 connects to the NCN, discovers the management IP addresses of all of the clients in the APN, connects to each of those appliances, and then displays to the administrator information about each appliance in the network, the APNA 330 and the APNA client sites 348. This information may suitably include the name of the appliance, management IP address, model number, serial number, software revision, registry timestamp, connectivity information, and polling status. A user enables polling of the network on the APN VM UI 310 and the APN VM 302 starts gathering statistics, starting with the earliest statistics available on the APNAs. The user does not need to set the polling period as a suitable default value, such as five minutes, is automatically used. The APN VM 302 displays graphs quickly from when the APN sites were initially installed and within two hours, for example, statistics from all of the appliances for an entire two week period are available in APN VM 302. The APN VM 302 systematically collects statistics starting with the oldest data and working towards the newest. The data is gathered at a specified pace so as not to cause performance problems on the management network or the APNAs using rate limiting module 322.

The APN VM UI 310 stores user session information in local storage 308 and stores configuration files and network maps in the datastore 304. The database server 306 comprises a management plane (MP) configuration (MP_Config) database file server utility 352 and a network management system (NMS) statistics (stats) file server utility 354 associated with corresponding databases in the datastore 304. Additionally, a third database, NMS_Events included in the datastore 304, stores event data from the APNAs and the NMS. The MP_Config database file server utility 352 accesses a MP_Config database in the datastore 304 that contains data related to the APN VM UI 310 and the monitoring and management of APNAs as provided by the monitor and manager 318. The monitor and manager 318 comprises an adaptive private network appliance (APNA) monitor 356 and an APN manager 358. The APNA monitor 356 periodically polls information from the APNA, NCN, or Client 330. The APNA monitor 356 includes capability to generate a statistics (stats) request and unpack a response to the stats request. The APNA monitor 356 also includes capability to export appliance settings to the NCN and one or more client appliances. Export in this context means transmitting appliance specific settings to individual appliances and applying those settings on the appliance.

The APN manager 358 includes support for managing an APN discovery service which interacts with agents on an active NCN, such as AAgent 338 of FIG. 3. The APN manager 358 includes the capability to import and export configuration information between the APN VM 302 and the active NCN. The APN manager 358 also downloads the active configuration file from clients which normally should be the same as the ones listed by the active NCN, unless a client cannot communicate with the active NCN via the WAN but the APN VM can connect to the client by means of the management network. The APN VM UI 310 maintains current and previous user settings, workspaces, and dashboards in the MP_Config database file server utility 352 or the database server 306.

The NMS statistics file server utility 354 accesses a NMS_Stats database in the datastore 304 that contains the statistical data gathered from the APNAs. The NMS_Stats database has tables for each type of object, such as specified below. By a specified convention, for each <object type>, a set of tables is specified, including: <object type>s, <object type>_minutes, and <object_type>_hours. The <object type>s table contains the names and id numbers for the objects. The <object type>_minutes tables contain the minute samples for the objects. Each row in an <object type>_minute table contains an object_id which corresponds to an id in the <object type>s table. Each row in an <object type>_minute table also contains an update_epoch_time_s column which reflects the network management system (NMS) time at the time the minute sample was taken on the appliance and generally not when statistics are gathered. The rest of the columns in the row reflect the counts of the data for the event that is being tracked for that minute. The update_epoch_time_s is the epoch at which a sample was gathered on an APNA relative to the system clock on the APN VM 302. An update_epoch_time_s entry reflects the network management system (NMS) time at the time the minute sample was taken. So, the update_epoch_time_s is a converted time from when the minute sample was taken on an appliance, since the time on the appliance is most likely not the same as the time on APN VM 302 which is the NMS time. The rest of the columns in the row also reflect the counts of various metrics important to the object for that minute. The various metrics include packet counters, byte counters, latency measurements, and the like. The count values are values of data gathered during that minute only and not a cumulative total since the start of the tracking. The <object type>_hours table is similar to <object type>_minutes except that it aggregates an hour's worth of data from the <object type> minutes table into a single row. This approach improves the APN VM UI 310 performance in cases where data across a large span of time needs to be aggregated. For example, performance of data transfers can be captured by tracking packets in each direction as they traverse every path of the WAN without using probes or injecting test data. An hour row in the <object type>_hours table represents data from the top of the hour to the end of that hour, for example, from the first <object type>_minutes row whose update_epoch_time_s is after 1:00 to the latest <object type>_minutes row whose update_epoch_time_s is before 2:00. A column in the <object type>_hours row shows how many minute samples are represented in that row. It is legal to have <object type>_hours rows with less than 60 minute samples since for the given hour the system may not have been collecting data for the entire hour, such as an hour interrupted by the data plane app 342 being disabled. For example, if a conduit or path is disabled, or if an entire site is offline, there will be minute intervals that contain no data. Thus, in the hours tables, this lack of data is represented by a count of minutes <60. It is also legal to have <object type>_hours rows with more than 60 minute samples, such as may occur in response to a high availability (HA) switchover to a backup processor device and have an overlap of minutes from both processor devices or as a result of a time change. For example, since data collection is done on minute samples, it is possible that a primary and a secondary HA devices could report overlapping minutes which could cause greater than 60 minute samples.

The limit_bandwidth_usage file limits how much bandwidth APN VM 302 will use when communicating with the APNAs. Note that this controls the aggregate bandwidth and is not a per connection setting. The unit used by this file is kbps. The default is 1000 (1 Mbps).

The poll_all_apnas file controls whether all appliances in the APN should be polled for stats.

The stat_poll_interval_min file controls how often APN VM 302 polls APNAs for stats. The default is five minutes. The unit used by this file is minutes.

APN VM 302 is configured to regularly request the latest network statistics from each appliance, such as statistics since a previous request was made. Also, if APN VM 302 is ever down or loses communication with a specific APN appliance (APNA), the APN VM 302 provides a "catching up" function that polls for stored statistics up to and including current operations on the specific APNA. The APN VM 302 maintains a list of APNAs that it is polling for statistics in a managed_appliances table of the MP_Config database file server utility 352 and associated MP_Config database in datastore 304.

Table 1 shows the expected size of the NMS_Stats database for networks of various sizes. A product definition specifies that 1 year of data in 2 TB of storage is requested to be supported. For customer networks in the field, these numbers show that the APN system, such as the APN centralized management system 300, can easily support that. For the largest networks, the data may exceed a 1 TB limit.

Figure 4A:
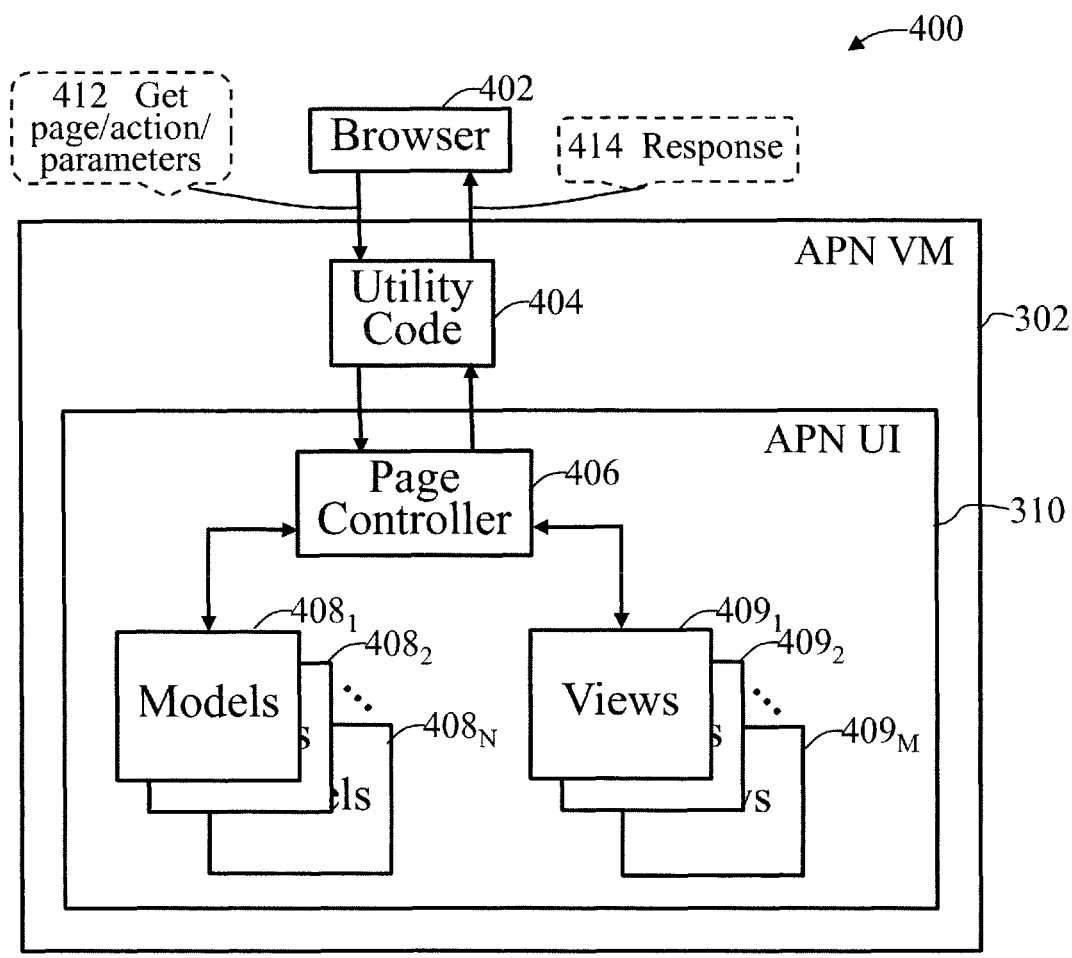
FIG. 4A illustrates an APN VM user interface (UI) request response flow in accordance with an embodiment of the present invention.

FIG. 4A illustrates an APN VM user interface (UI) request response flow 400 in accordance with an embodiment of the present invention. The APN VM system uses a web based user interface and in web applications, a web browser updates its view only based on a request to the server that holds the model view. In this web based environment, changes to the model view cannot be automatically pushed to the user interface and as a result the APN VM system regularly polls for updates and makes requests for updates as appropriate.

TABLE 1

| | Database size estimates | | | |
|---|---|---|---|---|
| Number of Client Sites | Number of Internet WAN Links | Number of Intranet WAN Links | Number of Conduits Per Site | DB size in 1 year (MB) |
| 128 | 3 | 1 | 8 | 1,340,375 |
| 128 | 3 | 1 | 16 | 2,457,726 |
| 100 | 3 | 1 | 3 | 501,717 |
| 40 | 3 | 1 | 3 | 201,043 |
| 256 | 3 | 1 | 8 | 2,680,157 |
| 256 | 3 | 1 | 16 | 4,914,859 |

When the web browser 402 tries to access the uniform resource locator (URL), utility code 404 parses the URL and deter mines which web page controller 406 should receive the request and what the action should be. A web page controller is considered one of the process application statistic thread instances 406. For example, an http GET request on dashboard/view/1 results in the view action being called on dashboardController with the parameter value of "1". When the selected web page controller receives the request, it responds to the request and calls an appropriate view $409_1$, $409_2$, ... $409_M$ to render a response. Dashboard is a "type", page one is an "instance", and it is possible to have multiple dashboards. Typically, handling the request involves dealing with one or more models $408_1$, $408_2$, ..., $408_N$. These models control access to how data is stored in a database in accordance with the present invention and manipulated. For example, the dashboard/view/1 request would use a dashboard model, which provides access to a data server database which holds the dashboard settings. The dashboard model provides a way to lookup the dashboard information based on a dashboard ID which is 1 in this example. After processing a lookup and setting variables as required to store the results of the lookup, the "view" is rendered by calling a dashboard/view file. In this example, the utility code 404 implicitly renders the page, but, depending on implementation, the utility code 404 would be explicitly called by the page controller 406 to render a view.

A web page controller 406 often interacts with several models to deal with the data related to the request and typically selects one view to use and render the requested data. In different APN systems, the number of models each web page controller uses and the number of views that a selected web page controller might use can vary between the different APN systems. The data flow in the APN VM UI 310 includes significant scripting within the browser. This scripting is used for many reasons including polling of data to provide live updates, improve interactivity, and validate the input. When a view renders a page, it provides a template to the browser JavaScript™ that is necessary for the proper operation of the page.

The adaptive private network (APN) manager 358 of FIG. 3 is responsible for all communications with the APNAs that the APN VM system is managing. The APN VM UI 310 can make the following requests to the APN manager 358, including:

Set management IP addresses of client nodes on an APN obtained from the NCN, as a single point of access for this information, in support of the APNA discovery and configuration import/export services. Configurations can be imported from an active NCN or from a local computer. Configurations can also be exported from APN VM to an active NCN or to a local computer. Such information may be set in response to a pop up dialog box asking for input from a user.

Set authentication credentials on the APN in support of exporting configuration information and polling data.

Test connectivity to the NCNs in support of an APNA discovery.

Set the statistic polling interval for an APN to control the frequency of gathering data from appliances in the APN.

Set the polling rate for each polling interval for an APN to control the data load on the management network used for polling data.

Enable/disable statistic polling for an APN to provide administrative control of statistics polling, for example.

Enable/disable statistic polling for a specific APNA site to provide administrative control of statistics polling, for example.

Discover appliances on an APN to provide administrative control of polling, for example.

Download configuration files or packages from a configuration database on APN VM to a local computer.

Download an onboard configuration facility from the APN VM 302 to a local PC.

Upload appliance settings file from a local PC to the APN VM 302.

Export appliance settings file from APN VM 302 to APNAs

When statistic polling is enabled for an APNA, the APN manager 358 requests stats from all of the appliances of the APN at the requested poll interval. A stats package is downloaded from each appliance in the network in response to the request to gather statistics and have the stats placed into the NMS_Stats database in datastore 304 under control of the NMS stats utility 354. The stats package and how it is processed is described in further detail below.

The APN manager 358 periodically polls the appliances in the network for information and updates the MP_Config database with the information that is gathered. This provides the APN VM UI 310 with updated information about which software versions are running on the APN, which appliances in a high availability (HA) configuration are active, and which appliance is serving as the active NCN, for geo-diverse NCN configurations, for example.

The APN manager 358 uses a virtual file system (VFS) 319 as shown in FIG. 3 to accept requests and communicate status to the rest of the user interface. Such a virtual file system 319 may be created by use of a VFS software module such as a file system in user space (FUSE) module, for example. Requests that come in through the VFS 319 are directed to the APN manager 358. The APN VM UI 310 queries the database server 306 to access data from the selected database in the datastore 304 to render the user interface.

To communicate with appliances, the APN manager 358 utilizes a middleware layer of software that provides a framework to build applications using remote procedure calls (RPCs). Such a middleware layer of software may be a software package such as Apache Thrift™, also referred to more simply as Thrift, which is an open-source middleware software hosted by developer Apache Software Foundation. Thrift, or an alternate middleware layer of software of similar capabilities, provides an interface that allows the APNA monitor 356 to send messages to and get responses from APN appliances (APNAs) with simple function calls. Such a Thrift interface or a Thrift-like interface is specified to support use of a secure sockets layer (SSL) cryptographic protocol as a transport mechanism so that all traffic over the management network 326 is encrypted.

The Thrift interface or Thrift-like interface is defined to support compatibility between the Thrift client and the Thrift server when the interface definition changes. For example, new members of structures and new parameters for methods can be defined without requiring both the client and server to be upgraded nearly simultaneously. This allows the APN software releases to be kept separate from APNA releases.

The APNAs each implement a Thrift server function locally and the appliance agent (AAgent) 338 uses the Thrift interface or Thrift-like interface. Each APNA software release has a file which defines the interface to APNAs running that release. The APNA software releases update the file in such a way that an APN VM release that can talk with an older APNA software revision is also able to talk with the new APNA software. The APN VM software release, in general, always includes the latest Thrift file or Thrift-like file from the latest APNA software release.

The APN manager 358 creates a virtual file system using FUSE or a VFS software module and specifies a path address to a server where the virtual file system is located. When the APN VM UI 310 needs to request an action from the APN manager 358, the APN VM UI 310 writes a value into the appropriate VFS file. For example, informing the APN manager 358 of the management IP address of the NCN is done by writing the IP address to the VFS file. This approach provides a very simple interface that anything from shell scripts to compiled code can use to interface to the APN manager 358.

To discover the APN, APN VM 302 uses Thrift to connect to the IP address that the user configured as the NCN address and issues the get_network_mgt_ip_addresses function call, which is one of the Thrift or Thrift-like function calls. This function is defined as:

list<ApplianceMgtIPInfo>get_network_mgt_ip_addresses ( ) throws (1: not_authenticated nologin)

This returns a list of ApplianceMgtIPInfo structures. Each structure for an APNA is defined as:

```
struct ApplianceMgtIPInfo {
    1: string site_name,
    2: i32 appliance_id,
    3: string mgt_ip_addr
}
```

This structure contains the name of the APNA site, the appliance ID, which specifies whether it is a primary NCN or a secondary NCN in a high availability (HA) pair, and the IP address of the APNA site. A secondary NCN is a geographically different client that can become the NCN if the primary dies, for example. The APN can be configured with an HA pair at a primary NCN site and a HA pair at a secondary NCN site. In this case, the secondary NCN site becomes the NCN when the primary NCN site, including both the active and standby HA pair, went down. At the secondary Site, there's also an active and standby appliance. So there are four appliances that may become the active NCN. The NCN receives this information from each APNA site in the APN using an APN Mem shared memory mechanism as described in U.S. Pat. Nos. 8,775,547 and 8,452,846 entitled "Adaptive Private Network Asynchronous Distributed Shared Memory Services". Specifically, regarding U.S. Pat. No. 8,452,846, see FIGS. 2A, 2B, 3, 4A-4D, 5A, and 5B, and associated description at col. 9, line 60 to col. 21, line 28 and at col. 21, line 57 to col. 24, line 8. Also, regarding high availability networks, see FIG. 6, and associated description at col. 21, lines 29-56. When a discovery 30 minute timer expires, a query is issued to the NCN using this api:

list<ApplianceMgtIPInfo>
get_network_mgt_ip_addresses( ) throws (1: not_authenticated nologin)

Once the list of appliances is obtained, then stats are retrieved from the list of appliances, since the NCN has the list of management IP which each appliance sends to the NCN in a clients_to_NCN_shared_MEM_table_entry. Users are also allowed to discover manually by activating a button on the APN discovery page if they don't want to wait for the timer.

Each APNA client pushes a clients_to_NCN_shared_MEM_table_entry structure to the NCN over a connecting conduit. This process may be configured to run at specific intervals, such as once a minute, in support of system operations. This table structure is defined as:

```
typedef struct clients_to_ncn_shared_mem_table_entry_s
{
    ipv4_addr    management_ip_addr;
    char         sw_version[50];
    char         hw_model[25];
    u_int8_t     appliance_id;    /* The appliance id of the sender of this message */
    u_int8_t     HA_appliance_id; /* The appliance id of the HA peer (if this site is HA)
or 0xff if not */
    ipv4_addr    HA_management_ip_addr; /* The management IP of the HA peer
*/
} __attribute__((packed)) CLIENTS_TO_NCN_SHARED_MEM_TABLE_ENTRY;
```

The standby HA appliance also pushes this structure to the active HA appliance. This gives the NCN the management IP addresses of every APNA in the network and the NCN uses this information to fulfill the get_network_mgt_ip_addresses request as used in the discovery process.

After APN VM 302 receives the list of ApplianceMgtIPInfo structures, the APN VM 302 adds this information into a managed_appliances table of the MP_Config database. It then cycles through all of the APNAs and tries to connect to them to get more information through the get_appliance_info Thrift or Thrift-like function call. This function is specified as:

ApplianceInfo get_appliance_info( ) throws (1:not_authenticated nologin) and the ApplianceInfo structure is defined as:

```
struct ApplianceInfo {
    1: string sw_revision, /* software version is displayed on the APN discovery page */
    2: bool service_enabled, /* If the service is disabled, the below fields may not be reliable */
    3: string site_name, /* NCN or client site's name */
    4: i32 appliance_id, /* This appliance id if a 1 means it is the secondary appliance at that site */
    5: string appliance_ name, /* Appliance name at a site is from the configuration */
    6: bool is_client,   /* Based on whether this site is currently a client */
    7: bool is_active_ncn, /* Does this appliance consider itself the active NCN */
    8: bool is_ha_forwarding, /* If a site has an HA appliance, the appliance id=1, then HA forwarding is enabled if the appliance is active */
    9: i64 registry_timestamp, /* When config.is compiled, this is shown on the APN discovery page */
    10: bool maybe_ncn,   /* True if this appliance could become an active NCN */
    11: list<string> remote_site_list, /* The site names that this site has conduits to */
    12: string model, /* appliance hardware model is displayed on the APN discovery page */
    13: string serial_number, /* appliance hardware serial number is displayed on the APN discovery page */
    14: string bios_version, /* Items 14-22 are infolination about the appliance displayed under Monitor->APN Inventory page */
    15: string bmc_version,
    16: string active_os,
    17: string backup_os,
    18: i64 sec_from_dump, /* seconds from last memory dump */
    19: i32 mem_size_gb, /* memory size in GB*/
    20: string hdd_type, /* HDD type */
    21: i32 hdd_size_gb, /* HDD size in GB */
    22: string hdd_model /* HDD model */
    23. string license_capacity
}
```

Selected parameters are used to populate columns in the managed_appliances table of the MP_Config database.

APN VM 302 makes use of a relational database management system, using a structured query language, such as MySql, to store configuration and statistics data. Structured query language databases require a strict schema to be defined before storing data. A database schema defines an organization of data that is stored in a particular database, such as storing data in tables governed by a predefined set of rules or constraints. As an example, a relational database schema defines tables, indexes, fields, types, relationships, synonyms, queues, views, packages, functions, procedures, triggers, sequences, materialized views, database links, directories, extensible markup language (XML) schemas, and may also include other items. In APN VM 302, the database specification defines how data is organized for statistics and events, as well as defining APN configurations.

A database schema is created when the APN VM software is initially installed. It is also likely that new installed versions of the APN VM software will require a different database schema to work properly. To prevent customer's from losing data, it is necessary to migrate the existing database using an existing schema into a new schema when the software is upgraded. To migrate a database means, in the context of the present invention, to move the data from a first database schema to at least a second database schema, wherein an intermediate set of table names, having a suffix "_archive", may be used to protect user data from data loss and prevent down time during particularly complex migrations. A typical database migration involves modifying the definitions of columns, indexes, keys or other parameters such that the data can be manipulated in place. If a new schema requires a structural change to a table, such as a change in a table engine or table partitions, the current table is renamed with the suffix "_archive", a new table is created with the same name as the original, and a separate process migrates the data at a later time.

The relational database management system allows developers to define a schema that is desired for a given release. Based on the schema definition, code is auto generated in the APN VM system to correctly configure the database on a particular APM VM 302 configuration instance. The auto generated code is designed to transform any database schema into the correct schema without losing data when upgrading the APN VM software. The code is auto-generated so that hand written code is not required to migrate the data into the new schema. The code is auto-generated at compile time and follows the process of FIG. 5A based on the schema, filling in the specified databases, tables and columns with migrated and updated information. Hand written code is not required to migrate the data into the new schema. A database migration does not depend on hard coded version numbers to determine how to migrate a database to the new schema.

One option for updating a configuration and a statistics database begins with archiving the databases when a software install is done. This archival process basically renames those databases to different names. The software install process then creates those databases from scratch. This process technically does not lose data as the data from before the software install is still on disk under the old names. Unfortunately, there is no guarantee that the new software will be able to properly read the archived database because the new software generally does not have a backward compatibility mode to support old schemas. This lack of backward compatibility means that some if not most software upgrades could cause the old data to become unreadable which is really no different than losing data.

A second option takes a different approach by making changes very carefully. There is no auto-generated code to setup these databases. If the databases do not exist when the system is started after new software is installed, then some specially created structured query language (SQL) files are run to create the databases. Generally, hand coded script also is created and runs to check for any columns that might be missing and if found adds them. This hand coded script is updated anytime a developer makes a change to the database schema.

Neither of these two options are desirable for the APN VM software system. The first option would cause data loss. The second option requires too much care on the part of developers and is prone to errors due to the hand coded script. It is expected that the APN VM software system and APN VM databases will go through many schema changes, so a different approach is advantageously employed. This new approach compares the active schema to the schema in a new version of software being installed and makes live changes to the database as discussed in further detail below. For example, such an approach automatically generates database migration scripts based on database schema definition and runs at software install time.

Each of the APN VM database schemas is defined in an extensible markup language (XML) file. The root tag is specified as a <db> tag which specifies the database this file defines. This tag has a name attribute which is set to the name of the database. There is also a type attribute that is set to "DB". Within the <db> tag, there is one or more <class> tags. A <class> tag has a name attribute which is the name of a table to create within this database. Also, within the <class> tag, there is one or more <var> tags. Since a <var> tag defines a column within the table, it supports many attributes. Table 2 lists a number of <var> attributes and Table 3 lists <var> types.

TABLE 2

Var attributes

| Attribute Name | Description |
|---|---|
| name | Column name |
| type | Defines the data type. Valid types are defined in Table 2. |
| autoincrement | If this attribute is present, then this column is marked as AUTO_INCREMENT in SQL. |
| not_null | If this attribute is present, then this column is marked as NOT NULL in SQL. |
| key | Must have the value PRI. This determines which columns make up the primary key. Multiple columns can be set with key = "PRI" and this causes the primary key to contain all of those columns in the order they appear in the file. |
| strlen | Must take an integer value. If type = STR, this determines the length of a string the database holds. |
| unique | If this attribute is present, then this column is marked as UNIQUE. |
| default | Must take a value. Determines the default value if no value is specified during an INSERT. A value of NULL inserts a NULL and not a string of "NULLs". |
| dbindex | If this attribute is present, then an index is created which indexes this column. |
| parent | Must take a string value which names another table in the database as parent. This forms a foreign key reference between this column and a column in the parent table. The column in the parent table is named with the parent attribute. If parent is set, then parent_id must be set. |
| parent_id | Must take a string value which names a column in the parent table. This forms a foreign key reference between this column and the parent_id column of the parent table. If parent_id is set, then parent must be set. |

TABLE 3

Var types

| Type | Description |
| --- | --- |
| STR | String. Maps to VARCHAR(100) in SQL. The length can be adjusted with the strlen attribute. |
| BOOL | Boolean. Maps to TINYINT(3) in SQL. |
| DATE | Date and time value. Maps to DATETIME in SQL. |
| UINT8 | Maps to TINYINT UNSIGNED in SQL |
| INT8 | Maps to TINYINT in SQL |
| UINT16 | Maps to SMALLINT UNSIGNED in SQL |
| INT16 | Maps to SMALLINT in SQL |
| UINT32 | Maps to INT UNSIGNED in SQL |
| INT32 | Maps to INT in SQL |
| UINT64 | Maps to BIGINT UNSIGNED in SQL |
| INT64 | Maps to BIGINT in SQL |
| BLOB | Maps to BLOB in SQL |
| MEDIUMBLOB | Maps to MEDIUMBLOB in SQL |
| LONGBLOB | Maps to LONGBLOB in SQL |
| TEXT | Maps to TEXT in SQL |
| IP | Represents an IP address. Maps to INT UNSIGNED in SQL. |

Within a <class> tag, there can be <array> tags that contain <var>, <index>, and <unique_key> tags within them. The <array> tags are treated just as if their parent was the <class> tag.

The <class> and <array> tags can have an <on_delete> as a child. This <on_delete> tag has two attributes, name and function. The purpose of on_delete is to allow some custom logic related to migrating data values to be inserted into the generated script. This migration of data values is useful in the case where a column is being removed, but some other column in the database needs to be updated based on the old column. The name value defines the column that is being deleted so this is a column that may exist in some older version of the database that does not exist in the current schema. A stylesheet db_gen_pl.xslt includes rules governing how different tags, attributes, listed in Tables 2 and 3, are to be handled. This file when applied on a corresponding XML file generates a PERL file to implement the process shown in FIG. 5A. This PERL function is passed one parameter, which is a database handle that can be used to issue queries. For example, an <on_delete> tag has a name field which specifies a column in the old schema that is to be deleted. The <on_delete> tag has a function field which specifies how to convert data from the column that is to be deleted to a new column. The function field specifies a PERL function which includes the required processing to do the conversion. This function is considered one of the helper functions. To remove an extra column which no longer exists in a new schema, the <on_delete> tag if defined causes the helper function specified in the <on_delete> tag to be called first in order to convert the data to the new schema. Then the ALTER TABLE function is called to delete the column. The return value of this function is not checked.

Custom logic may be added in many other places such as if there is a need to rename a class or do a transformation of the data in an existing column. This type of custom logic extension, for example, is the only time a developer would need to hand-write migration code.

An <index> tag can exist within a <class> or <array> and is used to define an index in the database across multiple columns. The tag must have a name attribute to name the index. Within the <index>, must be multiple <item> tags that have a name attribute which references column names of the table. The database then uses those columns in the order they appear within the <index> as indexes to the table.

The <unique_key> tag serves a similar function to the index function and has the same format as <index> with a name attribute and <item> children. The <unique_key> tag and the index function are similar in the way they are defined. This causes the database to form a unique key with the specified columns.

Other tags which can appear within the <db> tag are <user> and <insert>, for example. The <user> tag accepts a name, password, and grant attribute. These tags are used to add a user to the database and grant the user access to this database. If the user already exists in the database, then the user is granted permissions to access the database. In this case, the password will not be changed. The password attribute is only used when adding a new user to the database.

The <insert> tag is used to specify that certain rows should be inserted into the database. This insertion is generally done in cases such as using a table as an enum mapping that maps an integer, typically representing some state, to a string that is a human readable version of the state, but the integer can support other use cases. SQL insert commands that correspond to the <insert> are generated after all tables in the database have been fully created.

The <insert> tag requires the table attribute to be set to the name of the table to receive this data. The children of this tag are one or more <field> tags. The <field> must have a name attribute which specifies the name of a column and a value attribute which specifies the value of the column. The <insert> can also have a no_overwrite or noreplace attribute set, in which case neither attribute takes a value. With neither of these attributes set, the row is inserted with a REPLACE INTO SQL command. If no_overwrite is set, then the INSERT INTO SQL command is used. If noreplace is set, the INSERT IGNORE INTO command is used. It is not valid to have both no_overwrite and noreplace set nearly simultaneously.

The overall structure of a database definition takes a form such as:

```
<db name="APN_VM_DB" type="DB">
  <class name="foo_table">
    <var name="id" type="UINT32" autoincrement="" not_null="" key="PRI"/>
    <var name="col1" type="STR" strlen="50" default="NULL"/>
    <var name="col2" type="DATE" not_null=""/>
  </class>
  <class name="bar_table">
    <var name="id" type="UINT32" not_null="" key="PRI"/>
    <var name="col1" type="INT32" not_null=""/>
    <var name="col2" type="INT16" not_null=""/>
    <index name="col1_col2">
      <item name="col1"/>
      <item name="col2"/>
    </index>
  </class>
  <insert table="bar_table">
    <field name="id" value="1"/>
    <field name="col1" value="5"/>
    <field name="col2" value="9"/>
  </insert>
  <user name="dbuser" password="*kjlaieu0371704" grant="ALL"/>
</db>
```

The db_gen_pl.xslt stylesheet is used to convert a database definition into a PERL script which is used to create that database. If the database does not exist, then this PERL script creates the database from scratch. If the database does exist, then this script examines the existing schema and migrates it to a specified new schema without losing data.

An exemplary generated script accomplishes this creation and migration as described in more detail below.

The generated PERL script's logic follows the pseudo code listed below. The stylesheet uses the data in the database definition to generate the needed code, as shown below, and to also generate lists of expected columns and indexes so that the generated code can determine if the current existing schema matches the specified new schema.

```
# Emitted for the <db> tag
if (database does not exists)
{
   send CREATE DATABASE
}
# Treat $table as the current table. The stylesheet outputs this code for each
<class> and # <array> in the definition
if (table $table does not exist)
{
   send CREATE TABLE
}
else
{
   # table exists, but it might not be correct
   # treat $col as the current column. The stylesheet outputs this code for each
<var>
   # in the definition
   if (column $col does not exist in table $table)
   {
      send ALTER TABLE to add the column
   }
   else
   {
      # The column exists, but it might not be correct. Use the type,
autoincrement, and
      # not null attributes of <var>.
      if (type of column $col is incorrect ||
         auto_increment of column $col is incorrect ||
         nullable of column $col is incorrect)
      {
         send ALTER TABLE to update the column
      }
      # If the unique attribute is not set on the <var> this code is output
      if (index on column $col exists with Non_unique=0 set)
      {
         send ALTER TABLE to DROP INDEX on $col
      }
      # If the unique attribute is set on the <var> this code is output
      if (index on column $col with Non_unique=0 does not exist)
      {
         send ALTER TABLE to ADD UNIQUE INDEX on $col
      }
      if (index on column $col does not exist)
      {
         send ALTER TABLE to ADD UNIQUE INDEX on $col
      }
      # Delete any columns in the table that are not in the definition
      foreach column in $table
      {
         if (column is not defined for the current $table)
         {
            call any function specified for this column in <on_delete>
            send ALTER TABLE to DROP COLUMN on column
         }
      }
      # Make sure the primary key is correct
      if (current primary key of $table does not match the <var>s set with
key="PRI")
      {
         send ALTER TABLE to DROP PRIMARY KEY
         send ALTER TABLE to ADD PRIMARY KEY
      }
      # Treat $unique_key as the current secondary key to add. This code is
output for
      # each <unique_key> in the database definition
      if (index $unique_key does not exist for table $table)
      {
         send ALTER TABLE to ADD UNIQUE KEY
      } else
      {
         if (index $unique key does not have the correct columns)
         {
            send DROP INDEX on $unique_key
            send ALTER TABLE to ADD UNIQUE KEY
         }
```

```
    }
    # Make sure there are no unneeded indexes on $table
    foreach index in Stable
    {
        if ($index is not defined in the definition)
        {
            send ALTER TABLE to DROP INDEX
        }
    }
  }
}
# Treat $insert as the current <insert>. This code is emitted for each <insert>.
# The exact SQL to insert depends on the noreplace and no_overwrite attributes
if (noreplace is present)
{
    send INSERT IGNORE INTO to insert row
} else if (no_overwrite is present)
{
    send INSERT INTO to insert row
} else
{
    send REPLACE INTO to insert row
}
# Treat $user as the current <user>. This code is emitted for each <user>.
if ($user does not exist)
{
    send CREATE USER
}
send GRANT to grant $user the rights in the grant attribute
```

The generated script supports optional command line options, which includes is_migrate, total_steps, and steps_elapsed.

The is_migrate option provides a way to do a trial run of the generated script to determine how much work on the database needs to be done. On a large database, the ALTER TABLE commands, included in the is_migrate option, can take a long time to run so it is desirable to provide progress feedback to the user. By running the generated script with is_migrate set to 0, a default option, no actual changes to the database are made. The generated script simply counts how many rows would have to change in the database and returns that number.

If is_migrate is set to a non-zero value, then the generated script makes changes to the database. In that case, the total_steps and steps_elapsed options are useful. During a software update, for example, the code that performs the update reports status by writing the status into a storage file, such as titled maintenanceCurrentCompleted file. This file has a number of steps completed out of a total number required to complete in the form: <steps completed>/<total steps>. The total_steps option allows the generated script to correctly fill in the <total steps> parameter in the maintenanceCurrentCompleted file. Note that the total_steps option is the total number of steps in the software install, not just in the running of this generated script.

The generated script uses the steps_elapsed option to initialize a current number of steps the script itself has currently performed. Each time the generated script makes a change to a row in the database, the generated script increments steps_elapsed by one and updates the maintenance CurrentCompleted file.

Structured query language (SQL) databases allow the current schema to be queried, to find tables and to find characteristics of a table, such as number of columns. For example, ALTER TABLE commands are used to modify an existing table, and add and delete indexes associated with an existing table as needed. The SQL syntax described here is based on MySql, but this design is not limited to MySql capabilities and given the description herein, it would be straightforward to adjust a stylesheet to emit SQL that is compatible with other databases.

The APN VM databases are used to store configuration information, status information, and historical statistics and events that have been collected from all the appliances that APN VM 302 manages. These APN VM databases store data in tables in data partitions of the datastore 304 as described in more detail below.

The statistics database and events database are populated by the polling process in the APN VM 302. This polling process communicates with each of the managed appliances in the network requesting blocks of multiple minutes of data which are synchronized and correlated with the APN VM 302 time and stored in the APN VM databases. In addition to APN VM 302 time synchronization, a local APN VM identification (ID) is given to each of the objects, such as sites, conduits, paths, WAN links, and other network elements. The polling process manages the mappings of the APN VM IDs to objects and saves this in the APN VM 302 statistics and events database.

A statistics database, supporting the display APN VM application, stores and maintains statistics data from all managed appliances (APNAs) in the APN. For example, statistics data supporting APN VM displays for reports, graphs, and network maps are accessed from the statistics database.

One year of history for up to N sites, such as up to 256 sites, allows a user to view trends and zoom in and compare events from any time-period during the previous year of data.

The statistics database is unified with the naming convention identifying configuration information. By including this configuration information into the database, the database supports APN configuration updates without having to archive and restart the statistics database. The structure of the database, which includes object tables and minute/hour tables, allows the APN VM system to track new and updated objects across configuration updates because the table structures are independent of the configuration structure. In addition, the APN VM system internally maps data received from an APNA into the table structures allowing for differences in configuration structures to be handled without a change in the statistics database.

The APN VM 302 has a separate configuration database and a statistics database that links data according to the object IDs and names. As a result, an APN configuration update can change object names and IDs, which are viewed as entirely new objects in the APN VM system, resulting in the updates to the statistics database and configuration database. A new ID means a new object and statistics collected for the new object are bound to that new ID. No more statistics are collected for the old ID. But the old ID is still stored in the database, so all those statistics collected for that old ID can still be shown. For the APN VM 302, the databases adapt across configuration updates and APN VM processes continue with the new data allowing for data visualization across all APN VM time values stored in the databases.

As a result of configuration updates, new sites may be added and old ones removed, and associated conduits, paths, WAN links, and the like are also adjusted according to the change. The databases are designed to support these types of configuration updates by storing the naming and id information persistently for objects in a history storage of the databases, but only storing minute/hour data when the objects actually exist in the network. This approach allows for viewing of objects, and their associated information, that existed in the past, but do not exist in the current database, such as a removed or added site for example. By storing the naming and id information persistently, the original schema is kept for reference. The APN VM 302 maintains its own version of the configuration hierarchy which is separate from the actual APN configuration. The APN VM 302 infers objects from the statistics data reported by an appliance and creates its own configuration hierarchy of objects by using the object names reported by an APNA. This configuration hierarchy remains regardless of a current state of the APN configuration allowing network objects to be transient. In addition, objects in the APN VM 302 have direct knowledge of parentage. For example, a conduit object contains information on which two site objects it communicates between. This allows the APN VM 302 to differentiate objects with the same names but different parent objects.

By pre-calculating and storing aggregated hour data based on the minute data that is collected from the appliances allows improved performance of APN VM graphing, network map preparation and display, and updating of reports display screens. For example, when large time ranges are selected for display, having the aggregated hour data already available significantly reduces the time to retrieve and analyze information from the APN VM databases. Also, the events database is an aggregate of all events on every managed appliance in the APNA that APN VM 302 is managing. Various APN VM configurations, user/workspace information, and status information are stored in the APN VM databases.

When a new software version is installed, there may be new tables of statistics or new columns added in existing tables. APN VM 302 retains older data and display reports and graphs on objects and properties that are still valid in a current software release. APN VM 302's retention of the older data prevents loss of data that would normally be thrown away during new software installations.

Both the APN VM statistics and events databases are a combination of all the statistics and events from each of the appliances managed by the APN VM software. Blocks of data may be requested by APN VM 302 from each of the appliances based on time stamps. When these blocks are received, the timestamps are synchronized with the time on APN VM 302 and stored in the statistics and events databases as appropriate.

Tables of counters are defined for the statistics database. For each of the listed data types, generally three database tables are created. For example, a first table contains the id->name mapping, a second table contains a listing of synchronized <type>_minutes for various objects tracked, and a third table contains a listing of <type>_hours containing the aggregated and synchronized hour data from the managed appliances. In each of the "minutes" and "hours" tables, there are two UINT32 values which are an object_id and an update_epoch_time_s which together form a primary key for these tables. Having a short key provides for fast query performance. Specifics of the data fields include:

The Minutes/Hours tables have two UINT32 values which together form a primary key for the associated table
  id—the object identification (ID)
  update_epoch_time_s—the timestamp for the table identified sample
The ID and update_epoch time also provide an index and an inverse primary index to all the Minutes and Hours tables.
The update_epoch_time_s is the time at the end of the minute or hour in coordinated universal time (UTC)—as synchronized to the APN VM 302 system clock.
Hours tables have an additional field 'minutes' which represents the number of minutes of data in that hour—typically the latest hour does not contain the complete 60 minutes. Other hours can have less if that particular object was deleted due to a configuration update in the middle of an hour.
Additionally, these tables contain counters of packets and bytes for ingress and egress which are typically 64 bit integers and represent the counts of bytes or packets on that object for the minute ending at the update_epoch_time_s.
Several tables have a 'state', 'worst_state', or 'link_state' field which represents the worst state for that object during the minute, such as GOOD, BAD, DEAD, DISABLED, UNKNOWN.
Latency best one way time (BOWT)—the latency measured BOWT for a conduit or path
packets_ooo—the number of packets out of order (ooo) during the time sample
max_jitter—the maximum jitter value during the time sample
packets_lost—the number of packets lost during the time sample
mismatched packets—the number of mismatched packets
mismatched bytes—the number of mismatched bytes
  State time values—amount of time in milliseconds that the object was in each of the following states: UNKNOWN, DISABLED. DEAD, BAD, and GOOD
Maximum transmission unit (MTU)—the measured MTU when the time sample was made.
Congestion count—Whether or not the WAN link or usage is in the congestion state.
average permitted rate ingress/egress—runtime calculated permitted rate on a WAN Link or conduit usage on ingress or egress. This is dynamic and different from the fair rate seen in the configuration editor. This rate is the actual rate allocated to WAN link or conduit usage. This rate can change based on how much traffic is actually go through the WAN link for each conduit using that WAN link. This is different from the fair rate shown in configuration editor which is a fixed value
Objects and associated field definitions: Database Name: NMS_Stats
  sites
    UINT32: id
    UINT8: apn_id
    STR: name
  site_minutes
    UINT32: object_id
    UINT32: update_epoch_time_s
    UINT32: packets_ingress
    UINT64: bytes_ingress
    UINT64: control_bytes_ingress
    UINT32: control_packets_ingess
    UINT64: realtime_bytes_ingress
    UINT32: realtime_packets_ingress
    UINT64: interactive_bytes_ingress
    UINT32: interactive_packets_ingress
    UINT64: bulk_bytes_ingress
    UINT32: bulk_packets_ingress
    UINT32: packets_egress
    UINT64: bytes_egress
  site_hours
    UINT32: object_id
    UINT32: update_epoch_time_s
    UINT8: minutes
    UINT32: packets_ingress
    UINT64: bytes_ingress
    UINT64: control_bytes_ingress
    UINT64: control_packets_ingress
    UINT64: realtime_bytes_ingress
    UINT64: realtime_packets_ingress
    UINT64: interactive_bytes_ingress
    UINT64: interactive_packets_ingress
    UINT64: bulk_bytes_ingress
    UINT64: bulk_packets_ingress
    UINT64: packets_egress
    UINT64: bytes_egress
  ha_table
    UINT32: id
    UINT8: apn_id
    UINT32: site_id
    UINT32: update_epoch_time_s
    STR: site_name
    STR: state
    STR: peer_state
  ethernet_interfaces
    UINT32: id
    UINT8: apn_id
    UINT32: site_id
    STR: name
  ethernet_interface_minutes
    UINT32: object_id
    UINT32: update_epoch_time_s
    UINT32: packets_transmitted
    UINT64: bytes_transmitted
    UINT32: packets_received
    UINT64: bytes_received
    UINT32: errors
    UINT8: link_state
  ethernet_interface_hours
    UINT32: object_id
    UINT32: update_epoch_time_s
    UINT8: minutes
    UINT64: packets_transmitted
    UINT64: bytes_transmitted
    UINT64: packets_received
    UINT64: bytes_received
    UINT64: errors
    UINT8: link_state
  virtual_wan_links
    UINT32: id
    UINT8: apn_id
    UINT32: site_id
    STR: name
    UINT32: parent_id
    UINT8: container
  virtual_wan_link_minutes
    UINT32: object_id
    UINT32: update_epoch_time_s
    UINT32: packets_ingress
    UINT64: bytes_ingress
    UINT64: control_bytes_ingress
    UINT32: control_packets_ingress
    UINT64: realtime_bytes_ingress
    UINT32: realtime_packets_ingress
    UINT64: interactive_bytes_ingress
    UINT32: interactive_packets_ingress
    UINT64: bulk_bytes_ingress
    UINT32: bulk_packets_ingress
    UINT32: ave_permitted_kbps_ingress
    UINT16: latency_bowt_ms_egress
    UINT16: max_jitter_ms_egress
    UINT32: packets_egress
    UINT64: bytes_egress
    UINT32: packets_ooo_egress
    UINT32: packets_lost_egress
    UINT32: mismatched_packets_ingress
    UINT64: mismatched_bytes_ingress
    UINT32: mismatched_packets_egress
    UINT64: mismatched_bytes_egress
    UINT32: ave_permitted_kbps_egress
    UINT16: congestion_count_egress
  conduit_usages
    UINT32: id
    UINT8: apn_id
    UINT32: site_id
    UINT32: conduit_service_id
    UINT32: virtual_wan_link_id
    STR: name
  conduit_usage_minutes
    UINT32: object_id
    UINT32: update_epoch_time_s
    UINT32: packets_ingress
    UINT64: bytes_ingress
    UINT32: packets_dropped_ingress
    UINT64: bytes_dropped_ingress
    UINT64: bytes_saved_ingress
    UINT32: ave_permitted_kbps_ingress
    UINT32: packets_egress
    UINT64: bytes_egress
    UINT32: packets_dropped_egress
    UINT64: bytes_dropped_egress
    UINT64: bytes_saved_egress
    UINT32: mismatched_packets_egress
    UINT64: mismatched_bytes_egress
    UINT32: ave_permitted_kbps_egress
    UINT16: congestion_count_egress internet_usages
    UINT32: id
    UINT8: apn_id
    UINT32: site_id
    UINT32: internet_service_id
    UINT32: virtual_wan_link_id
    STR: name
internet_usage_minutes
    UINT32: object_id
    UINT32: update_epoch_time_s
    UINT32: packets_ingress
    UINT64: bytes_ingress
    UINT32: packets_dropped_ingress
    UINT64: bytes_dropped_ingress
    UINT32: packets_egress
    UINT64: bytes_egress
    UINT32: packets_dropped_egress
    UINT64: bytes_dropped_egress
intranet_usages
    UINT32: id
    UINT8: apn_id
    UINT32: site_id
    UINT32: intranet_service_id
    UINT32: virtual_wan_link_id
    STR: name
intranet_usage_minutes
    UINT32: object_id
    UINT32: update_epoch_time_s
    UINT32: packets_ingress
    UINT64: bytes_ingress
    UINT32: packets_dropped_ingress
    UINT64: bytes_dropped_ingress
    UINT32: mismatched_packets_ingress
    UINT64: mismatched_bytes_ingress
    UINT32: packets_egress
    UINT64: bytes_egress
    UINT32: packets_dropped_egress
    UINT64: bytes_dropped_egress
    UINT32: mismatched_packets_egress
    UINT64: mismatched_bytes_egress
virtual_wan_link_hours
    UINT32: object_id
    UINT32: update_epoch_time_s
    UINT8: minutes
    UINT64: packets_ingress
    UINT64: bytes_ingress
    UINT64: control_bytes_ingress
    UINT64: control_packets_ingress
    UINT64: realtime_bytes_ingress
    UINT64: realtime_packets_ingress
    UINT64: interactive_bytes_ingress
    UINT64: interactive_packets_ingress
    UINT64: bulk_bytes_ingress
    UINT64: bulk_packets_ingress
    UINT32: ave_permitted_kbps_ingress
    UINT16: latency_bowt_ms_egress
    UINT16: max_jitter_ms_egress
    UINT64: packets_egress
    UINT64: bytes_egress
    UINT64: packets_ooo_egress
    UINT64: packets_lost_egress
    UINT64: mismatched_packets_ingress
    UINT64: mismatched_bytes_ingress
    UINT64: mismatched_packets_egress
    UINT64: mismatched_bytes_egress
    UINT32: ave_permitted_kbps_egress
    UINT16: congestion_count_egress
conduit_usage_hours
    UINT32: object_id
    UINT32: update_epoch_time_s
    UINT8: minutes
    UINT64: packets_ingress
    UINT64: bytes_ingress
    UINT64: packets_dropped_ingress
    UINT64: bytes_dropped_ingress
    UINT64: bytes_saved_ingress
    UINT32: ave_permitted_kbps_ingress
    UINT64: packets_egress
    UINT64: bytes_egress
    UINT64: packets_dropped_egress
    UINT64: bytes_dropped_egress
    UINT64: bytes_saved_egress
    UINT64: mismatched_packets_egress
    UINT64: mismatched_bytes_egress
    UINT32: ave_permitted_kbps_egress
    UINT16: congestion_count_egress
internet_usage_hours
    UINT32: object_id
    UINT32: update_epoch_time_s
    UINT8: minutes
    UINT64: packets_ingress
    UINT64: bytes_ingress
    UINT64: packets_dropped_ingress
    UINT64: bytes_dropped_ingess
    UINT64: packets_egress
    UINT64: bytes_egress
    UINT64: packets_dropped_egress
    UINT64: bytes_dropped_egress
intranet_usage_hours
    UINT32: object_id
    UINT32: update_epoch_time_s
    UINT8: minutes
    UINT64: packets_ingress
    UINT64: bytes_ingress
    UINT64: packets_dropped_ingress
    UINT64: bytes_dropped_ingress
    UINT64: mismatched_packets_ingress
    UINT64: mismatched_bytes_ingress
    UINT64: packets_egress
    UINT64: bytes_egress
    UINT64: packets_dropped_egress
    UINT64: bytes_dropped_egress
    UINT64: mismatched_packets_egress
    UINT64: mismatched_bytes_egress
conduit_services
    UINT32: id
    UINT8: apn_id
    UINT32: from_site_id
    UINT32: to_site_id
    BOOL: dynamic_conduit
    STR: name
conduit_service_minutes
    UINT32: object_id
    UINT32: update_epoch_time_s
    UINT8: worst_state
    UINT32: packets_ingress
    UINT64: bytes_ingress
    UINT64: control_bytes_ingress
    UINT32: control_packets_ingress
    UINT64: realtime_bytes_ingress
    UINT32: realtime_packets_ingress
    UINT64: interactive_bytes_ingress
    UINT32: interactive_packets_ingress
    UINT64: bulk_bytes_ingress

```
    UINT32: bulk_packets_ingress
    UINT32: ave_permitted_kbps_ingress
    UINT16: latency_bowt_ms_egress
    UINT16: max_jitter_ms_egress
    UINT32: packets_egress
    UINT64: bytes_egress
    UINT32: mismatched_packets_egress
    UINT64: mismatched_bytes_egress
    UINT32: packets_ooo_egress
    UINT32: packets_lost_egress
    UINT16: state_unknown_time_ms
    UINT16: state_disabled_time_ms
    UINT16: state_dead_time_ms
    UINT16: state_bad_time_ms
    UINT16: state_good_time_ms
    UINT32: ave_permitted_kbps_egress
    UINT16: congestion_count_egress
application
    UINT32: id
    UINT8: apn_id
    UINT32: site_id
    UINT32: conduit_service_id
    STR: name
application_minutes
    UINT32: object_id
    UINT32: update_epoch_time_s
    UINT16: mos
    UINT16: worst_mos
wan_ingress_paths
    UINT32: id
    UINT8: apn_id
    UINT32: from_wan_link_id
    UINT32: to_wan_link_id
    UINT32: conduit_service_id
    STR: name
wan_ingress_path_minutes
    UINT32: object_id
    UINT32: update_epoch_time_s
    UINT8: state
    UINT16: MTU
    UINT16: src_port
    UINT16: dst_port
    UINT32: packets_ingress
    UINT64: bytes_ingress
    UINT64: control_bytes_ingress
    UINT32: control_packets_ingress
    UINT64: realtime_bytes_ingress
    UINT32: realtime_packets_ingress
    UINT64: interactive_bytes_ingress
    UINT32: interactive_packets_ingress
    UINT64: bulk_bytes_ingress
    UINT32: bulk_packets_ingress
    UINT16: state_unknown_time_ms
    UINT16: state_disabled_time_ms
    UINT16: state_dead_time_ms
    UINT16: state_bad_time_ms
    UINT16: state_good_time_ms
    UINT16: to_wan_link_egress_congestion_count
wan_egress_paths
    UINT32: id
    UINT8: apn_id
    UINT32: from_wan_link_id
    UINT32: to_wan_link_id
    UINT32: conduit_service_id
    STR: name
wan_egress_path_minutes
    UINT32: object_id
    UINT32: update_poch_time_s
    UINT8: state
    UINT16: src_port
    UINT16: dst_port
    UINT16: latency_bowt_ms_egress
    UINT16: jitter_ms_egress
    UINT32: packets_egress
    UINT64: bytes_egress
    UINT32: packets_ooo_egress
    UINT32: packets_lost_egress
    UINT32: mismatched_packets_egress
    UINT64: mismatched_bytes_egress
    UINT16: state_unknown_time_ms
    UINT16: state_disabled_time_ms
    UINT16: state_dead_time_ms
    UINT16: state_bad_time_ms
    UINT16: state_good_time_ms
    UINT16: to_wan_link_egress_congestion_count
classes
    UINT32: id
    UINT8: apn_id
    UINT32: site_id
    UINT32: conduit_service_id
    STR: type_name
    STR: name
class_minutes
    UINT32: object_id
    UINT32: update_epoch_time_s
    UINT32: wait_time_ms
    UINT64: bytes_pending
    UINT32: packets_pending
    UINT64: bytes_dropped
    UINT32: packets_dropped
    UINT64: bytes_sent
    UINT32: packets_sent
conduit_service_hours
    UINT32: object_id
    UINT32: update_epoch_time_s
    UINT8: minutes
    UINT8: worst_state
    UINT32: packets_ingress
    UINT64: bytes_ingress
    UINT64: control_bytes_ingress
    UINT64: control_packets_ingress
    UINT64: realtime_bytes_ingress
    UINT64: realtime_packets_ingress
    UINT64: interactive_bytes_ingress
    UINT64: interactive_packets_ingress
    UINT64: bulk_bytes_ingress
    UINT64: bulk_packets_ingress
    UINT32: ave_permitted_kbps_ingress
    UINT16: latency_bowt_ms_egress
    UINT16: max_jitter_ms_egress
    UINT64: packets_egress
    UINT64: bytes_egress
    UINT64: mismatched_packets_egress
    UINT64: mismatched_bytes_egress
    UINT64: packets_ooo_egress
    UINT64: packets_lost_egress
    UINT32: state_unknown_time_ms
    UINT32: state_disabled_time_ms
    UINT32: state_dead_time_ms
    UINT32: state_bad_time_ms
    UINT32: state_good_time_ms
```

```
    UINT32: ave_permitted_kbps_egress
    UINT16: congestion_count_egress
application_hours
    UINT32: object_id
    UINT32: update_epoch_time_s
    UINT8: minutes
    UINT16: mos
    UINT16: worst_mos
wan_ingress_path_hours
    UINT32: object_id
    UINT32: update_epoch_time_s
    UINT8: minutes
    UINT8: state
    UINT16: MTU
    UINT16: src_port
    UINT16: dst_port
    UINT64: packets_ingress
    UINT64: bytes_ingress
    UINT64: control_bytes_ingress
    UINT64: control_packets_ingress
    UINT64: realtime_bytes_ingress
    UINT64: realtime_packets_ingress
    UINT64: interactive_bytes_ingress
    UINT64: interactive_packets_ingress
    UINT64: bulk_bytes_ingress
    UINT64: bulk_packets_ingress
    UINT32: state_unknown_time_ms
    UINT32: state_disabled_time_ms
    UINT32: state_dead_time_ms
    UINT32: state_bad_time_ms
    UINT32: state_good_time_ms
    UINT16: to_wan_link_egress_congestion_count
wan_egress_path_hours
    UINT32: object_id
    UINT32: update_epoch_time_s
    UINT8: minutes
    UINT8: state
    UINT16: src_port
    UINT16: dst_port
    UINT16: latency_bowt_ms_egress
    UINT16: jitter_ms_egress
    UINT64: packets_egress
    UINT64: bytes_egress
    UINT64: packets_ooo_egress
    UINT64: packets_lost_egress
    UINT64: mismatched_packets_egress
    UINT64: mismatched_bytes_egress
    UINT32: state_unknown_time_ms
    UINT32: state_disabled_time_ms
    UINT32: state_dead_time_ms
    UINT32: state_bad_time_ms
    UINT32: state_good_time_ms
    UINT16: to_wan_link_egress_congestion_count
class_hours
    UINT32: object_id
    UINT32: update_epoch_time_s
    UINT8: minutes
    UINT32: wait_time_ms
    UINT64: bytes_pending
    UINT64: packets_pending
    UINT64: bytes_dropped
    UINT64: packets_dropped
    UINT64: bytes_sent
    UINT64: packets_sent
rule_applications
    UINT32: id
    UINT8: apn_id
    UINT32: site_id
    UINT32: service_instance
    STR: name
rule_application_minutes
    UINT32: object_id
    UINT32: update_epoch_time_s
    UINT32: packets_egress
    UINT64: bytes_egress
    UINT32: packets_lost_egress
    UINT16: total jitter_ms_egress
    UINT16: total_latency_bowt_ms_egress
    UINT16: min_latency_bowt_ms_egress
    UINT16: max_latency_bowt_ms_egress
rule_application_hours
    UINT32: object_id
    UINT32: update_epoch_time_s
    UINT8: minutes
    UINT64: packets_egress
    UINT64: bytes_egress
    UINT64: packets_lost_egress
    UINT16: total jitter_ms_egress
    UINT16: total_latency_bowt_ms_egress
    UINT16: min_latency_bowt_ms_egress
    UINT16: max_latency_bowt_ms_egress
intranet_services
    UINT32: id
    UINT8: apn_id
    UINT32: site_id
    STR: name
intranet_service_minutes
    UINT32: object_id
    UINT32: update_epoch_time_s
    UINT32: packets_ingress
    UINT64: bytes_ingress
    UINT32: packets_dropped_ingress
    UINT64: bytes_dropped_ingress
    UINT32: packets_egress
    UINT64: bytes_egress
    UINT32: packets_dropped_egress
    UINT64: bytes_dropped_egress
    UINT32: mismatched_packets_ingress
    UINT64: mismatched_bytes_ingress
    UINT32: mismatched_packets_egress
    UINT64: mismatched_bytes_egress
intranet_service_hours
    UINT32: object_id
    UINT32: update_epoch_time_s
    UINT8: minutes
    UINT64: packets_ingress
    UINT64: bytes_ingress
    UINT64: packets_dropped_ingress
    UINT64: bytes_dropped_ingress
    UINT64: packets_egress
    UINT64: bytes_egress
    UINT64: packets_dropped_egress
    UINT64: bytes_dropped_egress
    UINT64: mismatched_packets_ingress
    UINT64: mismatched_bytes_ingress
    UINT64: mismatched_packets_egress
    UINT64: mismatched_bytes_egress
internet_services
    UINT32: id
    UINT8: apn_id
    UINT32: site_id
    STR: name
``` internet_service_minutes
    UINT32: object_id
    UINT32: update_epoch_time_s
    UINT32: packets_ingress
    UINT64: bytes_ingress
    UINT32: packets_dropped_ingress
    UINT64: bytes_dropped_ingress
    UINT32: packets_egress
    UINT64: bytes_egress
    UINT32: packets_dropped_egress
    UINT64: bytes_dropped_egress
internet_service_hours
    UINT32: object_id
    UINT32: update_epoch_time_s
    UINT8: minutes
    UINT64: packets_ingress
    UINT64: bytes_ingress
    UINT64: packets_dropped_ingress
    UINT64: bytes_dropped_ingress
    UINT64: packets_egress
    UINT64: bytes_egress
    UINT64: packets_dropped_egress
    UINT64: bytes_dropped_egress
passthrough_services
    UINT32: id
    UINT8: apn_id
    UINT32: site_id
    STR: name
passthrough_service_minutes
    UINT32: object_id
    UINT32: update_epoch_time_s
    UINT32: packets_ingress
    UINT64: bytes_ingress
    UINT32: packets_dropped_ingress
    UINT64: bytes_dropped_ingress
    UINT32: packets_egress
    UINT64: bytes_egress
    UINT32: packets_dropped_egress
    UINT64: bytes_dropped_egress
passthrough_service_hours
    UINT32: object_id
    UINT32: update_epoch_time_s
    UINT8: minutes
    UINT64: packets_ingress
    UINT64: bytes_ingress
    UINT64: packets_dropped_ingress
    UINT64: bytes_dropped_ingress
    UINT64: packets_egress
    UINT64: bytes_egress
    UINT64: packets_dropped_egress
    UINT64: bytes_dropped_egress
NMS_System_Stats
    UINT16: id
    UINT8: apn_id
    UINT32: site_id
    STR: name
    UINT64: appliance_start_time_seconds
    UINT64: service_start_time_seconds
    config_updates
        UINT8: apn_id
        UINT32: update_epoch_time_s
        UINT8: appliance_id
        STR: new_software_name
        STR: new_config_name An extensible markup language (XML) file is used to define the tables for each type of object and columns (properties of the objects). For example, the minute and hour tables are defined as well as name→ID mapping tables which allow for storing a simple ID in the stats table and use the name for display purposes.

The following example shows the statistics database XML format for site tables limited to definition of the "sites", "site_minutes", and "site_hours" storage. Additional information is generally added for conduit, Internet, Intranet passthrough services, paths, WAN links, Ethernet interfaces, applications, classes, rule applications and the associated properties/attributes. Properties are associated with objects and attributes are associated with tags, for example. The schema of this XML file is an extension of the existing XML schema currently used on the appliance software to define the databases on that platform. It takes the appliance software and extends it by including an apn_id and site_id. Additional tags may be defined for the other statistics and counters required by APN VM 302.

```
<?xml version="1.0" encoding="UTF-8"?>
<db name="NMS_Stats" type="DB">
  <class name="NMS_System_Stats" type="CLASS">
    <var name="id" type="UINT16" not_null="YES" key="PRI" />
    <var name="apnid" type="UINT8" not_null="YES" index="1" dbindex="YES"/>
    <var name="siteid" type="UINT32" not_null="YES" index="2" dbindex="YES"/>
    <var name="name" not_null="YES" type="STR"/>
    <var name="appliance_start_time_seconds" not_null="YES" type="UINT64"/>
    <var name="service_start_time_seconds" not_null="YES" type="UINT64"/>
    <array name="config_updates" type="ARRAY">
      <var name="apnid" type="UINT8" not_null="YES" key="PRI"/>
      <var name="update_epoch_time_s" type="UINT32" not_null="YES" index="0" dbindex="YES" key="PRI"/>
      <var name="appliance_id" type="UINT8" not_null="YES" key="PRI"/>
      <var name="new_software_name" type="STR"/>
      <var name="new_config_name" type="STR"/>
    </array>
    <array name="sites" type="ARRAY">
      <var name="id" type="UINT32" not_null="YES" key="PRI"/>
      <var name="apnid" type="UINT8" not_null="YES" index="1" dbindex="YES"/>
      <var name="name" not_null="YES" type="STR"/>
    </array>
    <array name="site_minutes" type="ARRAY">
      <var name="object_id" type="UINT32" not_null="YES" key="PRI"
```

```
        dbindex="YES" parent="sites" parent_id="id"/>
      <var name="update_epoch_time_s" type="UINT32" not_null="YES"
  index="0" key="PRI"/>
      <var name="packets_ingress" type="UINT32"/>
      <var name="bytes_ingress" type="UINT64"/>
      <var name="control_bytes_ingress" type="UINT64"/>
      <var name="control_packets_ingress" type="UINT32"/>
      <var name="realtime_bytes_ingress" type="UINT64"/>
      <var name="realtime_packets_ingress" type="UINT32"/>
      <var name="interactive_bytes_ingress" type="UINT64"/>
      <var name="interactive_packets_ingress" type="UINT32"/>
      <var name="bulk_bytes_ ingress" type="UINT64"/>
      <var name="bulk_packets_ingress" type="UINT32"/>
      <var name="packets_egress" type="UINT32"/>
      <var name="bytes_egress" type="UINT64"/>
      <index name="inverse_primary">
        <item name="update_epoch_time_s"/>
        <item name="object_id"/>
      </index>
    </array>
    <array name="site_hours" type="ARRAY">
      <var name="object_id" type="UINT32" not_null="YES" key="PRI"
  dbindex="YES" parent="sites" parent_id="id"/>
      <var name="update_epoch_time_s" type="UINT32" not_null="YES"
  index="0" key="PRI"/>
      <var name="minutes" type="UINT8" not_null="YES"/>
      <var name="packets_ingress" type="UINT32"/>
      <var name="bytes_ingress" type="UINT64"/>
      <var name="control_bytes_ingress" type="UINT64"/>
      <var name="control_packets_ingress" type="UINT64"/>
      <var name="realtime_bytes_ingress" type="UINT64"/>
      <var name="realtime_packets_ingress" type="UINT64"/>
      <var name="interactive_bytes_ingress" type="UINT64"/>
      <var name="interactive_packets_ingress" type="UINT64"/>
      <var name="bulk_bytes_ingress" type="UINT64"/>
      <var name="bulk_packets_ingress" type="UINT64"/>
      <var name="packets_egress" type="UINT64"/>
      <var name="bytes_egress" type="UINT64"/>
      <index name="inverse_primary">
        <item name="update_epoch_time_s"/>
        <item name="object_id"/>
      </index>
    </array>
    .
    .
    .
  </class>
</db>
```

The XML format is defined with the following tags:
<db> Defines the database
Attributes:
  name—the name to be given the database
  type—Type of the "DB"
<class> Top-level 'class' object used to define a top-level table in the database. A 'class' entry corresponds to a database table that contains a single entry. For a table that contains multiple entries, an <array> tag is used (defined later).
Attributes
  name—the name to be given to the database table
  type—type of the object "CLASS"
<var>—tag to define a column in this table defined in the class
  name—name of the column
  type—data type—one of:
    IP—IP address
    BOOL—boolean—tinyint(3 bytes) 0 or 1
    INT8—8 bit integer
    UINT8—unsigned 8 bit integer
    INT16—16 bit integer
    UINT16—unsigned 16 bit integer
    INT32—32 bit integer
    UINT32—unsigned 32 bit integer
    INT64—64 bit integer
    UINT64—unsigned 64 bit integer
    DATE—DATETIME datatype
    BLOB—mysql BLOB datatype
    LONGBLOB—mysql LONGBLOB datatype
    KEY—mysql varchar(17 bytes)—used for config editor key
    STR—VARCHAR(strlen)
  strlen—length of a STR entry
  not_null—boolean "NO" or "YES" if NULL is allowed or not
  index—order of the index
  dbindex—order of the index in the database definition
  key—type of key—if it is a primary key: "PRI"
  parent—which table is the parent table for this one
  parent_id—the string defining the matching 'id' for this table in the parent table—used to correlate the data in a '<XXX>_minutes' or '<XXX>_hours' table with the associated 'XXX' table containing the names and IDs of the objects.
<array> Within the 'class'—this defines a table in the database—it maps to an array of data with an entry for each row in the table mapping to an entry in the 'array'

Attributes
    name—the name to be given to the database table
    type—type of the object "ARRAY"
<var>—tag to define a column in this table defined in the class
    name—name of the column
    type—data type—one of:
        IP—IP address
        BOOL—boolean—tinyint(3 bytes) 0 or 1
        INT8—8 bit integer
        UINT8—unsigned 8 bit integer
        INT16—16 hit integer
        UINT16—unsigned 16 bit integer
        INT32—32 bit integer
        UINT32—unsigned 32 bit integer
        INT64—64 bit integer
        UINT64—unsigned 64 bit integer
        DATE—DATETIME datatype
        BLOB—mysql BLOB datatype
        LONGBLOB—mysql LONGBLOB datatype
        KEY—mysql varchar(17 bytes)—used for config editor key
        STR—VARCHAR(strlen)
    strlen—length of a STR entry
    not_null—boolean "NO" or "YES" if NULL is allowed or not
    index—order of the index
    dbindex—boolean "YES" or "NO" whether this is in the database index or not.
    key—type of key—if it is a primary key: "PRI"
    parent—which table is the parent table for this one
    parent_id—the string defining the matching 'id' for this table in the parent table—used to correlate the data in a '<XXX>_minutes' or '<XXX>_hours' table with the associated 'XXX' table containing the names and IDs of the objects.
<index>—this key is used to define which columns in the table are used to define the index in the database.
    Attributes
        name—the name of the index
    <item>
        Attributes:
            name—the name of the column to add to the index
Additionally, there are optional tags which allow a user to insert data into the database at creation or update time via the .xml file. These optional tags include:

<insert>—this tag allows a user to insert data into a table
    table—the name of the table to insert the data into
    <field>—which field to insert data into
        name—the name of the column in the 'table' to insert
        value—the value to insert There are two main tables containing event information in the APN VM NMS_Events database. An events table contains all the raw events collected by APN VM 302 from all the managed appliances in the network. A timer queue table contains events that have occurred but haven't been in a state long enough to trigger a time setting. The timer queue table is used to filter out spurious events that toggle between states in a time period shorter than a specified time period. This is configurable for different object types including service, conduits, paths, WAN links, dynamic conduits.

Events
update_epoch_time_s
appliance_event_num
apn_id
site_id
appliance_id
object_name
object_id
object_type
severity
prev_state
curr_state
notify_processed
emailNotify
snmpNotify
syslogNotify
Timer Queue
update_epoch_time_s
appliance_event_num
apn_id
site_id
appliance_id
notif_type
object_name
object_id
object_type
severity
prev_state
curr_state The events XML format is similar to the stats XML format and uses many of the same constructs as the stats database. The XML tags used here are the same as above.

```
<?xml version="1.0" encoding="UTF-8"?>
<db name="NMS_Events" type="DB">
    <class name="NMS_System_Events" type="CLASS">
        <var name="id" type="UINT16" not_null="YES" key="PRI"/>
        <!-- NOTE: If display_order type field is changed, please update the MAX( )
values hardcoded for obj_type wan_ingress_path and wan_egress_path -->
        <!-- Also update the eventsController from the max( ) to new value -->
        <array name="obj_types" type="ARRAY">
            <var name="id" type="UINT32" not_null="YES" key="PRI"/>
            <var name="obj_string" type="STR" strlen="40"/>
            <var name="persistent" type="BOOL" strlen="40"/>
            <var name="display_order" type="UINT8" strlen="40"/>
        </array>
        <insert table="obj_types">
            <field name="id" value="0"/>
            <field name="obj_string" value="undefined"/>
            <field name="persistent" value="0"/>
            <field name="display_order" value="0"/>
        </insert>
        <insert table="obj_types">
            <field name="id" value="1"/>
            <field name="obj_string" value="service"/>
```

-continued

```xml
        <field name="persistent" value="1"/>
        <field name="display_order" value="1"/>
</insert>
<insert table="obj_types">
        <field name="id" value="2"/>
        <field name="obj_string" value="conduit"/>
        <field name="persistent" value="1"/>
        <field name="display_order" value="2"/>
</insert>
<insert table="obj_types">
        <field name="id" value="3"/>
        <field name="obj_string" value="wanlink"/>
        <field name="persistent" value="1"/>
        <field name="display_order" value="3"/>
</insert>
<insert table="obj_types">
        <field name="id" value="4"/>
        <field name="obj_string" value="path"/>
        <field name="persistent" value="1"/>
        <field name="display_order" value="4"/>
</insert>
<insert table="obj_types">
        <field name="id" value="5"/>
        <field name="obj_string" value="hard_disk"/>
        <field name="persistent" value="0"/>
        <field name="display_order" value="6"/>
</insert>
<insert table="obj_types">
        <field name="id" value="6"/>
        <field name="obj_string" value="fan"/>
        <field name="persistent" value="0"/>
        <field name="display_order" value="7"/>
</insert>
<insert table="obj_types">
        <field name="id" value="7"/>
        <field name="obj_string" value="apna"/>
        <field name="persistent" value="0"/>
        <field name="display_order" value="8"/>
</insert>
<insert table="obj_types">
        <field name="id" value="8"/>
        <field name="obj_string" value="apnuser"/>
        <field name="persistent" value="0"/>
        <field name="display_order" value="9"/>
</insert>
<insert table="obj_types">
        <field name="id" value="9"/>
        <field name="obj_string" value="power_supply"/>
        <field name="persistent" value="0"/>
        <field name="display_order" value="10"/>
</insert>
<insert table="obj_types">
        <field name="id" value="10"/>
        <field name="obj_string" value="config_update"/>
        <field name="persistent" value="0"/>
        <field name="display_order" value="11"/>
</insert>
<insert table="obj_types">
        <field name="id" value="11"/>
        <field name="obj_string" value="software_update"/>
        <field name="persistent" value="0"/>
        <field name="display_order" value="12"/>
</insert>
<insert table="obj_types">
        <field name="id" value="12"/>
        <field name="obj_string" value="proxy_arp"/>
        <field name="persistent" value="0"/>
        <field name="display_order" value="13"/>
</insert>
<insert table="obj_types">
        <field name="id" value="13"/>
        <field name="obj_string" value="ethernet"/>
        <field name="persistent" value="0"/>
        <field name="display_order" value="14"/>
</insert>
<insert table="obj_types">
        <field name="id" value="14"/>
        <field name="obj_string" value="watchdog"/>
        <field name="persistent" value="0"/>
```

```xml
        <field name="display_order" value="15"/>
    </insert>
    <insert table="obj_types">
        <field name="id" value="15"/>
        <field name="obj_string" value="dynamic_conduit"/>
        <field name="persistent" value="1"/>
        <field name="display_order" value="5"/>
    </insert>
    <insert table="obj_types">
        <field name="id" value="16"/>
        <field name="obj_string" value="wan_ingress_path"/>
        <field name="persistent" value="0"/>
        <field name="display_order" value="255"/>
    </insert>
    <insert table="obj_types">
        <field name="id" value="17"/>
        <field name="obj_string" value="wan_egress_path"/>
        <field name="persistent" value="0"/>
        <field name="display_order" value="255"/>
    </insert>
    <insert table="obj_types">
        <field name="id" value="18"/>
        <field name="obj_string" value="appliance_settings_update"/>
        <field name="persistent" value="0"/>
        <field name="display_order" value="18"/>
    </insert>
    <insert table="obj_types">
        <field name="id" value="19"/>
        <field name="obj_string" value="discovered_mtu"/>
        <field name="persistent" value="0"/>
        <field name="display_order" value="24"/>
    </insert>
    <!-- Object types for events generated by the APN VM system - in order
         to coexist with the appliance events, we move up out of the way
         and start at 1000 -->
    <insert table="obj_types">
        <field name="id" value="1000"/>
        <field name="obj_string" value="APN VM system"/>
        <field name="persistent" value="0"/>
        <field name="display_order" value="19"/>
    </insert>
    <insert table="obj_types">
        <field name="id" value="1001"/>
        <field name="obj_string" value="APN VM_user"/>
        <field name="persistent" value="0"/>
        <field name="display_order" value="20"/>
    </insert>
    <insert table="obj_types">
        <field name="id" value="1002"/>
        <field name="obj_string" value="APN VM storage"/>
        <field name="persistent" value="0"/>
        <field name="display_order" value="21"/>
    </insert>
    <insert table="obj_types">
        <field name="id" value="1003"/>
        <field name="obj_string" value="APN VMdatabase"/>
        <field name="persistent" value="0"/>
        <field name="display_order" value="22"/>
    </insert>
    <insert table="obj_types">
        <field name="id" value="1004"/>
        <field name="obj_string" value="connection_to_apna"/>
        <field name="persistent" value="0"/>
        <field name="display_order" value="23"/>
    </insert>
    <array name="event_states" type="ARRAY">
        <var name="id" type="UINT32" not_null="YES" key="PRI"/>
        <var name="event_string" type="STR" strlen="40"/>
    </array>
    <insert table="event_states">
        <field name="id" value="0"/>
        <field name="event_string" value="UNDEFINED"/>
    </insert>
    <insert table="event_states">
        <field name="id" value="1"/>
        <field name="event_string" value="DISABLED"/>
    </insert>
    <insert table="event_states">
        <field name="id" value="2"/>
```

-continued

```
        <field name="event_string" value="DEAD"/>
    </insert>
    <insert table="event_states">
        <field name="id" value="3"/>
        <field name="event_string" value="BAD"/>
    </insert>
    <insert table="event_states">
        <field name="id" value="4"/>
        <field name="event_string" value="GOOD"/>
    </insert>
    <insert table="event_states">
        <field name="id" value="5"/>
        <field name="event_string" value="WARNING"/>
    </insert>
    <insert table="event_states">
        <field name="id" value="6"/>
        <field name="event_string" value="ERROR"/>
    </insert>
    <insert table="event_states">
        <field name="id" value="7"/>
        <field name="event_string" value="RESTART"/>
    </insert>
    <insert table="event_states">
        <field name="id" value="8"/>
        <field name="event_string" value="REBOOT"/>
    </insert>
    <insert table="event_states">
        <field name="id" value="9"/>
        <field name="event_string" value="ACTIVE"/>
    <insert>
    <insert table="event_states">
        <field name="id" value="10"/>
        <field name="event_string" value="STANDBY"/>
    </insert>
    <insert table="event_states">
        <field name="id" value="11"/>
        <field name="event_string" value="SUCCESS"/>
    </insert>
    <insert table="event_states">
        <field name="id" value="12"/>
        <field name="event_string" value="FAILURE"/>
    </insert>
    <insert table="event_states">
        <field name="id" value="13"/>
        <field name="event_string" value="ENABLED"/>
    </insert>
    <insert table="event_states">
        <field name="id" value="14"/>
        <field name="event_string" value="PENDING"/>
    </insert>
    <insert table="event_states">
        <field name="id" value="15"/>
        <field name="event_string" value="CREATED"/>
    </insert>
    <insert table="event_states">
        <field name="id" value="16"/>
        <field name="event_string" value="REMOVED"/>
    </insert>
    <insert table="event_states">
        <field name="id" value="17"/>
        <field name="event_string" value="SYSTEM_ERROR"/>
    </insert>
    <insert table="event_states">
        <field name="id" value="18"/>
        <field name="event_string" value="ACTIVE_HA"/>
    </insert>
    <insert table="event_states">
        <field name="id" value="19"/>
        <field name="event_string" value="STANDBY_HA"/>
    </insert>
    <insert table="event_states">
        <field name="id" value="20"/>
        <field name="event_string" value="ACTIVE_NCN"/>
    </insert>
    <insert table="event_states">
        <field name="id" value="21"/>
        <field name="event_string" value="STANDBY_NCN"/>
    </insert>
    <!--APN VM specific event states - starting at 1000 to not
```

```
            interfere with the appliance event states -->
        <insert table="event_states">
            <field name="id" value="1000"/>
            <field name="event_string" value="THRESHOLD_OK"/>
        </insert>
        <insert table="event_states">
            <field name="id
            <field name="event_string" value="THRESHOLD_EXCEEDED"/>
        </insert>
        <insert table="event_states">
            <field name="id" value="1002"!>
            <field name="event_string" value="POLLING_THRESHOLD_OK"/>
        </insert>
        <insert table="event_states">
            <field name="id" value="1003"/>
            <field name="event_string"
value="POLLING_THRESHOLD_EXCEEDED"/>
        </insert>
        <array name="severities" type="ARRAY">
            <var name="id" type="U1NT32" not_null="YES" key="PRI"/>
            <var name="severity_string" type="STR" strlen="40"/>
        </array>
        <insert table="severities">
            <field name="id" value="0"/>
            <field name="severity_string" value="DEBUG"/>
        </insert>
        <insert table="severities">
            <field name="id" value="1"/>
            <field name="severity_string" value="INFO"/>
        </insert>
        <insert table="severities">
            <field name="id" value="2"/>
            <field name="severity_string" value="NOTICE"/>
        </insert>
        <insert table="severities">
            <field name="id" value="3"/>
            <field name="severity_string" value="WARNING"/>
        </insert>
        <insert table="severities">
            <field name="id" value="4"/>
            <field name="severity_string" value="ERROR"/>
        </insert>
        <insert table="severities">
            <field name="id" value="5"/>
            <field name="severity_string" value="CRITICAL"/>
        </insert>
        <insert table="severities">
            <field name="id" value="6"/>
            <field name="severity_string" value="ALERT"/>
        </insert>
        <insert table="severities">
            <field name="id" value="7"/>
            <field name="severity_string" value="EMERGENCY"/>
        </insert>
        <array name="events" type="ARRAY">
            <var name="update_epoch time_s" type="UINT64" not_null="YES"
key="PRI" index="1" dbindex="YES"/>
            <var name="appliance_event_num" type="UINT64" not_null="YES"
key="PRI" index="2" dbindex="YES"/>
            <var name="apn_id" type="UINT32" not_null="YES" key="PRI"
index="3" dbindex="YES"/>
            <var name="site_id" type="UINT32" not_null="YES" key="PRI"
index="4" dbindex="YES"/>
            <var name="appliance_id" type="UINT32" not_null="YES"key="PRI"
index="5" dbindex="YES"/>
            <var name="object_name" not_null="YES" type="STR"/>
            <var name="object_id" not_null="YES" type="UINT32"/>
            <var name="object_type" not_null="YES" type="UINT32"/>
            <var name="severity" not_null="YES" type="UINT32"
dbindex="YES"/>
            <var name="prev_state" type="UINT32"/>
            <var name="curr_state" not_null="YES" type="UINT32"/>
            <var name="notify_processed" not_null="YES" type="BOOL"
dbindex="YES"/>
            <var name="emailNotify" not_null="YES" type="BOOL"
dbindex="YES"/>
            <var name="snmpNotify" not_null="YES" type="BOOL"
dbindex="YES"/>
            <var name="syslogNotify" not_null="YES" type="BOOL"
```

```
            dbindex="YES"/>
        </array>
        <array name="last_event_time" type="ARRAY">
            <var name="id" type="UINT64" not_null="YES" key="PRI" index="1"
dbindex="YES"/>
            <var name="last_event_time" type="UINT64" not_null="YES"/>
        </array>
        <insert table="last_event_time">
            <field name="id" value="0"/>
            <field name="last_event_time" value="0"/>
        </insert>
        <array name="timer_q" type="ARRAY">
            <var name="update_epoch_time_s" type="UINT64" not_null="YES"
key="PRI" index="1" dbindex="YES"/>
            <var name="appliance_event_num" type="UINT64" not_null="YES"
key="PRI" index="2" dbindex="YES"/>
            <var name="apn_id" type="UINT32" not_null="YES" key="PRI"
index="3" dbindex="YES"/>
            <var name="site_id" type="UINT32" not_null="YES" key="PRI"
index="4" dbindex="YES"/>
            <var name="appliance_id" type="UINT32" not_null="YES" key="PRI"
index="5" dbindex="YES"/>
            <var name="notif_type" type="STR" not_null="YES" key="PRI"
index="6" dbindex="YES"/>
            <var name="object_name" not_null="YES"type="STR"/>
            <var name="object_id" not_null="YES" type="UINT32"/>
            <var name="object_type" not_null="YES" type="UINT32"/>
            <var name="severity" not_null="YES" type="UINT32"
dbindex="YES"/>
            <var name="prev_state" type="UINT32"/>
            <var name="curr_state" not_null="YES" type="UINT32"/>
        </array>
        <array name="event_histogram_minutes" type="ARRAY">
            <var name="update_epoch_time_s" type="UINT64" not_null="YES"
key="PRI"/>
            <var name="notices" type="UINT32" not_null="YES" default="0"/>
            <var name="warnings" type="UINT32" not_null="YES" default="0"/>
            <var name="errors" type="UINT32" not_null="YES" default="0"/>
        </array>
    </class>
    <user name="XYZ"
password="*6E6DC1CB55CE03F63581205EB3826C13EC1981A2" grant="ALL" />
</db>
```

An extensible stylesheet language transformations (XSLT) template file is used along with the XML files defined in the previous discussion to generate PERL scripts which are then run during installation and update operations to create or modify the database schemas. The scripts that are generated based on these XSLT templates fulfill an APN VM 302 requirement to support automatic migration and schema updates on software updates.

Figure 4B:
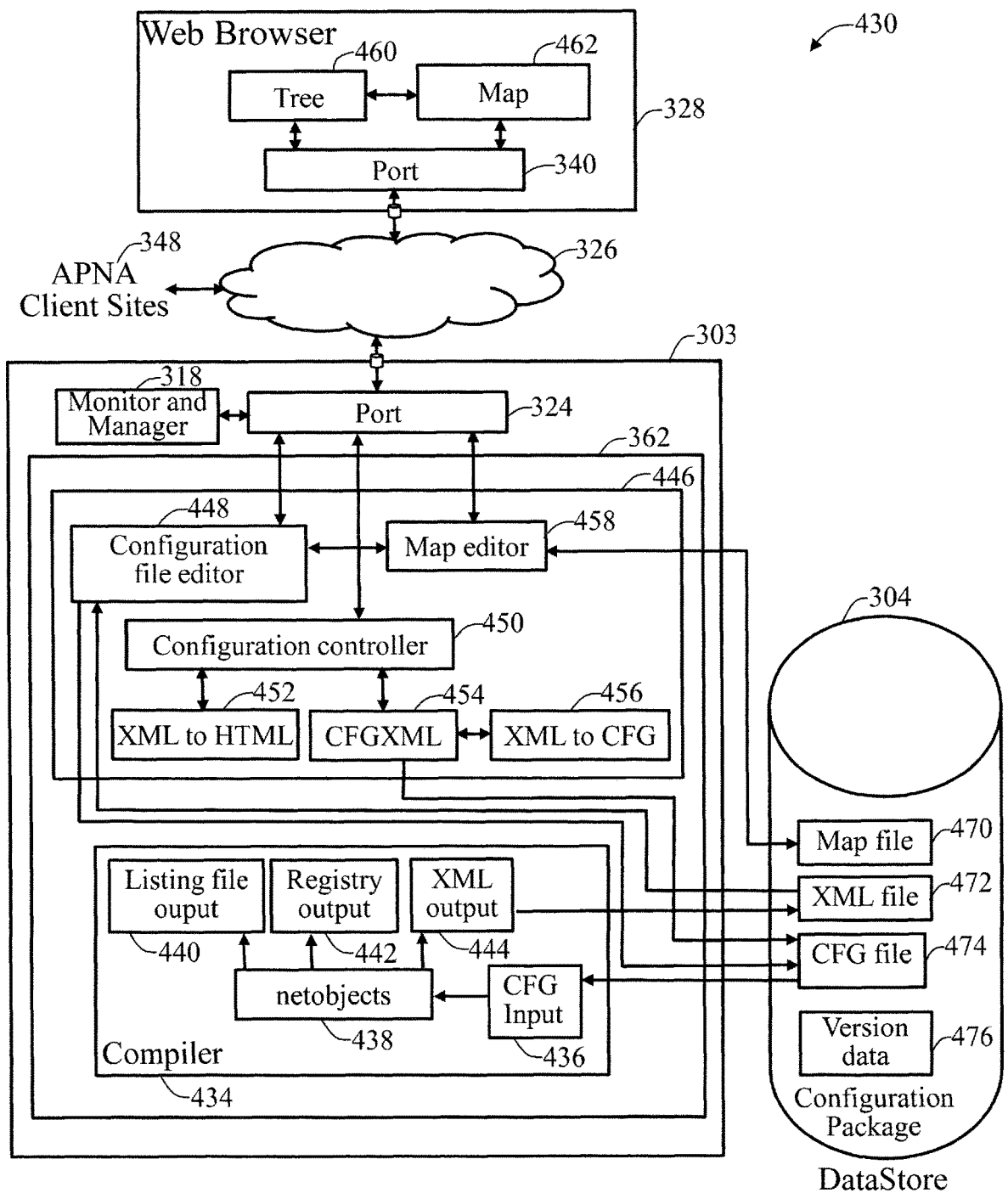
FIG. 4B illustrates an onboard configuration system according to an embodiment of the present invention.

FIG. 4B illustrates an onboard configuration system 430 according to an embodiment of the present invention. The onboard configuration system 430 comprises an onboard configuration facility package 362, a management network 326, and a web browser 328. Elements appropriate for facilitating the onboard configuration system 430 are described herein but the elements are not limited to this description, such as illustrated in FIG. 3. The onboard configuration facility package 362, included in processing node 303, comprises a compiler 434 and web backend code 446. The compiler comprises a configuration (CFG) input 436, a netobject facility 438, a listing file output 440, a registry output 442, and an extensible markup language (XML) output 444. The web backend code 446 comprises a configuration file editor 448, a configuration controller 450, an XML to HTML generator 452, a configuration XML mapper (CFGXML) 454, an XML to CFG generator 456, and a map editor 458. The web browser 328 comprises a tree facility 460 and a map facility 462. The datastore 304 comprises a map file 470, an XML file 472, a CFG file 474, and a version data file 476. The CFG Input 436 is a block capable of reading and interpreting the structure of a CFG file. The configuration controller 450 is an APN VM block that handles all interactions between the APN VM 302 and internet browsers. The XML to CFG generator 456 is a process which converts the APN VM readable XML configuration to a compiler readable text configuration. The XML to HTML generator 452 is a process which converts the APN VM readable XML configuration to an Internet browser readable HTML format. The map block 462 is an XML file that describes the coordinates of sites on a canvas or Cartesian plane and the display settings for the map. The XML file 472 is a text file containing an XML representation of an APN configuration. The CFG file 474 is a text file containing a regular language representation of an APN configuration. The version data block 476 is a text file containing comma separated values representing the edit history of a CFG file. The tree block 460 couples with the map block 462. An onboard configuration editor is a component of the onboard configuration facility that represents an APN configuration as a hypertext markup language (HTML) tree and accepts changes to the APN configuration from a user. The onboard configuration editor is closely coupled with a configuration compiler to make changes to the configuration HTML tree. The onboard configuration editor also integrates with a network map facility to display site nodes in a map representation of the APN.

APN VM 302 provides a web-based APN VM UI 310 that allows APN configuration packages to be created and modified. This UI provides the ability to create and edit the APN configuration CFG file 474 as well as any network maps stored in the map file 470 that correspond to the stored CFG files. The onboard configuration facility gets packaged so that it can run on an APNA or the APN VM 302.

The compiler 434 takes an APN configuration file and converts it into a representation of the object model that the onboard configuration file editor 448 can work with. The network map editor 458 integrates with the onboard configuration file editor 448 to allow site nodes from the editor to be displayed and positioned on the map.

The onboard configuration file editor 448 leverages the Java™ compiler software to validate a configuration and create output files, including listing file output 440, registry output 442, and XML output 444 that provides representations of the object model.

There are two major components of the UI, the code, such as JavaScript™ code, for example, that runs in the browser, such as the browser 328, and the Web backend code 446 that runs on the server, such as the processing node 303. The JavaScript™ code is responsible for handling graph tree navigation and generating requests to the server running the APN VM 302 when a user wants to view or modify items in the configuration. The Web backend code 446 takes requests from the browser, makes necessary updates to the configuration file, and interfaces to the compiler to get the updated object model. In the case where network objects are renamed, those name changes may need to be propagated to other objects. For example, if a site name changes, then any remote_site_name attributes of add conduit_service statements that reference the old site name must change. The CFGXML component 454 accepts a rename operation, configured with information concerning which renames necessitate changes in other parameters of the configuration, and regenerates the names of dependent objects.

The compiler 434 has the current network's listing of netobjects in the netobjects facility 438 that it has always had. The netobjects hold the actual objects in the configuration and the relations between them. It also has the per object and network wide audits. For each object changed, an audit is used to verify if the change is valid. For example, if a route with service type as Internet is added, but at local site the Internet service is not configured, then an audit error would occur. In another example, regarding enabling a dynamic conduit on a client site, but in the network, no site enabled as an intermediate site, then the dynamic conduit cannot be created and an audit error also would occur.

The compiler 434 has the capability to generate registries from the registry output 442 and the listing file from the listing file output 440. The registry generator in the registry output 442 is used in change management on the APNA. Each APNA receives a registry, from registry output 442, that is generated by the compiler 434. An XML output 444 is also added to the compiler. The XML output 444 allows the configuration file to be processed by the compiler and have the netobjects model output as XML to transfer to the UI to provide an easy way to view and process all of the objects that are generated in the configuration.

The onboard configuration facility provides an XML output format. The compiler 434 has always supported outputting registries and listing files. This is implemented by having individual netobjects output in a relevant format and then walking through all the stored netobjects for the proper output. In the current compiler 434, a limited amount of XML output is provided for certain objects so that the APN VM database understands what appliances and models are in the configuration. The APN VM architecture requires the compiler 434 to have an XML output 444 that provides a complete representation of the netobjects. In one suitable implementation of the XML output 444, netobjects store properties that contain a hash data structure which indexes the properties by name. This approach allows netobjects to be handled in generic way when processing the XML output.

Figure 5A:
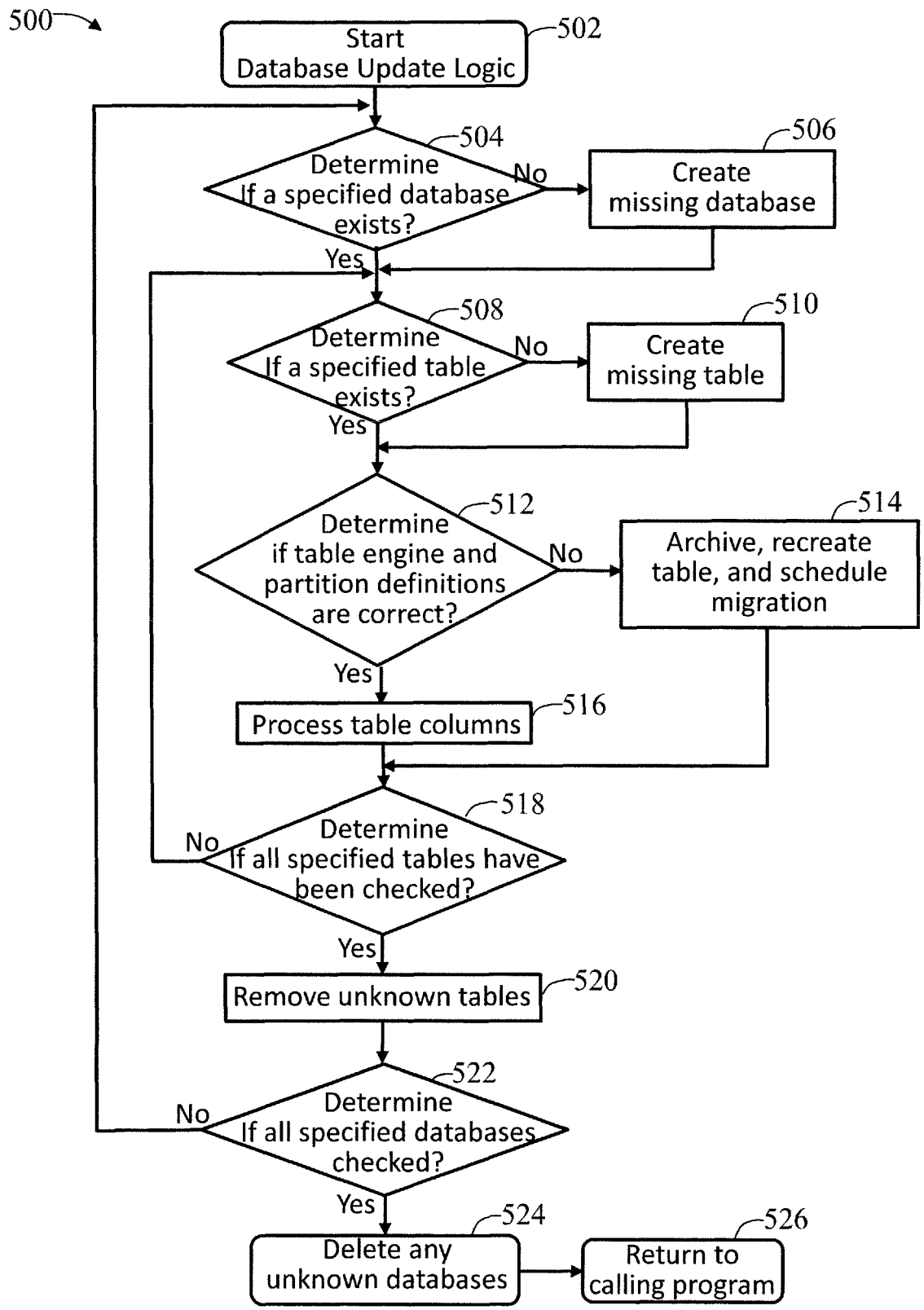
FIG. 5A illustrates an automatic database update process in accordance with an embodiment of the present invention.

FIG. 5A illustrates an automatic database update process 500 in accordance with an embodiment of the present invention. A centralized management system exists, such as shown in FIG. 3, for a network, such as shown in FIG. 2. The centralized management system comprises a plurality of existing databases defined using XML that store statistics and events for the nodes of the network, such as in the datastore 304. The automatic database update process 500 is controlled by generated PERL script operations. A new database schema is received that may add or delete one or more databases, add or delete one or more tables, add or delete one or more columns in the defined tables. XML is used, for example, to define the databases, the tables, and the columns within the tables. At step 502, a database update logic process is started to update or migrate the existing databases. At step 504, a determination is made whether a specified database exists. If the specified database does not exist, the process 500 proceeds to step 506. At step 506, a new database is created based on the XML file definitions. Returning to step 504, if the specified database does exist, the process 500 proceeds to step 508. At step 508, a determination is made whether a specified table exists. If the specified table does not exist, the process 500 proceeds to step 510. At step 510, the specified table is created as specified in the XML file definitions. Returning to step 508, if the specified table does exist, the process 500 proceeds to step 512. At step 512, a determination is made whether a table engine and partition definitions are correct. If the table engine and partition definitions are not correct, the process 500 proceeds to step 514. A table engine, as described herein, is a type of storage engine for the table. Different databases support different types of storage engines. During a software update, if the table engine changes, the migration processes of the present invention are designed to accommodate the changes, as described herein. For example, a table engine which stores data according to a data hierarchy may be changed to a table engine which stores data according to a fractal type tree or other different type of data access technique. This type of table engine change does not change the table data stored just affects how the table data is accessed.

Also, the migration processes of the present invention are designed to accommodate partition changes, such as having no table partitions to use of table partitions, and changing the type of partitions. From a data access perspective, partitions are transparent in most cases. The table engine knows where data is stored and handles accessing data across partitions. Thus, when data is migrated from one set of partitions to another, the migration process, generally doesn't need to know what partition the table engine is reading from or writing to. For example, a table with partitions for a time period, such as for one week of table data per partition or use of 2 weeks partitions may be changed to having partitions for each site, for each conduit, or the like. Table partitioning is a technique that splits a table into several physical files, also referred to as table spaces. Each table space file contains a fraction of the table and thus the APN VM 302 becomes faster in supporting query read and write operations. Also, delete data functions and reclaim space functions are faster performed on a subset of a whole table compared to such operations performed on the whole table.

At step 514, the table is archived, for example rename the table to <table_name>_archive, create a new table in its place with the correct definition, and schedule a data migration that is to begin after install. Returning to step 512, if the table engine and partition definitions are correct, the process 500 proceeds to step 516. At step 516, a table column process 550 is called. The table column process 550 makes individual column additions, deletions, and column modifications, as described in more detail below with regard to FIG. 5B. The process 550 completes with a return to the calling program at step 518. At step 518, a determination is made whether all specified tables have been checked. If all the specified tables have not been checked, the process 500 returns to step 508 and another table is checked. The process 500 repeats the loop 508-518 until all specified tables have been checked, any missing tables added, and all columns updated as required for type, key, and index changes according to the XML file.

The process 500 then proceeds to step 520. At step 520 any tables determined to be unknown tables are removed. At step 522, a determination is made whether all specified databases have been checked. If all specified databases have not been checked, the process 500 returns to step 504 and checks for another specified database. The process 500 repeats the loop 504-522 until all specified databases have been checked, any missing tables created, and columns updated as required for type, key, and index change according to the XML file.

The process 500 then proceeds to step 524. At step 524, any databases determined to be unknown are deleted. The process 500 then proceeds to step 526 to return to the calling program.

Figure 5B:
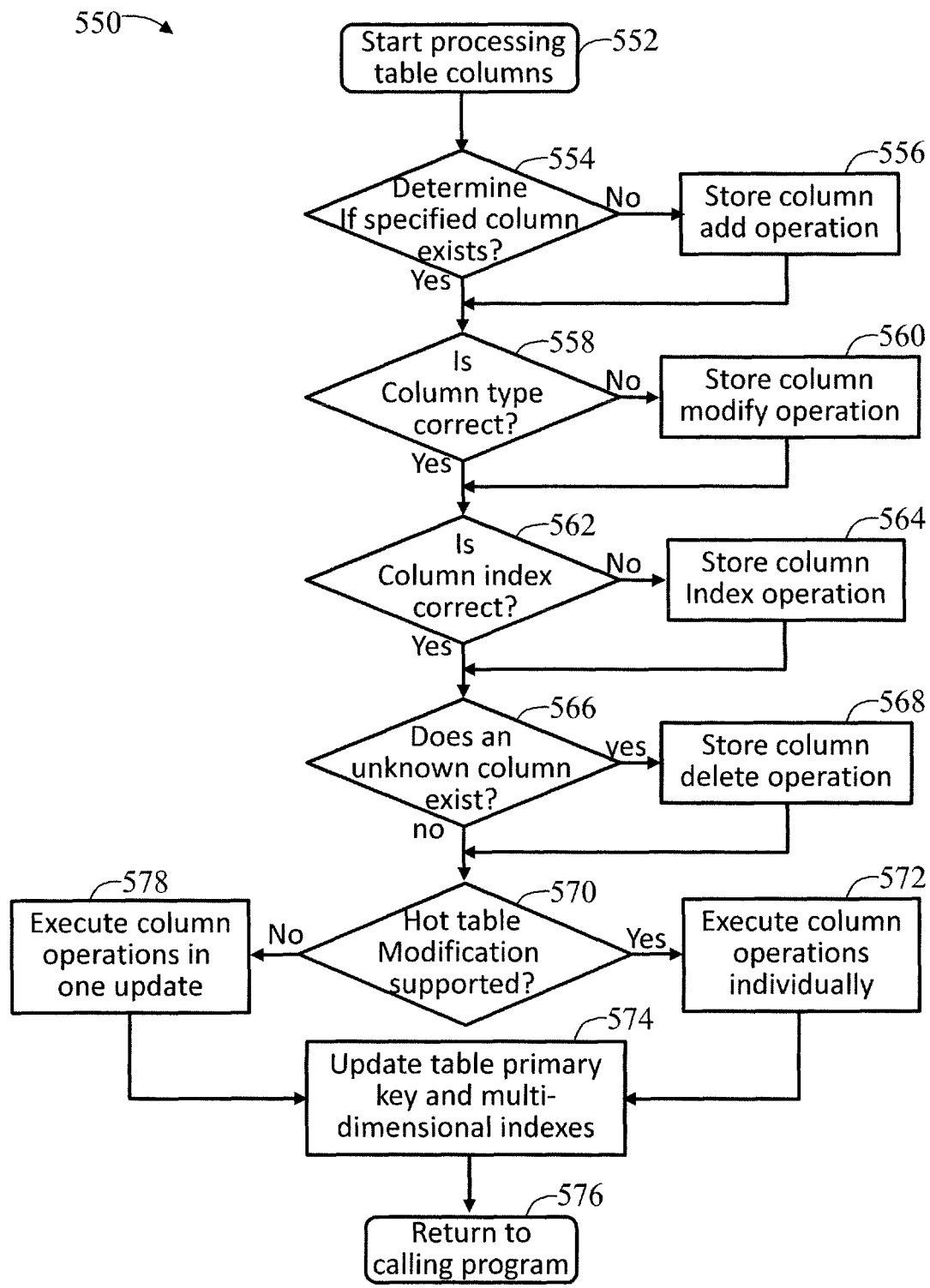
FIG. 5B illustrates a table column process in accordance with an embodiment of the present invention.

FIG. 5B illustrates a table column process 550 in accordance with an embodiment of the present invention. In the process 550, column operations, such as addition of a column, deletion of a column, modification of a column, and changes to column indexes, are stored in a listing of column updates that are then processed according to steps 572 or 578 as described in more detail below. The table column process 550 is started at step 552. At step 554, a determination is made whether a specified column exists. If the specified column does not exist, the process 550 proceeds to step 556. At step 556, a command to add a column is stored in the listing of column updates and the process proceeds to step 558. Returning to step 554, if the specified column does exist, the process 550 proceeds to step 558. At step 558, a determination is made whether the column type is correct. If the column type is not correct, the process 550 proceeds to step 560. At step 560, a command to modify the column type to the correct type value is stored in the listing of column updates and the process proceeds to step 562. Returning to step 558, if the column type is correct, the process 550 proceeds to step 562. At step 562, a determination is made whether the column index is correct. If the column index is not correct, the process 550 proceeds to step 564. At step 564, a command to correct the column index is stored in the listing of column updates and the process 550 proceeds to step 566. Returning to step 562, if the column index is correct, the process 550 proceeds to step 566. At step 566, a determination is made whether an unknown column has been found. If an unknown column has been found, the process 550 proceeds to step 568. At step 568, a command to delete the unknown column is stored in the listing of column updates and the process 550 proceeds to step 570. Returning to step 566, if an unknown column has not been found, the process proceeds to step 570. At step 570 a determination is made whether a hot table add, delete, modify attribute is supported by the table. If the hot table add, delete, modify attribute is supported by the table, the process 550 proceeds to step 572. At step 572, the commands specified in the listing of column updates are executed individually and at completion of the command executions, the process 550 proceeds to step 574. Many hot add/delete/modify table engines function more efficiently with separate queries. Returning to step 570, if the hot table add, delete, modify attribute is not supported by the table, the process 550 proceeds to step 578. At step 578, the commands specified in the listing of column updates are executed in one update operation and at completion of the command executions, the process 550 proceeds to step 574. For tables engines that do not support hot add/delete/modify, an alter table operation causes the table to be rebuilt and the data copied. To avoid multiple copy operations of the table data, a single alter table is performed. At step 574, the table primary key and multi-dimensional indexes are updated. For example, columns may be updated for data content, data type, key, and index with new values and/or changes according to the XML file. An alter table command is generated to remove or add a primary key or multi-dimensional index. The reason steps 572 and 578 are separate is because a single step to support both features would be more complicated to construct and some table engines don't allow specified data to be altered at the same time as a column in the key or index is being updated.

The management plane (MP) configuration (MP_Config) database contains a mixture of configuration and run-time status information for the APN VM 302. The following objects are defined and stored in this database:

USERS—a collection of user accounts for the APN VM system

AUTH SERVERS—a collection of authentication servers

GROUPS—a collection of groups—containing an ID and a name.

USERS GROUPS—a collection of mappings from user_id to a group_id—membership of users in groups.

SESSIONS—Store a collection of active user sessions. These are created when a user logs into the APN VM system.

WORKSPACES—Store the information used to identify a workspace—entries for each workspace created by the APN VM users.

PREFERENCES—Store key/value pairs—indexed by an ID and a user-id—allowing for storage and retrieval of preference information on a per-user basis.

GLOBAL PREFERENCES—Store key/value pairs—allowing for global preferences to be stored in the system. Many of the APN VM configuration screens store their information in this table using unique keys to identify the stored values.

WORKSPACE PREFERENCES—Store key/value pairs indexed by workspace_ids—allowing for custom preferences to be stored for each workspace.

DASHBOARDS—Store information for each of the dashboards created by the users of the APN VM system WIDGETS—A collection of dashboard display items. These can be views of data or tiles.

DATA VIEWS—A collection of the data views—correlating a view set to a graphical view of that view set. The individual objects define what data objects and properties are to be viewed, and the view set it points to defines the time range.

VIEW SETS—A collection of information describing a time range and a name describing a collection of data to be viewed.

MANAGED APNS—Store information for each of the APNs currently being monitored by the APN VM MANAGED APPLIANCES—Store information for each of the appliances currently discovered and managed by the APN VM system SITE CONNECTIVITY—Store information showing how sites are inter-connected UNMANAGED CONFIG DOWNLOADS—Store the state of file transfers for configuration file downloads APPLIANCE SETTINGS UPLOADS—Store state of file transfers for appliance settings functionality ACTION STATUSES—This table is used to store the transfer/update status information when transferring files to/from appliances ACTION STATUS STATE—This table is an enumeration containing state values for the actions.

STORAGE STATES—This table is used to store the latest state for the different storage and database events.

STORAGE STATE VALUES—This table is an enumeration containing state values for the storage states.

The MP Config database is defined using the same XML schema as used to define events and statistics. The XML for the MP Config database is defined below:

```
<?xml version="1.0" encoding="UTF-8"?>
<db name="MP_Config" type="DB">
    <class name="users" >
        <var name="id" type="UINT32" autoincrement="" not_null="" key="PRI"/>
        <var name="username" type="STR" strlen="32" not_null="" />
        <var name="created" type="DATE" default="NULL"/>
        <var name="modified" type="DATE" default="NULL"/>
        <var name="last_login" type="DATE" default="NULL"/>
        <var name="last_login_from" type="STR" strlen="40" default="NULL"/>
        <var name="last_active" type="DATE" default="NULL"/>
        <var name="last_active_from" type="STR" strlen="40" default="NULL"/>
        <var name="remote" type="BOOL" not_null="true" default="0"/>
        <var name="type" type="STR" strlen="32" not_null="" />
        <unique_key name="user-type">
            <item name="username"/>
            <item name="type"/>
        </unique_key>
    </class>
    <class name="auth_servers">
        <var name="id" type="UINT32" autoincrement="TRUE" not_null="TRUE" key="PRI"/>
        <var name="index" type="UINT8" default="NULL"/>
        <var name="type" type="STR" strlen="10" not_null="" />
        <var name="ip_address" type="STR" strlen="40" default="NULL"/>
        <var name="port" type="UINT16" default="NULL"/>
    </class>
    <class name="groups">
        <var name="id" type="UINT16" autoincrement="" not_null="" key="PRI"/>
        <var name="name" type="STR" strlen="32" not_null="" unique=""/>
    </class>
    <class name="users_groups">
        <var name="id" type="UINT16" autoincrement="" not_null="" key="PRI"/>
        <var name="user_id" type="UINT32" not_null="" dbindex=""/>
        <var name="group_id" type="UINT16" not_null="" dbindex=""/>
    </class>
    <class name="sessions">
        <!-- The sessions schema is defined here
        so that the schema is properly defined each time this XML is run -->
        <var name="id" type="STR" strlen="255" not_null="TRUE" key="PRI"/>
        <var name="data" type="TEXT" default="NULL" />
        <var name="expires" type="INT32" default="NULL" />
    </class>
    <class name="workspaces">
        <var name="id" type="UINT32" autoincrement="" not_null="" key="PRI"/>
        <var name="user_id" type="UINT32" not_null=""/>
        <var name="name" type="STR" strlen="32" not_null=""/>
        <var name="is_public" type="BOOL" default="0" not_null=""/>
        <var name="group_id" type="UINT16"/>
        <index name="user_id-group_id">
            <item name="user_id"/>
            <item name="group_id"/>
        </index>
    </class>
    <class name="preferences">
        <var name="id" type="UINT32" autoincrement="" not_null="" key="PRI"/>
        <var name="user_id" type="UINT32" not_null=""/>
        <var name="key" type="STR" strlen="32" not_null=""/>
        <var name="value" type="BLOB" not_null=""/>
        <unique_key name="user_id-key">
            <item name="user_id"/>
            <item name="key"/>
        </unique_key>
    </class>
```

-continued

```xml
<class name="global_preferences">
    <var name="id" type="UINT32" autoincrement="" not_null="" key="PRI"/>
        <var name="key" type="STR" strlen="32" not_null="" unique=""/>
        <var name="value" type="BLOB" not_null=""/>
    </class>
    <class name="ws_preferences">
        <var name="id" type="UINT32" autoincrement="" not_null="" key="PRI"/>
        <var name="workspace_id" type="UINT32" not_null=""/>
        <var name="key" type="STR" strlen="32" not_null=""/>
        <var name="value" type="BLOB" not_null=""/>
        <unique_key name="workspace_id-key">
            <item name="workspace_id"/>
            <item name="key"/>
        </unique_key>
    </class>
    <class name="dashboards">
        <var name="id" type="UINT32" autoincrement="" not_null="" key="PRI"/>
        <var name="workspace_id" type="UINT32" not_null="" dbindex=""/>
        <var name="name" type="STR" strlen="32" not_null=""/>
        <var name="sort_order" type="UINT8" not_null=""/>
    </class>
    <class name="widgets">
        <var name="id" type="UINT32" autoincrement="" not_null="" key="PRI"/>
        <var name="dashboard_id" type="UINT32" not_null="" dbindex=""/>
        <var name="name" type="STR" strlen="50" not_null=""/>
        <var name="view_set_id" type="UINT32"/>
        <var name="tile" type="STR" strlen="32"/>
        <var name="size_x" type="UINT8" not_null="" default="1"/>
        <var name="size_y" type="UINT8" not_null="" default="1"/>
        <var name="col" type="UINT8"/>
        <var name="row" type="UINT8"/>
        <on_delete name="data_view_id" function="migrate_on_delete_widget_data view_id"/>
    </class>
    <class name="data_views">
        <var name="id" type="UINT32" autoincrement="" not_null="" key="PRI"/>
        <var name="view_set_id" type="UINT32" not_null="" dbindex=""/>
        <var name="type" type="STR" strlen="20" not_null=""/>
        <var name="interval" type="UINT8"/>
        <var name="parameters_json" type="BLOB" not_null=""/>
    </class>
    <class name="view_sets">
        <var name="id" type="UINT32" autoincrement="" not_null="" key="PRI"/>
        <var name="workspace_id" type="UINT32" not_null=""/>
        <var name="name" type="STR" strlen="50" not_null=""/>
        <var name="start_time_delta_minutes" type="UINT32"/>
        <var name="end_timestamp" type="INT64"/>
    </class>
    <class name="managed_apns">
        <var name="id" type="UINT32" autoincrement="" not_null="" key="PRI"/>
        <var name="apn_name" type="STR" strlen="50" not_null=""/>
        <var name="ncn_primary_ip" type="STR" strlen="15"/>
        <var name="poll_interval_min" type="UINT32" default="5"/>
        <var name="poll_all_apnas" type="BOOL" default="0"/>
        <var name="user_name" type="STR" strlen="50" default="talariuser"/>
        <var name="primary_ncn_connectivity_state" type="UINT32" default="1"/>
        <var name="ncn_connectivity_update_timestamp" type="UINT64" default="NULL"/>
        <var name="discover_appliances_timestamp" type="UINT64" default="NULL"/>
        <var name="update_network_appliances_timestamp" type="UINT64" default="NULL"/>
        <var name="limit_bandwidth_usage" type="UINT32" default="1000"/>
        <var name="disable_poll_override" type="UTNT8" default="0" not_null=""/>
    </class>
    <class name="managed_appliances">
        <var name="apn_id" type="UINT32" not_null="" key="PRI"/>
        <var name=∂site_name" type="STR" strlen="100'8 not_null="" key=¢PRI"/>
        <var name="appliance_id" type="UINT8" not_null="" key="PRI"/>
        <var name="management_ip" type="STR" strlen="15"/>
        <var name="last_stat_poll_time" type="DATE"/>
        <var name="stat_poll_disabled" type="BOOL" default="1" not_null=""/>
        <var name="last_minute_reported" type="UINT32"/>
        <var name="last_timestamp_reported" type="UINT64"/>
        <var name="last_timestamp_reported_local" type="UINT64"/>
        <var name="max_minute_available" type="UINT32"/>
        <var name="max_timestamp_available" type="UINT64"/>
        <var name="last_event_reported" type="UINT64"/>
        <var name="username" type="STR" strlen="50"/>
```

```xml
        <var name="model" type="STR" strlen="7"/>
        <var name="is_active_ncn" type="BOOL" default="0"/>
        <var name="maybe_ncn" type="BOOL" default="0" not_null=""/>
        <var name="is_ha_forwarding" type="BOOL" default="0"/>
        <var name="service_enabled" type="BOOL" default="0"/>
        <var name="sw_revision" type="STR" strlen="150" default="NULL"/>
        <var name="registry_timestamp" type="STR" strlen="100" default="NULL"/>
        <var name="connect_state" type="STR" strlen="20'8 default="unknown"/>
        <var name="last_reported_state' type="UINT8" not_null="" default="0"/>
        <var name="serial_number" type="STR" not_null="" default=""/>
        <!--var name="bios_version" type="STR" strlen="10" not_null="" default=""/>
        <var name="bmc_version" type="STR" strlen="10" not_null="" default=""/>
        <var name="active_os" type="STR" strlen="150" not_null="" default=""/>
        <var name="backup_os" type="STR" strlen="150" not_null="" default=""/>
        <var name="staged_sw" type="STR" strlen="150" not_null="" default=""/>
        <var name="short_sw_ver" type="STR" strlen="50" not_null="" default=""/>
        <var name="short_sw_staged_ver" type="STR" strlen="50" not_null="" default=""/>
        <var name="hw_start_time" type="UINT64"/>
        <var name="time_from_dump" type="UINT64"/>
        <var name="mem_size" type="UINT64"/>
        <var name="hdd_type" type="STR" strlen="20" not_null="" default=""/>
        <var name="hdd_model" type="STR" strlen="50" not_null="" default=""/>
        <var name="apna_mode" type="STR" strlen="20" not_null="" default=""/-->
    </class>
    <insert table="managed_apns" noreplace="">
        <field name="id'8 value="1"/>
        <field name="apn_name" value="Default_APN"/>
    </insert>
    <class name="appliance_connectivity_state">
        <var name="name" type="STR" strlen="50" not_null=""/>
        <var name="value" type="UINT32" not_null="" key="PRI"/>
    </class>
    <insert table="appliance_conneetivity_state">
        <field name="name" value="APP_UNKNOWN"/>
        <field name="value" value="1"/>
    </insert>
    <insert table="appliance_connectivity_state">
        <field name="name" value="APP_NOTREACHABLE"/>
        <field name="value" value="2"/>
    </insert>
    <insert table="appliance_connectivity_state">
        <field name="name" value="APP_REACHABLE"/>
        <field name="value" value="3"/>
    </insert>
    <insert table="appliance_connectivity_state">
        <field name="name" value="APP_PINGABLE"/>
        <field name="value" value="4"/>
    </insert>
    <insert table="appliance_connectivity_state">
        <field name="name" value="APP_NOLOGIN"/>
        <field name="value" value="5"/>
    </insert>
    <insert table="appliance_connectivity_state">
        <field name="name" value="APP_OK"/>
        <field name="value" value="6"/>
    </insert>
    <insert table="appliance_connectivity_state">
        <field name="name" value="APP_ACTIVE_NCN"/>
        <field name="value" value="7"/>
    </insert>
    <insert table="appliance_connectivity_state">
        <field name="name" value="APP_CLIENT"/>
        <field name="value" value="8"/>
    </insert>
    <insert table="appliance_connectivity_state">
        <field name="name" value="APP_MAYBE_NCN"/>
        <field name="value" value="9"/>
    </insert>
    <class name="site_connectivity">
        <var name="apn_id" type="UINT32" not_null="" key="PRI"/>
        <var name="site_name_1" type="STR" strlen="100" not_null="" key="PRI"/>
        <var name="site_name_2" type="STR" strlen="100" not_null="" key="PRI"/>
    </class>
    <class name="unmanaged_config_downloads">
        <var name="unique_id" type="STR" strlen="40" not_null="" key="PRI"/>
        <var name="management_ip" type="STR" strlen="15"/>
        <var name="status" type="UINT32" default="1" not_null=""/>
        <var name="file_name" type="STR" strlen="255" not_null="" key="PRI"/>
```

```
            <var name="sha1_hash" type="STR" strlen="255" not_null="" key="PRI"/>
            <var name="file_size" type="UINT64" default="0"/>
            <var name="file_mtime" type="UINT64" default="0"/>
            <var name="file_blob" type="MEDIUMBLOB" default="NULL"/>
            <var name="row_created_timestamp" type="STR" strlen="100"
default="NULL"/>
            <var name="current" type="STR" strlen="8" default="NULL"/>
        </class>
        <class name="appliance_settings_uploads">
            <var name="unique_id" type="STR" strlen="40" not_null="" key="PRI"/>
            <var name="management_ip" type="STR" strlen="15"/>
            <var name="status" type="UINT32" default="1" not_null=""/>
            <var name="file_name" type="STR" strlen="255" not_null="" key="PRI"/>
            <var name="sha1_hash" type="STR" strlen="255" not_null="" key="PRI"/>
            <var name="file_size" type="UINT64" default="0"/>
            <var name="file_mtime" type="UINT64" default="0"/>
            <var name="file_blob" type="MEDIUMBLOB" default="NULL"/>
            <var name="row_created_timestamp" type="STR" strlen="100"
default="NULL"/>
            <var name="current" type="STR" strlen="8" default="NULL"/>
        </class>
        <class name="action_statuses">
            <var name="id" type="UINT32" autoincrement="" not_null="" key="PRI"/>
            <var name="action_object" type="STR" strlen="100" not_null="" key="PRI"/>
            <var name="action_name" type="STR" strlen="100" not_null="" key="PRI"/>
            <var name="action_state" type="UINT16" not_null="" default="1"/>
            <var name="action_target" type="STR" strlen="100" not_null="" key="PRI"/>
            <var name="user_data" type="STR" strlen="300" not_null=""/>
            <var name="user_action_identifier" type="STR" strlen="100" not_null=""
key="PRI"/>
            <var name="action_start_time_s" type="UINT64" not_null="" key="PRI"/>
            <var name="action_start_time_ns" type="UINT64" not_null="" key="PRI"/>
            <var name="action_end_time_s" type="UINT64"/>
        </class>
        <class name="action_status_state">
            <var name="name" type="STR" strlen="50" not_null=""/>
            <var name="value" type="UINT32" not_null="" key="PRI"/>
        </class>
        <insert table="action_status_state">
            <field name="name" value="ACTION_RUNNING"/>
            <field name="value" value="1"/>
        </insert>
        <insert table="action_status_state">
            <field name="name" value="ACTION_FINISHED"/>
            <field name="value" value="2"/>
        </insert>
    <insert table="global_preferences" no_overwrite="">
        <field name="key" value="Storage_Settings"/>
        <field name="value"
value='{\"enable_notify\":true,\"notify_pct\":\"45\",\"stop_poll_pct\":\"55\"}'/>
        </insert>
    <insert table="global_preferences" no_overwrite="">
        <field name="key" value="Database_Moniotor_Settings"/>
        <field name="value" value='{\"notify_pct\":\"45\",\"stop_poll_pct\":\"50\"}'/>
        </insert>
    <insert table="global_preferences" no_overwrite="">
        <field name="key" value="Database_Auto_Cleanup_Settings"/>
        <field name="value"
value='{\"auto_remove\":true,\"auto_remove_pct\":\"50\",\"auto_remove_periog\":\"6\",\"condition\":\"an
d\"}'/>
        </insert>
        <class name="storage_states">
            <var name="storage_type" type="STR" strlen="32" not_null="" key="PRI" />
            <var name="event_type" type="STR" strlen="32" not_null="" key="PRI"/>
            <var name="state" type="UINT32" not_null="true" default="0"/>
        </class>
        <class name="storage_state_values">
            <var name="id" type="UINT32" not_null="true" default="0" key="PRI"/>
            <var name="string" type="STR" strlen="32" default=""/>
        </class>
        <insert table="storage_state_values" no_overwrite="">
            <field name="id" value="0"/>
            <field name="string" value='clear'/>
        </insert>
        <insert table="storage_state_values" no_overwrite="">
            <field name="id" value="1"/>
            <field name="string" value='raise'/>
```

```
    </insert>
    <user name="XYZ"
password="*6E6DC1CB55CE03F63581205EB3826C13EC1981A2" grant="ALL"/>
  </db>
```

The onboard configuration facility address a concern that changes to a network could get lost due to an administrator who make changes to the network and is unaware of changes made by another administrator. The onboard configuration facility provides configuration conflict tracking to avoid such a problem. Configuration conflict tracking works by having a unique identifier assigned to each version of a network configuration file. An identifier could be a hash of the file, timestamp, and username, for example. Other identifiers may be created based on an administrator's choice for a particular network configuration. Such an identifier is referred to as a unique configuration identifier (UCID)).

When the onboard configuration facility imports a configuration file or configuration package from the NCN, the configuration contains a UCID. A configuration package includes a configuration file, a configuration version file, a map background and a map, for example. When the onboard configuration facility saves a change to the configuration, it generates a new UCID and adds it to the existing UCID to form a list of UCIDs. Each subsequent change that is saved appends a new UCID to the list of UCIDs.

When the configuration package including a file is exported to the NCN to apply to an appliance database, the chain of UCIDs in the configuration is checked against the current UCID on the NCN. If the current UCID is in the chain of UCIDs in the configuration, then there have been no conflicting changes. The NCN then adopts the current UCID from the chain of UCIDs as its own current UCID. If the configuration facility is unable to find the current UCID in the UCID list, then it prompts the user to let them know that a conflicting change has been made and give them the option of proceeding anyway or stopping. Later when this configuration is activated on the network, and another user imports this configuration, the configuration facility updates the current UCID to be the last UCID listed in the configuration.

The operation of this process is illustrated with an example in which the NCN has a current UCID of N so when Users A and User B import the configuration, they each have a configuration with a UCID list of {N}. User A makes changes to the configuration and exports an A-updated configuration to the NCN with a UCID list of {N, A-1, A-2, A-3}. The configuration facility on the NCN finds no problem with the A-updated configuration because it finds N in the UCID list. The current UCID of the configuration file is A-3 which is then adopted by the NCN as its current UCID. User B makes some edits and exports a B-configuration to the NCN with a UCID list of {N, B-1, B-2, B-3}. The configuration facility on the NCN finds a problem because it does not see A-3 in the presented UCID list. User B is informed of the problem that there is a risk of overwriting a change and user B can take steps to find out what change was missed.

Figure 6:
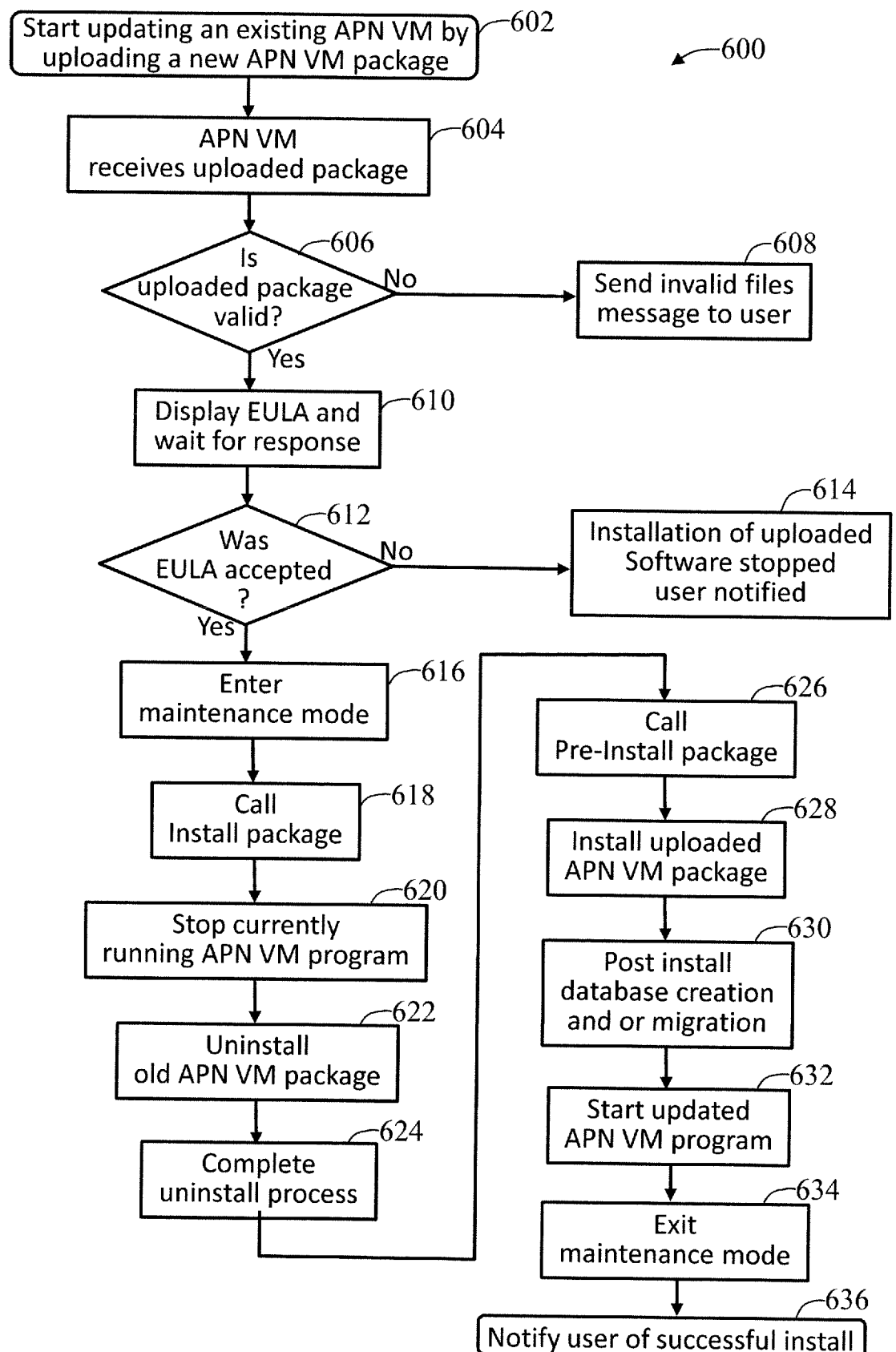
FIG. 6 illustrates an adaptive private network (APN) software upgrade process in accordance with an embodiment of the present invention.

FIG. 6 illustrates an adaptive private network (APN) software upgrade process 600 in accordance with an embodiment of the present invention. FIG. 6 shows the major steps involved in updating application software, such as the APN VM 302. At step 602, an update APN VM process is started by uploading an APN VM software package. At step 604, the APN VM UI 310 allows a file to be uploaded and received for installation by a user. At step 606, the currently running APN VM software checks the uploaded file and determines whether the uploaded software package is a valid APN VM package. This check also verifies that the package has been cryptographically signed by an APN VM build environment. If the process 600 determines that there is an invalid package file, the process 600 proceeds to step 608. At step 608, the installation of the software is stopped and an invalid files message is sent to the user. If the uploaded files are determined to be valid, then the process 600 proceeds to step 610. At step 610, an end user license agreement (EULA) is extracted from the package, displayed to the user, and the user is requested to accept the license. The process 600 waits for a response from the user and if the user refuses to accept the EULA, the process 600 proceeds to step 614. At step 614, the installation of the software is stopped and the user is notified. If the user accepts the EULA, the process 600 proceeds to step 616. At step 616, a maintenance mode is entered to minimize impact to system operations during the installation process. In the maintenance mode, all requests to the system funnel to one page which provides information that an installation is in process with the system in maintenance mode, for example. Also, an estimate of when the installation will be complete and when the system is to be returned to normal operation is also provided. At step 618, the currently running APN VM software calls an install program and begins installing the uploaded package.

The APN VM software package includes a dependency on an APN VM operating system (OS) that is required. For example, if an R1.0 release of APN VM software depends on a package name "apn-VM-OS-4-01", the APN VM software ships with the "apn-VM-OS-4-01" package to satisfy that requirement. The APN VM software can include multiple "apn-VM-OS" packages to indicate the compatibility that is provided. In another example, if APN VM OS 4.2 includes some small security patches on top of OS 4.1, then that APN VM OS 4.2 ships with "apn-VM-OS-4-01" and "apn-VM-OS-4-02" packages. In this manner, older APN VM software releases continue to work on a new OS. In a further example, if APN VM OS 5.0 has major changes which cannot support APN VM software packages designed for OS 4.1, then an APN VM OS 5.0 package can drop the requirement for the "apn-VM-OS-4-01" package from the OS delivery. These types of adjustments allow dependency checking tools to block unsupported configurations.

The APN VM software dependency on an "apn-VM-OS" package has a second benefit. The dependency requirement ensures that a user would not be able to install this package onto an incompatible OS, such as an incompatible version of Debian or Ubuntu OS, because the normal install tools associated with Debian or Ubuntu would detect any missing dependencies and post errors.

Continuing at step 618, the APN VM software package is installed by calling an install command, which may be a command line option, to perform the installation. The APN VM software package file contains all of the APN VM software files, metadata about the software package, such as version, copyright, and the like, and may include hook scripts to run as part of the installation. For example, for a compatible debian installation, there are four hook scripts that can be run in a .deb package: prerm, postrm, preinst, and postinst. The prerm script gets run prior to a package being uninstalled. The postrm script gets run after a package's files have been deleted as part of uninstalling. The preinst script gets run prior to installing the files of a package and the postinst script gets run after the package files have been copied to the system. During a package upgrade, the old package is uninstalled and then the new package is installed resulting in the following hook script calls: prerm from old package, postrm from old package, preinst from new package, and postinst from new package. An implementation for each of these hook scripts is provided.

The prerm and postinst hook scripts contain most of the logic needed to install an APN VM software package. The other hook scripts provide a log to a syslog to indicate that they are being run. The prerm script is used to stop any running daemons prior to the removal of the software files. The postinst script does two major things, create or migrate necessary databases and start the APN VM processes once the databases are up to date. A daemon is a software program that runs in the background of a primary program, such as an operating system (OS) program.

It is a requirement that upgrades of APN VM software not lose any statistical data. Also, data is not lost when downgrading to a previous release, such as may occur in case of an error occurring on installation of a new release. If the database schema changes, it is the responsibility of the APN VM software installation process to migrate the existing data to the new schema. The APN VM software build process creates a script to migrate a running database to the schema required for the APN VM software. This script is auto generated based on the schema definition for the database.

A first deliverable is the APN VM software package contains the APN VM configuration editor and provides the application software. The second deliverable is a file called the .ova package. The .ova package is a file which contains everything that is needed to deploy a virtual machine in the VMware environment. The .ova file contains the disk image that contains the APN VM OS and the APN VM software package with a base APN VM configuration editor. The .ova package also includes a specification of the virtualized hardware. The virtualized hardware controls the number of CPUs, the amount of RAM, and the type of disk controller that VMware creates when deploying the APN virtual machine. The .ova also contains a EULA and prompts the user to accept that license before deploying the image.

An upgrade of the APN VM OS can be done by installing a new virtual machine based on the desired .ova file from a supported portal and then attaching the data disk used with the old virtual machine to the new virtual machine.

The installation process 600 of FIG. 6 continues at step 620. At step 620, the currently running APN VM software program is stopped. At step 622, the old APN VM software package is uninstalled. At step 624, the uninstall process started at step 622 is completed. At step 626, a pre-install package is called. At step 628, the uploaded APN VM software package is installed. At step 630, the APN VM databases are created and for existing APN VM databases, the data is migrated as a post installation process. At step 632, the installed APN VM software package is checked for any updates and if any are found they are downloaded and installed. At step 634, the maintenance mode is exited. At step 636, the user is notified of a successful installation of the new APN VM software package.

Figure 7:
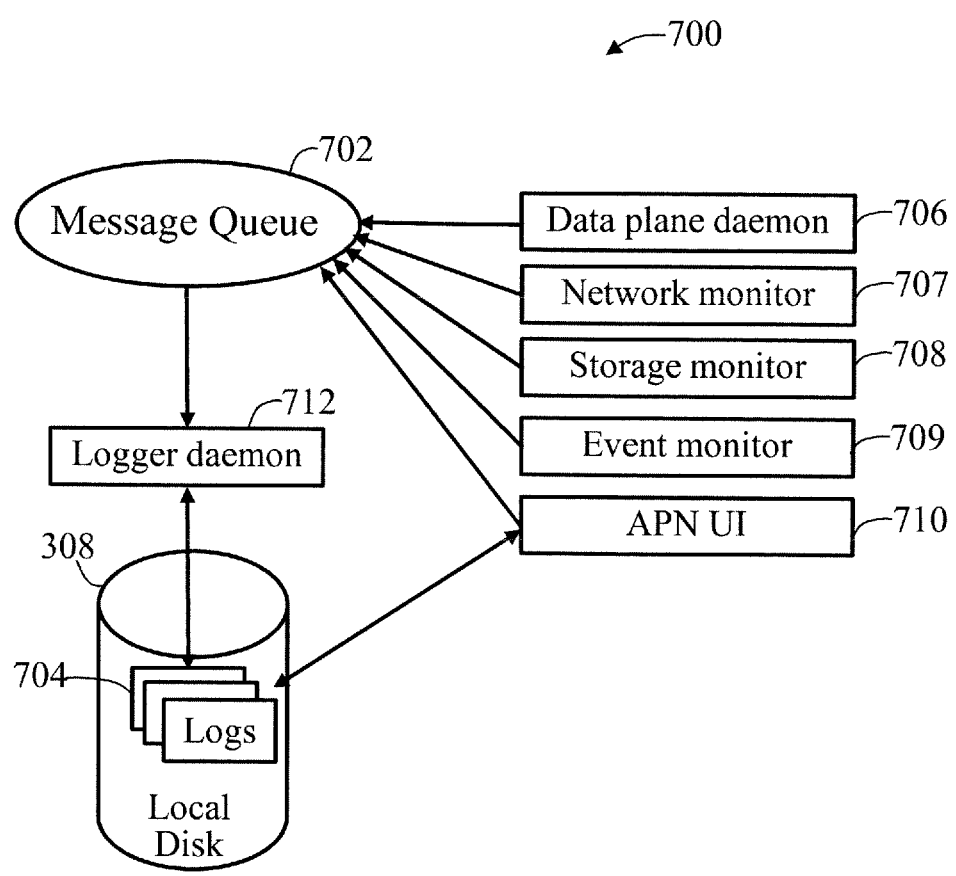
FIG. 7 illustrates an APN logging process in accordance with an embodiment of the present invention.

FIG. 7 illustrates an APN VM logging process 700 in accordance with an embodiment of the present invention. The logging process 700 covers logging performed by various coded applications 706-710 that run in the APN VM and posts logs to a message queue 702 that stores the logs in a log file 704 on a local disk, such as local storage 308 of FIG. 3. The start and end of all database management actions are logged. For example, when a data migration is started and when the data migration finishes are logged. In another example, when an automatic data cleanup is started and when the automatic data cleanup finishes are logged. If a manual cleanup is requested, system parameters including when the manual cleanup started and when the manual cleanup finishes are logged. Also, major steps for migration are logged, such as "migrate data aaa (min minute of data to migrate) -bbb (max minute of data to migrate) (xxx rounds remaining) for database XXX table YYY". Rounds refers to the number blocks of data that are left to migrate, referring to a pre-specified parameter governing migration of at most 60 minutes of data for example, each time a table is processed during the migration. Refer to FIG. 8B blocks 874 and 876 and associated description. In a further example, every command sent to a database to change the database is logged and any error return code/s are also logged for easy debugging. The APN VM 302 runs a daemon, a program that runs in the background, called a logger daemon 712 which is responsible for advantageous-specific logging, as described below. The logger daemon 712 listens to the message queue 702 for log messages from other processes, such as associated with coded applications 706-710, and writes those log messages to the log files 704. Messages in the message queue 702 specify which log file of a plurality of specific log files in the log file 704 the message should be written to. The logger daemon 712 monitors the sizes of the specific log files and performs autorotation of files as the logs grow.

The APN UI 710 has a JavaScript™ infrastructure which allows JavaScript™ code running in the browser to post state information, such as JavaScript™ logs or data structures, back to the server, such as processing node 303, which allows that information to appear in the log files 704. For example, such logging is done when JavaScript™ detects an error when running in the browser and on request by the user.

The following logs, for example, are used in the APN VM system.
    webconsole.log—Logging from the APN UI code in the APN VM for web console activities.
    management.log—The activities of the Network Monitor are logged here.
    db.log—Queries, which are run when creating and migrating databases, get logged to this file.
    access.log—User access attempts get logged here.
    exceptions.log—APN VM software exceptions are logged here.
    events.log—Logging from an event daemon are logged here.
    storage.log—Logging from a storage daemon are logged here.
    init.log—Logging from a process monitor are logged here.

The APN UI 710 provides an interface to view and download log files. Access to the logs for this purpose is done by directly reading the logs from the local storage 308 and does not pass through the logger daemon 712.

Figure 8A:
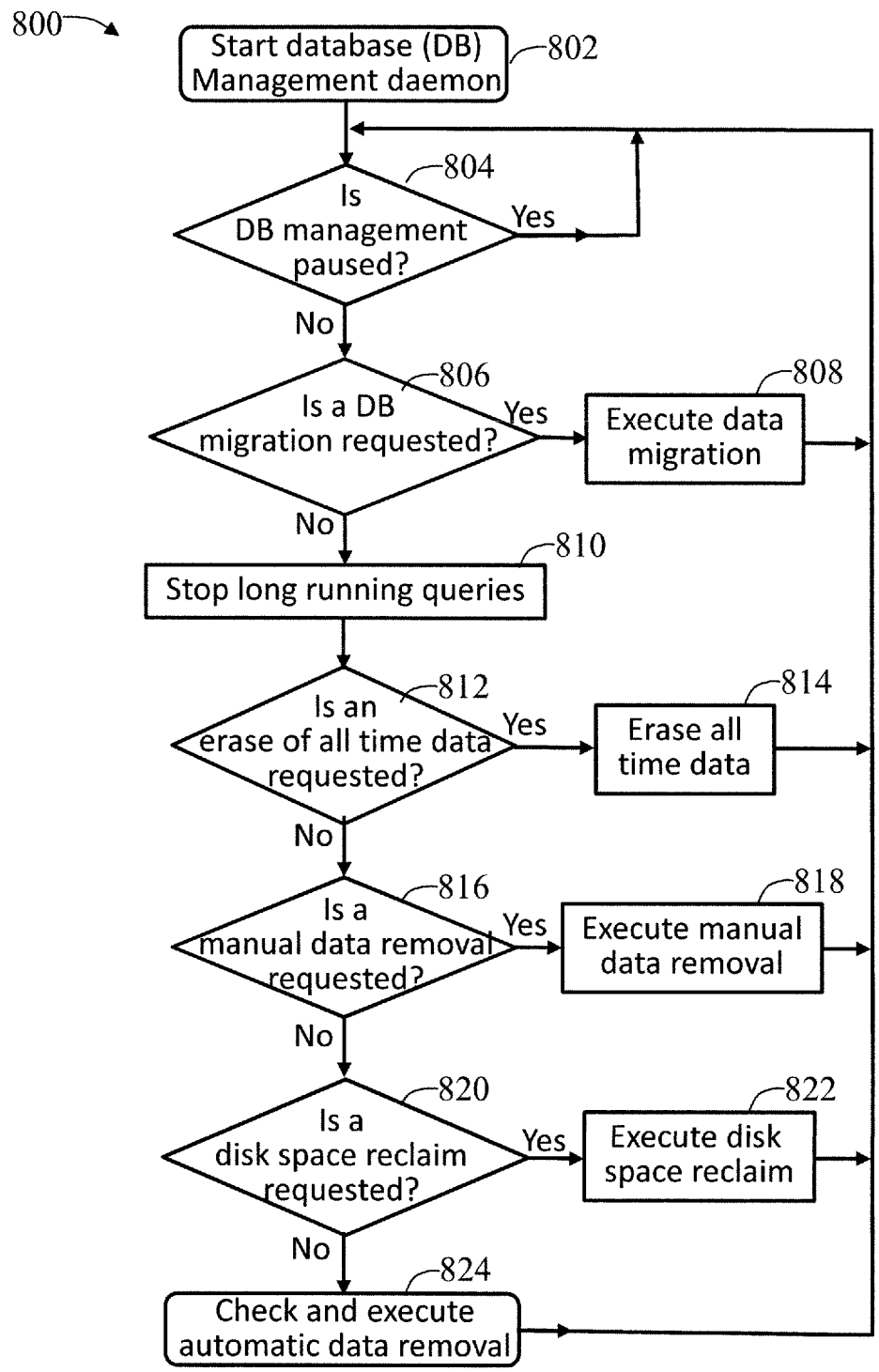
FIG. 8A illustrates a database management process in accordance with an embodiment of the present invention.
Figure 8B:
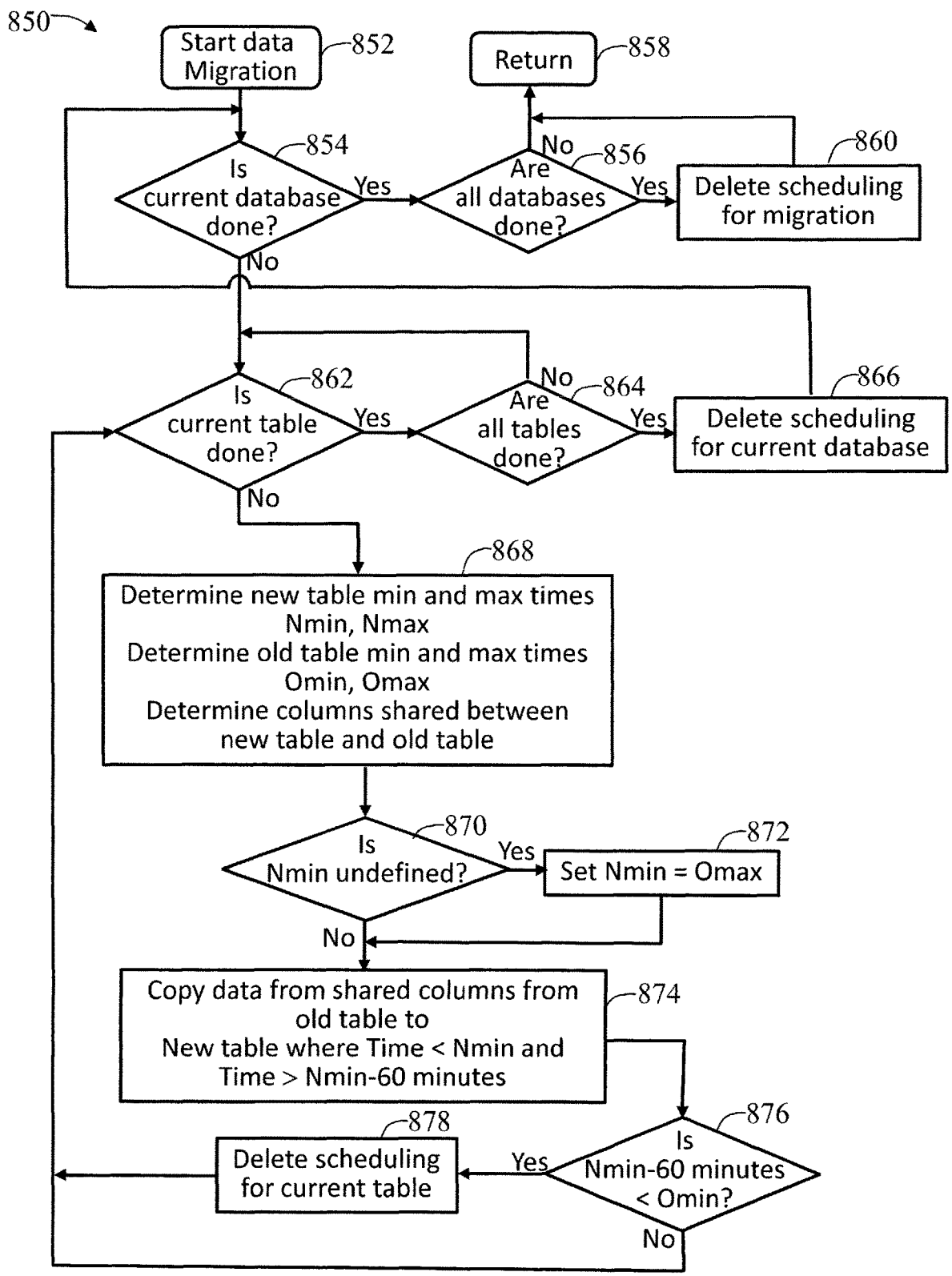
FIG. 8B illustrates a data migration process in accordance with an embodiment of the present invention.

FIG. 8A illustrates a database management process 800 in accordance with an embodiment of the present invention. A database management daemon is started at step 802. At step 804, a determination is made whether the database management system is paused. If the database management system is paused, the process 800 returns to check the status of the database management system at step 804. If the database management system is active and not paused, the process 800 proceeds to step 806. At step 806, a determination is made whether a database migration is requested. If a database migration is requested, the process 800 proceeds to step 808. At step 808, a data migration is executed as described in more detail with regard to process 850 of FIG. 8B. After executing step 808, the process 800 returns to check the status of the database management system at step 804, starting the process 800 again while the database management daemon is active. Database migration generally is scheduled at a time when APN VM software is updated, as shown in steps 512 and 514, for example. Once a software update has completed, a database management daemon is started which checks if database migration is scheduled. Also, for a large database migration and if the APN VM is still in operation, providing polling for statistics, showing reports and graphs based on a user request, data is migrated in small chunks. After one chunk is finished, the process 800 reaches step 806 again and does the check and if the database migration is in progress, the process 800 proceeds to step 808.

Returning to step 806, if the database migration is not requested, the process 800 proceeds to step 810. At step 810, long running queries to the affected database are stopped. Long running queries that are stopped are not automatically rescheduled by the management daemon. Stopping a query typically causes a process that started the query to experience an error. How that error is handled is up to the caller. In most cases, an error is presented to a user stating there was an error while running the query. At step 812, a determination is made whether an erase of all time data is requested. All time data refers to minute samples in the minute and hour statistic tables. For example, the NMS statistics file server utility 354 of FIG. 3 accesses the NMS_Stats database in the datastore 304 that contains the statistical data gathered from the APNAs. The NMS_Stats database includes tables for <object type>_minutes and for <object type>_hours. For example, the <object type>_minutes table contains in each row an object_id which corresponds to an id in the <object type>s table. Each row in the <object type>_minute table also contains an update_epoch_time_s column. The rest of the columns in the row reflect the counts of various metrics important to the object for that minute, such as packet counters, byte counters, latency measurements, and the like. The <object type>_hours table is similar to the <object type>_minutes table except that it aggregates an hour's worth of data from the <object type>_minutes table into a single row. If the all time data is requested to be erased, the process 800 proceeds to step 814. At step 814, the all time data is erased at an appropriately scheduled time. It is noted that the all time data and historical data are considered the same data and accordingly, step 814 erases the historical data. At completion of the erase operation of step 814, the process 800 returns to check the status of the database management system at step 804, starting the process 800 again while the database management daemon is active.

Returning to step 812, if the all time data is not requested to be erased, the process 800 proceeds to step 816. At step 816, a determination is made whether a manual data removal operation is requested. Manual data removal is an option in a user interface that allows a user to specify data to be removed. A user may specify a remove request based on reaching a specified condition. For example, a user may request that data older than three months to be removed or to remove data when a specified disk is some percentage full, such as 40% full. The data is removed by the management daemon, not manually by the user, to allow the database to be protected from conflicting actions, such as attempting to delete data while migrating data, which could be harmful to data consistency. If a manual data removal is requested, the process 800 proceeds to step 818. At step 818, the specified data is removed by the daemon at an appropriately scheduled time. At completion of the manual data removal operation at step 818, the process 800 returns to check the status of the database management system at step 804, starting the process 800 again while the database management daemon is active.

Returning to step 816, if a manual data removal operation is not requested, the process 800 proceeds to step 820. At step 820, a determination is made whether a reclaim disk space operation for a specified database is requested. If a reclaim disk space operation for the specified database has been requested, the process 800 proceeds to step 822. At step 822, the reclaim disk space operation for the specified database is executed at an appropriately scheduled time. When data is removed from a database, the disk space is still generally held by the database. The database uses the held disk space for any new record that might be added. For example, a database reclaim operation takes advantage of the APN VM system table architecture which splits data into partitions. Each partition is stored as separate files on disk. If an empty partition is detected, the empty partition is truncated which shrinks the files to the minimum size required by the table engine. At completion of the reclaim disk space operation at step 822, the process 800 returns to check the status of the database management system at step 804, starting the process 800 again while the database management daemon is active.

Returning to step 820, if a reclaim disk space operation is not requested, the process 800 proceeds to step 824. At step 824, the process 800 checks the specified database and executes an automatic data removal operation. The MP_Config database contains user settings governing the limits of automatic data removal. A user can select a maximum length of time to keep data for and/or a maximum size of the database to maintain. For example, a user can set an auto remove criteria, such as to remove data older than 3 month, or to remove data when disk usage is more than 40%. Every day at certain time, for example, the APN VM 302 checks if a specified criteria is met, and if met, oldest one day data is removed. At completion of the check and execute automatic data removal operation at step 824, the process 800 returns to check the status of the database management system at step 804, starting the process 800 again while the database management daemon is active. This process 800 continues until the database management daemon is stopped, such as during software installation or storage migration.

FIG. 8B illustrates a data migration process 850 in accordance with an embodiment of the present invention. For example, in the NMS_Stats databse, an <object type>_minutes table could be named <particular-site-_minutes> table. The same table when moved to an archive historical database, could be named <particular-site_minutes_archive> table. After data is migrated, the new table takes on the regular table name, such as <particular-site_minutes> table. The data migration process 850 may be implemented as a software daemon which is started at step 852. At step

854, a determination is made whether a database currently in operation has completed migrating data as previously initiated. If the current database migration is completed or "done", the process 850 proceeds to step 856. At step 856, a determination is made whether all databases have completed migrating data that were previously initiated. If all databases have completed migrating data, the process 850 proceeds to step 860. At step 860, the migration scheduling for the currently checked databases is deleted. The process 850 proceeds to return step 858. Returning to step 856, if all databases have not completed migrating data, the process 850 proceeds to the return step 858.

Regarding determining whether a database migration is completed, is defined by the architecture of the database management daemon which further defines how actions are performed. For example, actions defined by the database management daemon are interruptible and may also be stopped without causing damage or loss of data to the specified database. To allow such actions, the database management daemon executes work tasks that are relatively small in size each time a main loop of the database migration daemon runs. For example, each time the database management daemon runs, an amount of data, such as the amount of data associated with each table that can be migrated in one hour, is prespecified. After such one hour of data migration, control is returned to the daemon to determine the next block of work. This method allows the data for all objects available for migration, such as specified in a time sliced window of system operations, that continuously slides backwards in time until all data is migrated. This advantageous new approach to migration happens while APN VM 302 is still in operation collecting data, allowing a user to use the web UI to see reports, graphs, and the like. In support of this new approach to migration, new data from one or more APN appliances is polled and added into the database beginning from software update time to current time. Older migrated data starts from software update time and going backwards. Accordingly, from web UI, a user sees old data start to appear gradually backwards until all data is migrated. For example, in the database, one (1) hour of data is copied from the archived tables for each round of migration. Starting from the most recent data and working backwards in time. In the UI, older data becomes available as each round of migration is completed. With polling, the timeline expands forward in time. With migration, the timeline expands backwards in time. This is in contrast to fully migrating one table at a time which would not allow a user or users to make use of the migrated data until all tables were fully migrated.

Returning to step 854, if the current database is "done", the process 850 proceeds to step 862. At step 862, a determination is made whether a table currently being migrated is "done". If the current table is "done", the process 850 proceeds to step 864. At step 864, a determination is made whether all tables have completed migrating data that were previously initiated. If all tables have completed migrating data, the process 850 proceeds to step 866. At step 866, the migration scheduling for the currently checked tables is deleted. The process 850 proceeds to step 854. Returning to step 864, if all tables have not completed migrating data, the process 850 proceeds to the step 862. If the current table has not completed data migration, the process 850 proceeds to step 868. At step 868, a new table minimum (Nmin) and maximum (Nmax) times are determined for the migrated table. For example, a table min time is the earliest recorded sample time in the table. Each minute table and each hour table has a column named update_epoch_time_s which records the time of the sample, from which column the new table min time is selected. A new table max time is the latest recorded sample time in the table, which is selected from the update_epoch_time_s column in the table. A new table min is specified to be undefined when no data has been migrated, such as occurs on the first time the migration is executed. This refers to the first time the database management daemon attempts to migrate data for a table, which happens the first time the daemon sees that migration is requested, for example. A table is created without any data. If there are no Omin/Omax/Nmin/Nmax values, the database management daemon determines initial values and stores them to prevent having to determine the values again. Then data is migrated backward to fill the undefined table, gradually. Also, at step 868 the old table min (Omin) and old table max (Omax) times are determined. Further, at step 868, the process 850 determines columns which are shared between the new table and the old table.

The process 850 proceeds to step 870. At step 870 a determination is made whether Nmin is undefined. The Omin/Omax/Nmin/Nmax values are undefined the first time the database management processes a table after migration is requested. The parameters of the data migration are stored in a file while migration is in progress. The values are determined to be undefined if no value has been stored for them. If Nmin is determined to be undefined, the process 850 proceeds to step 872. At step 872, the value Nmin is set equal to the old table max time, Omax. The process 850 then proceeds to step 874. Returning to step 870 if Nmin is determined to be defined, the process 850 proceeds to step 874. At step 874, the process 850 copies data from shared columns form the old table to the new table for entries in the column having a listed time that is less than Nmin and the listed time is greater than Nmin minus sixty minutes. In this manner, copying of data is chosen based on the sample times in the tables. Step 874 describes the APN VM 302 copying one hour of data at a time. One hour of data is requested to make sure the APN VM 302 is still able to be functional for other user requests. Data in old table is copied into new table with exact same time stamp. The old table contains data from before the moment migration was requested. The new table contains data from after the moment migration was requested. As such, there should be no data overlap between the two tables.

At step 876, a determination is made whether Nmin minus sixty minutes is less than the old table min, "Omin". To determine if all the data has been migrated, a determination is made whether the next loop will attempt to start at a value less than the min time of the old table. Each loop attempts to start at Nmin−60 minutes and then it is determined whether the value for Nmin−60 minutes is less than Omin. If the value is less than Omin, all data has been migrated and the process 850 proceeds to step 878. If At step 878, scheduling data for the current table is deleted and the process 850 returns to step 862 which then proceeds to step 864. If the value is not less than Omin, all data has not been migrated and the process 850 returns to step 862 and proceeds to step 868 to continue processing the table. At step 878, in order to delete the scheduling data, a software program creates a tracking structure stored in a binary file that separately tracks the progress of every table in every database. Once a table is completed, its records are removed from the tracking structure to prevent migrating data from that specific table. Similarly, once all tables are finished migrating data in a particular database, the database records are removed from the tracking structure. Once all databases are finished migrating data, the binary file is removed and migration is completed.

While the present invention has been disclosed in the context of various aspects of presently preferred embodiments, it will be recognized that the invention may be suitably applied to other environments consistent with the claims which follow.

We claim:

1. A method for automatic database schema migration, the method comprising:

installing an initial database, according to rules that define tables of data, in an adaptive private network (APN) having a centralized management system that includes an APN virtual machine (VM) and a network control node (NCN) coupled through the APN to a plurality of client nodes, wherein the NCN is separate from the plurality of client nodes and the NCN provides timing and control to the client nodes within the APN;

storing, in the APN VM, an extensible stylesheet language transformations (XLTS) template file that includes rules as to how tags and attributes in a database schema definition are to be handled in a database schema update;

receiving an update to the initial database, wherein the initial database includes a first table of data stored in a first set of columns having a first number of columns and an updated database includes a modified first table having a second set of columns having a second number of columns different from the first number of columns, wherein receiving the database update includes receiving an extensible markup language (XML) file containing a database schema definition including at least one tag that causes custom logic to be inserted into a migration script;

automatically generating the migration script from the database schema definition and executing the script on the centralized management system, wherein automatically generating the migration script includes automatically generating the migration script using the database schema definition in the XML file and the rules in the XLTS template file;

detecting automatically by the migration script executing on the centralized management system on installation of the updated database, that the modified first table has a different number of columns as compared to the first table; and updating automatically, by the migration script, one or more columns from the second set of columns that are different than the first set of columns for data content to conform thereto.

2. The method of claim 1, wherein the first number of columns is fewer than the second number of columns and said updating comprises adding a column.

3. The method of claim 1, wherein the first number of columns is greater than the second number of columns and said updating comprises deleting a column.

4. The method of claim 1, wherein the second set of columns are updated with new values for data type, key, and index.

5. The method of claim 1, wherein the updated database is a statistics database that is populated by polling the client nodes and the NCN for blocks of multiple minutes of data which are synchronized and correlated with time on the centralized management system.

6. The method of claim 1, wherein the updated database stores naming and id information persistently for objects in a history storage of the updated database and stores minute and hour data when the objects actually existed in the network to allow viewing of objects, and their associated information, that existed in the past but do not exist in the initial database.

7. The method of claim 1 further comprising:

sending a plurality of timing messages from the NCN to a client node, wherein each timing message is tagged with a send time according to a first clock in the NCN; and calibrating a network time in the client node based on an evaluation of a function of a slope-intercept form where slope m is a ratio of an average send time versus average arrival time for the plurality of timing messages received at the client node, x is a current time in the client node, base b is a round trip time between the NCN and the client node and y is a current time at time NCN.

8. A method for automatic database updating in response to receiving an updated database schema, the method comprising:

storing, in an adaptive private network virtual machine (APN VM) coupled to a network control node (NCN), an extensible stylesheet transformations (XLTS) template file that includes rules as to how tags and attributes in a database schema definition are to be handled in a database schema update;

receiving a database update, wherein receiving the database update includes receiving an extensible markup language (XML) file containing a database schema definition including at least one tag that causes custom logic to be inserted into a migration script;

automatically generating, in the APN VM, the migration script from the database schema definition and executing the migration script on a centralized management system, wherein automatically generating the migration script includes using the database schema definition in the XML file and the rules in the XLTS template file;

detecting, automatically by the migration script executing on the centralized management system, columns in an updated database required by the database schema definition which are not the same columns in a first database;

updating, automatically by the migration script executing on the centralized management system, the first database to add the columns determined to be required by the database schema definition which are not the same columns in the first database; and updating, automatically by the migration script executing on the centralized management system, information in the updated columns of the first database according to information characteristics specified by the database schema definition.

9. The method of claim 8, wherein a first schema defines the first database as having a first table of data stored in a first set of columns and the database schema definition defines the updated database as having a modified first table having a second set of columns different from the first set of columns.

10. The method of claim 8 further comprising:

determining a column-A required by the database schema definition is missing in the first database according to a first schema;

adding the column-A to the first database according to the database schema definition; and updating information in the column-A according to data content, data type, key, and index as specified by the database schema definition.

11. The method of claim 8 further comprising:
determining columns required by the database schema definition are included in the first database according to a first schema; and
updating information in the columns according to data content, data type, key, and index as specified by the database schema definition.

12. The method of claim 8 further comprising:
determining columns required by the database schema definition are included in the first database according to a first schema;
updating information in the columns according to data content, data type, key, and index as specified by the database schema definition to create a partially updated version of the first database; and
removing any extra columns from the partially updated version of the first database not required by the database schema definition to complete the updating of the first database.

13. The method of claim 8, wherein the updated database is a statistics database that is populated by polling the client nodes for blocks of multiple minutes of data which are synchronized and correlated with time on the network control node.

14. The method of claim 8, wherein the updated database is a statistics database that includes configuration information that has unified naming with configuration information stored in a configuration database separate from the statistics database, wherein the statistics database links data with object IDs in the configuration database such that when an APN configuration update changes an object ID, the object ID is updated in the statistics database and the configuration database and statistics collected for the new object ID are bound to the new object ID.

15. The method of claim 8, wherein the updated database is a statistics database for an APN that includes the NCN and a plurality of client sites, the statistics database includes configuration information that is updated to add a new client site and adjust communication links between the NCN and the client sites and wherein updating the database includes updating the statistics database in response to installation of a new version of software in the APN VM.

16. The method of claim 8, further comprising:
determining that a new version of a centralized management system includes a new database schema; and
auto-generating code to transform an existing database schema to the new database schema.

17. The method of claim 8 further comprising:
logging, to a log file, messages regarding operating events in migrating the first database to the updated database.

18. A computer readable non-transitory medium storing a computer program which causes a computer system to perform a method for automatic database schema migration, the method comprising:
installing an initial database, according to rules that define tables of data, in an adaptive private network (APN) having a centralized management system that includes an APN virtual machine (VM) and a network control node (NCN) coupled through the APN to the APN VM and to a plurality of client nodes, wherein the NCN is separate from the plurality of client nodes and the NCN provides timing and control to the client nodes within the APN;
storing, in the APN VM, an extensible stylesheet language transformations (XLTS) template file that includes rules as to how tags and attributes in a database schema definition are to be handled in a database schema update;
receiving an update to the initial database, wherein the initial database includes a first table of data stored in a first set of columns and an updated database includes a modified first table having a second set of columns different from the first set of columns, wherein receiving the database update includes receiving an extensible markup language (XML) file containing a database schema definition including at least one tag that causes custom logic to be inserted into a migration script;
automatically generating the migration script from the database schema definition and executing the migration script on the centralized management system, wherein automatically generating the migration script includes automatically generating the migration script using the database schema definition in the XML file and the rules in the XLTS template file;
detecting automatically by the migration script executing on the centralized management system on installation of the updated database that the second set of columns has a different number of columns as compared to the first table; and
updating, by the migration script executing on the centralized management system, one or more columns from the second set of columns that are different than the first set of columns for data content.

19. The computer readable non-transitory medium method of claim 18, wherein the updated database is a statistics database that is populated by polling the client nodes and the NCN for blocks of multiple minutes of data which are synchronized and correlated with time on the centralized management system.

20. The computer readable non-transitory medium method of claim 18, wherein the updated database stores naming and id information persistently for objects in a history storage of the updated database.

21. The computer readable non-transitory medium method of claim 18 further comprising:
sending a plurality of timing messages from the NCN to a client node, wherein each timing message is tagged with a send time according to a first clock in the NCN; and
calibrating a network time in the client node based on an evaluation of a function of a slope-intercept form where slope m is a ratio of an average send time versus average arrival time for the plurality of timing messages received at the client node, x is a current time in the client node, base b is a round trip time between the NCN and the client node and y is a current time at the NCN.

22. A method for migrating a table schema to an updated table schema on a centralized management system for an adaptive private network (APN), the method comprising:
storing, in an APN virtual machine (VM), an extensible stylesheet language transformations (XLTS) template file that includes rules as to how tags and attributes in a database schema definition are to be handled in a database schema update;
receiving an update to an initial database, wherein receiving the update includes receiving an extensible markup language (XML) file containing a database schema definition including at least one tag that causes custom logic to be inserted into a migration script;

automatically generating, by the APN VM, the migration script from the database schema definition and executing the migration script on the centralized management system;

determining automatically by the migration script that a table engine has changed, wherein the table engine change has not affected table data stored for a table;

archiving, by the migration script, table data associated with the table engine in response to determining that the table engine has changed; and migrating, by the migration script, table data from an old schema definition for the table before the table engine change was determined to a new schema definition for the table after the table engine change was determined.

23. The method of claim 22, wherein the old schema definition for the table contains no table partitions and the new schema definition for the table contains partitions for periodic time periods of data.

24. The method of claim 22, wherein the old schema definition for the table contains periodic time periods of data and the new schema definition for the table contains partitions for data for each site in the APN.

\* \* \* \* \*